United States Patent
Misra et al.

(10) Patent No.: US 10,477,204 B2
(45) Date of Patent: Nov. 12, 2019

(54) HARMONIZED PALETTE CODING

(71) Applicant: SHARP KABUSHIKI KAISHA, Sakai, Osaka (JP)

(72) Inventors: Kiran Mukesh Misra, Camas, WA (US); Seung-Hwan Kim, Camas, WA (US); Jie Zhao, Camas, WA (US); Christopher Andrew Segall, Camas, WA (US); Tomohiro Ikai, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/320,199

(22) PCT Filed: Jun. 18, 2015

(86) PCT No.: PCT/JP2015/003068
§ 371 (c)(1),
(2) Date: Dec. 19, 2016

(87) PCT Pub. No.: WO2015/194187
PCT Pub. Date: Dec. 23, 2015

(65) Prior Publication Data
US 2017/0127058 A1    May 4, 2017

Related U.S. Application Data

(60) Provisional application No. 62/110,240, filed on Jan. 30, 2015, provisional application No. 62/079,468, (Continued)

(51) Int. Cl.
*H04N 19/105* (2014.01)
*H04N 19/70* (2014.01)
(Continued)

(52) U.S. Cl.
CPC ......... *H04N 19/105* (2014.11); *H04N 19/126* (2014.11); *H04N 19/174* (2014.11);
(Continued)

(58) Field of Classification Search
CPC .................................................. H04N 19/105
See application file for complete search history.

(56) References Cited

U.S. PATENT DOCUMENTS

| | | | |
|---|---|---|---|
| 2014/0301475 A1* | 10/2014 | Guo | H04N 19/50 375/240.24 |
| 2016/0014407 A1* | 1/2016 | Pu | H04N 19/70 375/240.16 |

(Continued)

OTHER PUBLICATIONS

Chen et al., "Preliminary version of High efficiency video coding (HEVC) scalable extension Draft 6", Joint Collaborative Team on Video Coding (JCT-VC) of ITU-T SG 16 WP 3 and ISO/IEC JTC 1/SC 29/WG 11, 17th Meeting: Valencia, ES, Mar. 27-Apr. 4, 2014, JCTVC-Q1008_v1, pp. 1-130.

(Continued)

*Primary Examiner* — Rowina J Cattungal
(74) *Attorney, Agent, or Firm* — Birch, Stewart, Kolasch & Birch, LLP

(57) ABSTRACT

The invention is: A method for decoding a bitstream comprising: (a) decoding at least one pictures from the bitstream; and (b) partitioning each of the at least one pictures into a plurality of slices, wherein each of the plurality of slices includes at least one coding units, wherein (c) palette table predictor size of a coding unit of the at least one coding units is set equal to 0 at start of a slice of the plurality of slices.

1 Claim, 29 Drawing Sheets

Related U.S. Application Data filed on Nov. 13, 2014, provisional application No. 62/060,472, filed on Oct. 6, 2014, provisional application No. 62/015,287, filed on Jun. 20, 2014.

(51) Int. Cl.
  *H04N 19/174* (2014.01)
  *H04N 19/593* (2014.01)
  *H04N 19/463* (2014.01)
  *H04N 19/126* (2014.01)
  *H04N 19/184* (2014.01)
  *H04N 19/44* (2014.01)

(52) U.S. Cl.
  CPC ......... *H04N 19/184* (2014.11); *H04N 19/44* (2014.11); *H04N 19/463* (2014.11); *H04N 19/593* (2014.11); *H04N 19/70* (2014.11)

(56) References Cited

U.S. PATENT DOCUMENTS

| | | | | |
|---|---|---|---|---|
| 2017/0019677 | A1* | 1/2017 | Sun | H04N 19/593 |
| 2017/0078683 | A1* | 3/2017 | Seregin | H04N 19/176 |
| 2017/0127077 | A1* | 5/2017 | Chuang | H04N 19/46 |
| 2017/0257630 | A1* | 9/2017 | Lai | H04N 1/644 |
| 2017/0318302 | A1* | 11/2017 | Ye | H04N 19/119 |
| 2018/0027246 | A1* | 1/2018 | Liu | H04N 19/70 |
| | | | | 375/240.02 |

OTHER PUBLICATIONS

Flynn et al., "High Efficiency Video Coding (HEVC) Range Extensions text specification: Draft 7", Joint Collaborative Team on Video Coding (JCT-VC) of ITU-T SG 16 WP 3 and ISO/IEC JTC 1/SC 29/WG 11, 17th Meeting: Valencia, ES, Mar. 27-Apr. 4, 2014, JCTVC-Q1005_v9, pp. 1-133.

ITU-T Recommendation H.264, "Advanced video coding for generic audiovisual services", Telecommunication Standardization Sector of ITU, Series H: Audiovisual and Multimedia Systems Infrastructure of audiovisual services—Coding of moving video, Nov. 2007, pp. 1-540.

ITU-T Recommendation H.265, "High efficiency video coding", Telecommunication Standardization Sector of ITU, Series H: Audiovisual and Multimedia Systems Infrastructure of audiovisual services—Coding of moving video, Apr. 2013, pp. 1-300.

JCT-VC, "Test Model under Consideration", Joint Collaborative Team on Video Coding (JCT-VC) of ITU-T SG16 WP3 and ISO/IEC JTC1/SC29/WG11, 1st Meeting: Dresden, DE, Apr. 15-23, 2010, JCTVC-A205, pp. 1-171.

Joshi et al., "High Efficiency Video Coding (HEVC) Screen Content Coding: Draft 2", Joint Collaborative Team on Video Coding (JCT-VC) of ITU-T SG 16 WP 3 and ISO/IEC JTC 1/SC 29/WG 11, 18th Meeting: Sapporo, JP, Jun. 30-Jul. 9, 2014, JCTVC-S1005, pp. 1-359.

Kim et al., "HM9: High Efficiency Video Coding (HEVC) Test Model 9 Encoder Description", Joint Collaborative Team on Video Coding (JCT-VC) of ITU-T SG16 WP3 and ISO/IEC JTC1/SC29/WG11, 11th Meeting: Shanghai, CN, Oct. 10-19, 2012, JCTVC-K1002v2, 2 pages.

Laroche et al., "Non-RCE4: Palette Prediction for Palette mode", Joint Collaborative Team on Video Coding (JCT-VC) of ITU-T SG 16 WP 3 and ISO/IEC JTC 1/SC 29/WG 11, 16th Meeting: San Jose, US, Jan. 9-17, 2014, JCTVC-P0114, pp. 1-6.

Misra et al., "Modifications to palette coding for tiles/slices/dependent slices/wavefronts", Joint Collaborative Team on Video Coding (JCT-VC) of ITU-T SG 16 WP 3 and ISO/IEC JTC 1/SC 29/WG 11, 18th Meeting: Sapporo, JP, Jun. 30-Jul. 9, 2014, JCTVC-R0233, pp. 1-4.

Tech et al., "MV-HEVC Draft Text 7", Joint Collaborative Team on 3D Video Coding Extension Development of ITU-T SG 16 WP 3 and ISO/IEC JTC 1/SC 29/WG 11, 7th Meeting: San José, US, Jan. 11-17, 2014, JCT3V-G1004-v8, pp. 1-117.

Tech et al., "MV-HEVC Draft Text 8", Joint Collaborative Team on 3D Video Coding Extensions of ITU-T SG 16 WP 3 and ISO/IEC JTC 1/SC 29/WG 11 8th Meeting: Valencia, ES, Mar. 29-Apr. 4, 2014, JCT3V-H1002-v5, pp. 1-148.

* cited by examiner

| Palette Table | | | |
|---|---|---|---|
| Index | R | G | B |
| 0 | 40 | 40 | 40 |
| 1 | 80 | 80 | 80 |
| 2 | 120 | 120 | 120 |
| 3 | 200 | 128 | 150 |

FIG. 11

HARMONIZED PALETTE CODING

CROSS REFERENCE TO RELATED APPLICATIONS

This application is the National Phase of PCT International Application No. PCT/JP2015/003068, filed on Jun. 18, 2015, which claims priority under 35 U.S.C. 119(e) to U.S. Provisional Application No. 62/015,287, filed on Jun. 20, 2014, U.S. Provisional Application No. 62/060,472, filed on Oct. 6, 2014, U.S. Provisional Application No. 62/079,468, filed on Nov. 13, 2014, and U.S. Provisional Application No. 62/110,240, filed on Jan. 30, 2015, all of which are hereby expressly incorporated by reference into the present application.

TECHNICAL FIELD

The present invention relates to video encoding and/or decoding.

BACKGROUND ART

Electronic devices have become smaller and more powerful in order to meet consumer needs and to improve portability and convenience. Consumers have become dependent upon electronic devices and have come to expect increased functionality. Some examples of electronic devices include desktop computers, laptop computers, cellular phones, smart phones, media players, integrated circuits, etc.

Some electronic devices are used for processing and/or displaying digital media. For example, portable electronic devices now allow for digital media to be produced and/or consumed at almost any location where a consumer may be. Furthermore, some electronic devices may provide download or streaming of digital media content for the use and enjoyment of a consumer.

Digital video is typically represented as a series of images or frames, each of which contains an array of pixels. Each pixel includes information, such as intensity and/or color information. In many cases, each pixel is represented as a set of three colors, each of which is defined by eight bit color values.

Some video coding techniques provide higher coding efficiency at the expense of increasing complexity. Increasing image quality requirements and increasing image resolution requirements for video coding techniques also increase the coding complexity. Video decoders that are suitable for parallel decoding may improve the speed of the decoding process and reduce memory requirements; video encoders that are suitable for parallel encoding may improve the speed of the encoding process and reduce memory requirements.

The increasing popularity of digital media has presented several problems. or example, efficiently representing high-quality digital media for storage, transmittal, and playback presents several challenges. systems and methods that represent digital media more efficiently is beneficial.

The foregoing and other objectives, features, and advantages of the invention will be more readily understood upon consideration of the following detailed description of the invention, taken in conjunction with the accompanying drawings.

The present invention relates to image and video decoding at higher bit depths.

Existing video coding standards, such as H.264/AVC, high efficiency video coding (HEVC), generally provide relatively high coding efficiency at the expense of increased computational complexity. As the computational complexity increases, the encoding and/or decoding speeds tend to decrease. Also, the desire for increased higher fidelity tends to increase over time which tends to require increasingly larger memory requirements, increasingly larger memory bandwidth requirements, and increasing hardware complexity. The increasing memory requirements and the increasing memory bandwidth requirements tends to result in increasingly more expensive and computationally complex circuitry, especially in the case of embedded systems.

Referring to FIG. 22, many decoders (and encoders) receive (and encoders provide) encoded data for blocks of an image. Typically, the image is divided into blocks and each of the blocks is encoded in some manner, such as using a discrete cosine transform (DCT), and provided to the decoder. The decoder receives the encoded blocks and decodes each of the blocks in some manner, such as using an inverse discrete cosine transform. In many cases, the decoding of the image coefficients of the image block is accomplished by matrix multiplication. The matrix multiplication may be performed for a vertical direction and the matrix multiplication may be performed for a horizontal direction. By way of example, for 8-bit values, the first matrix multiplication can result in 16-bit values, and the second matrix multiplication can result in 24-bit values in some cases. In addition, the encoding of each block of the image is typically quantized, which maps the values of the encoding to a smaller set of quantized coefficients. Quantization requires de-quantization by the decoder, which maps the set of quantized coefficients to approximate encoding values or de-quantized coefficients. The number of desirable bits for de-quantized coefficients is a design parameter. The potential for large de-quantized coefficient values resulting from the matrix multiplication and the de-quantization operation is problematic for resource constrained systems, especially embedded systems.

SUMMARY OF INVENTION

A preferred embodiment of the present invention is: A method for decoding a bitstream comprising: (a) decoding at least one pictures from the bitstream; and (b) partitioning each of the at least one pictures into a plurality of slices, wherein each of the plurality of slices includes at least one coding units, wherein (c) palette table predictor size of a coding unit of the at least one coding units is set equal to 0 at start of a slice of the plurality of slices.

BRIEF DESCRIPTION OF DRAWINGS

FIG. 7 illustrates a frame with a slice and 9 tiles.

FIG. 8 illustrates a frame with three slices and 3 tiles.

FIG. 11 illustrates a palette table.

[FIG. 2]

DESCRIPTION OF EMBODIMENTS

Figure 1:
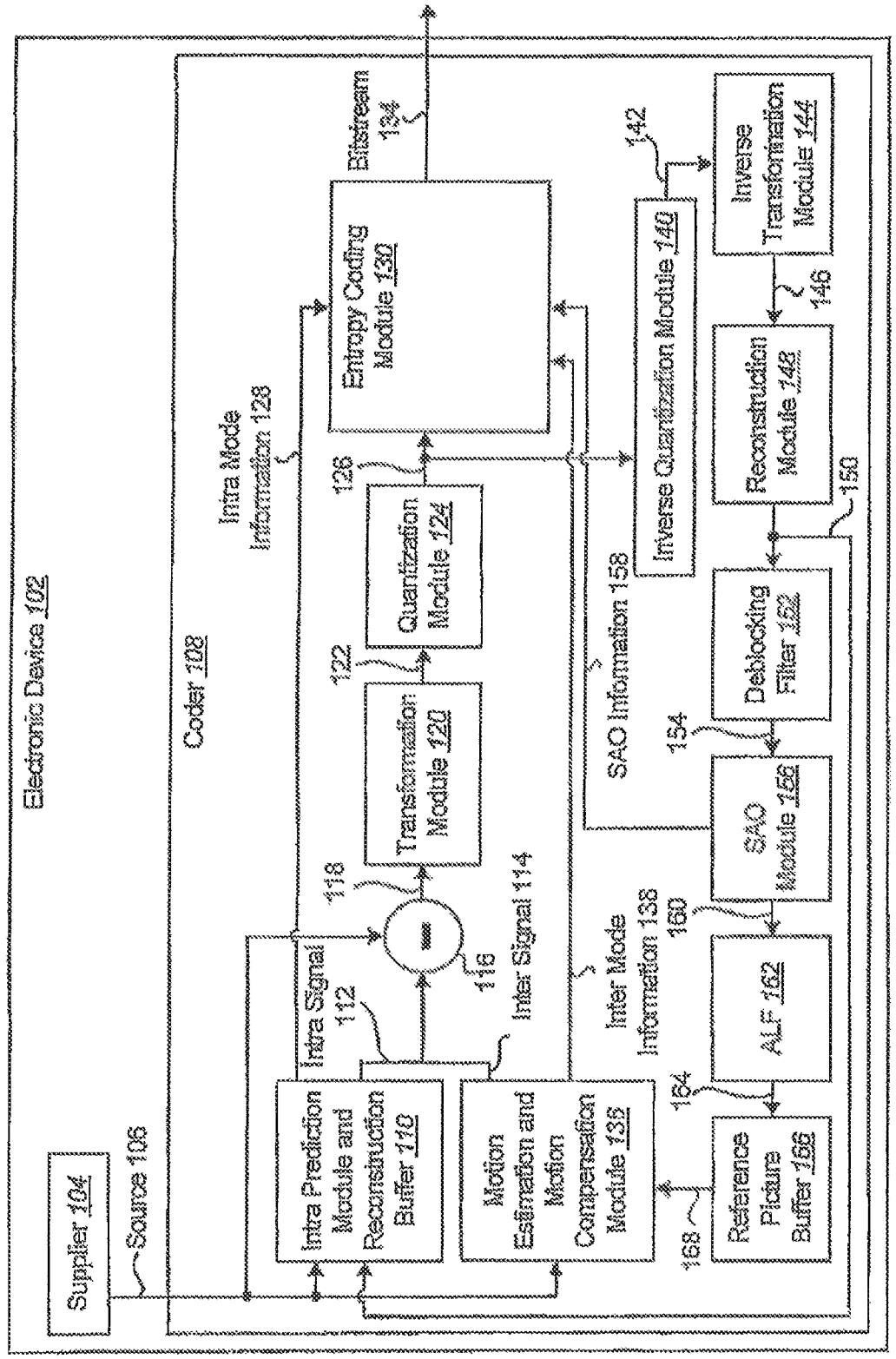
FIG. 1 is a block diagram illustrating one configuration of an electronic device including a HEVC encoder.

The foregoing and other objectives, features, and advantages of the invention will be more readily understood upon consideration of the following detailed description of the invention, taken in conjunction with the accompanying drawings.

The Joint Collaborative Team on Video Coding (JCT-VC) of the International Telecommunication Union Telecommunication Standardization Sector (ITU-T) Study Group 16 (SG16) Working Party 3 (WP3) and International Organization for Standardization/International Electrotechnical Commission (ISO/IEC) Joint Technical Committee 1/Subcommittee 29/Working Group 11 (JTC1/SC29/WG11) has launched a standardization effort for a video coding standard called the High Efficiency Video Coding standard (HEVC). HEVC uses block-based coding.

In video coding, two entropy coding techniques (e.g., Context-Adaptive Variable Length Coding (CAVLC) and Context-Adaptive Binary Arithmetic Coding CABAC)) may be used to compress Transformed and Quantized Coefficients (TQCs) without loss. TQCs may be from different block sizes according to transform sizes (e.g., 4×4, 8×8, 16×16, 32×32).

Two-dimensional (2D) TQCs may be converted into a one-dimensional (1D) array before entropy coding. In one example, 2D arrayed TQCs in a 4×4 block may be arranged as illustrated in Table (1).

TABLE (1)

| 4 | 0 | 1 | 0 |
| 3 | 2 | −1 | ... |
| −3 | 0 | ... | ... |
| 0 | ... | ... | ... |

When converting the 2D TQCs into a 1D array, the block may be scanned in a diagonal zig-zag fashion. Continuing with the example, the 2D arrayed TQCs illustrated in Table (1) may be converted into 1D arrayed TQCs [4, 0, 3, −3, 2, 1, 0, −1, 0, . . . ] by scanning the first row and first column, first row and second column, second row and first column, third row and first column, second row and second column, first row and third column, first row and fourth column, second row and third column, third row and second column, fourth row and first column and so on.

The CAVLC coding procedure may proceed, for example, as follows. The TQCs in the 1D array may be ordered according to scanning position. The scanning position of the last significant coefficient and the last coefficient level may be determined. The last significant coefficient may be coded. It should be noted that coefficients are typically coded in reverse scanning order. Run-level coding may be performed, which is activated directly after the last coefficient coding. Then, level coding may be performed. The term significant coefficient refers to a coefficient that has a coefficient level value that is greater than zero. A coefficient level value refers to a unique indicator of the magnitude (or absolute value) of a Transformed and Quantized Coefficient (TQC) value.

This procedure may be illustrated in Table (2) as a continuation of the example above (with the 1D arrayed TQCs [4, 0, 3, −3, 2, 1, 0, −1, 0, . . . ]).

TABLE (2)

| Scanning Position | 0 | 1 | 2 | 3 | 4 | 5 | 6 | 7 | ... |
|---|---|---|---|---|---|---|---|---|---|
| Coefficient Level | 4 | 0 | 3 | −3 | 2 | 1 | 0 | −1 | ... |
| Last Position | | | | | | | | 7 | |
| Last Coefficient Level | | | | | | | | −1 | |
| Run-Level Coding | | | | | 2 | 1 | 0 | | |
| Level Coding | 4 | 0 | 3 | −3 | | | | | |

In Table (2), for example, the coefficient level −1 at scanning position 7 may be the last non-zero coefficient. Thus, the last position is scanning position 7 and the last coefficient level is −1. Run-level coding may be performed for coefficients 0, 1 and 2 at scanning positions 6, 5 and 4 (where coefficients are coded in reverse scanning order). Then, level coding may be performed for the coefficient levels −3, 3, 0 and 4.

FIG. 1 is a block diagram illustrating one configuration of an electronic device 102 in which video may be coded. It should be noted that one or more of the elements illustrated as included within the electronic device 102 may be implemented in hardware, software or a combination of both. For example, the electronic device 102 includes a coder 108, which may be implemented in hardware, software or a combination of both. For instance, the coder 108 may be implemented as a circuit, integrated circuit, application-specific integrated circuit (ASIC), processor in electronic communication with memory with executable instructions, firmware, field-programmable gate array (FPGA), etc., or a combination thereof. In some configurations, the coder 108 may be a high efficiency video coding (HEVC) coder.

The electronic device 102 may include a supplier 104. The supplier 104 may provide picture or image data (e.g., video) as a source 106 to the coder 108. Examples of the supplier 104 include image sensors, memory, communication interfaces, network interfaces, wireless receivers, ports, etc.

The source 106 may be provided to an intra-frame prediction module and reconstruction buffer 110. The source 106 may also be provided to a motion estimation and motion compensation module 136 and to a subtraction module 116.

The intra-frame prediction module and reconstruction buffer 110 may generate intra mode information 128 and an intra signal 112 based on the source 106 and reconstructed data 150. The motion estimation and motion compensation module 136 may generate inter mode information 138 and an inter signal 114 based on the source 106 and a reference picture buffer 166 signal 168. The reference picture buffer 166 signal 168 may include data from one or more reference pictures stored in the reference picture buffer 166.

The coder 108 may select between the intra signal 112 and the inter signal 114 in accordance with a mode. The intra signal 112 may be used in order to exploit spatial characteristics within a picture in an intra coding mode. The inter signal 114 may be used in order to exploit temporal characteristics between pictures in an inter coding mode. While in the intra coding mode, the intra signal 112 may be provided to the subtraction module 116 and the intra mode information 128 may be provided to an entropy coding module 130. While in the inter coding mode, the inter signal 114 may be provided to the subtraction module 116 and the inter mode information 138 may be provided to the entropy coding module 130.

Either the intra signal 112 or the inter signal 114 (depending on the mode) is subtracted from the source 106 at the subtraction module 116 in order to produce a prediction residual 118. The prediction residual 118 is provided to a transformation module 120. The transformation module 120 may compress the prediction residual 118 to produce a transformed signal 122 that is provided to a quantization module 124. The quantization module 124 quantizes the transformed signal 122 to produce transformed and quantized coefficients (TQCs) 126.

The TQCs 126 are provided to an entropy coding module 130 and an inverse quantization module 140. The inverse quantization module 140 performs inverse quantization on the TQCs 126 to produce an inverse quantized signal 142 that is provided to an inverse transformation module 144. The inverse transformation module 144 de-compresses the inverse quantized signal 142 to produce a decompressed signal 146 that is provided to a reconstruction module 148.

The reconstruction module 148 may produce reconstructed data 150 based on the decompressed signal 146. For example, the reconstruction module 148 may reconstruct (modified) pictures. The reconstructed data 150 may be provided to a deblocking filter 152 and to the intra prediction module and reconstruction buffer 110. The deblocking filter 152 may produce a filtered signal 154 based on the reconstructed data 150.

The filtered signal 154 may be provided to a sample adaptive offset (SAO) module 156. The SAO module 156 may produce SAO information 158 that is provided to the entropy coding module 130 and an SAO signal 160 that is provided to an adaptive loop filter (ALF) 162. The ALF 162 produces an ALF signal 164 that is provided to the reference picture buffer 166. The ALF signal 164 may include data from one or more pictures that may be used as reference pictures. In some cases the ALF 162 may be omitted.

The entropy coding module 130 may code the TQCs 126 to produce a bitstream 134. As described above, the TQCs 126 may be converted to a 1D array before entropy coding. Also, the entropy coding module 130 may code the TQCs 126 using CAVLC or CABAC. In particular, the entropy coding module 130 may code the TQCs 126 based on one or more of intra mode information 128, inter mode information 138 and SAO information 158. The bitstream 134 may include coded picture data.

Quantization, involved in video compression such as HEVC, is a lossy compression technique achieved by compressing a range of values to a single quantum value. The quantization parameter (QP) is a predefined scaling parameter used to perform the quantization based on both the quality of reconstructed video and compression ratio. The block type is defined in HEVC to represent the characteristics of a given block based on the block size and its color information. QP, resolution information and block type may be determined before entropy coding. For example, the electronic device 102 (e.g., the coder 108) may determine the QP, resolution information and block type, which may be provided to the entropy coding module 130.

The entropy coding module 130 may determine the block size based on a block of TQCs 126. For example, block size may be the number of TQCs 126 along one dimension of the block of TQCs. In other words, the number of TQCs 126 in the block of TQCs may be equal to block size squared. For instance, block size may be determined as the square root of the number of TQCs 126 in the block of TQCs. Resolution may be defined as a pixel width by a pixel height. Resolution information may include a number of pixels for the width of a picture, for the height of a picture or both. Block size may be defined as the number of TQCs along one dimension of a 2D block of TQCs.

In some configurations, the bitstream 134 may be transmitted to another electronic device. For example, the bitstream 134 may be provided to a communication interface, network interface, wireless transmitter, port, etc. For instance, the bitstream 134 may be transmitted to another electronic device via a Local Area Network (LAN), the Internet, a cellular phone base station, etc. The bitstream 134 may additionally or alternatively be stored in memory on the electronic device 102.

Figure 2:
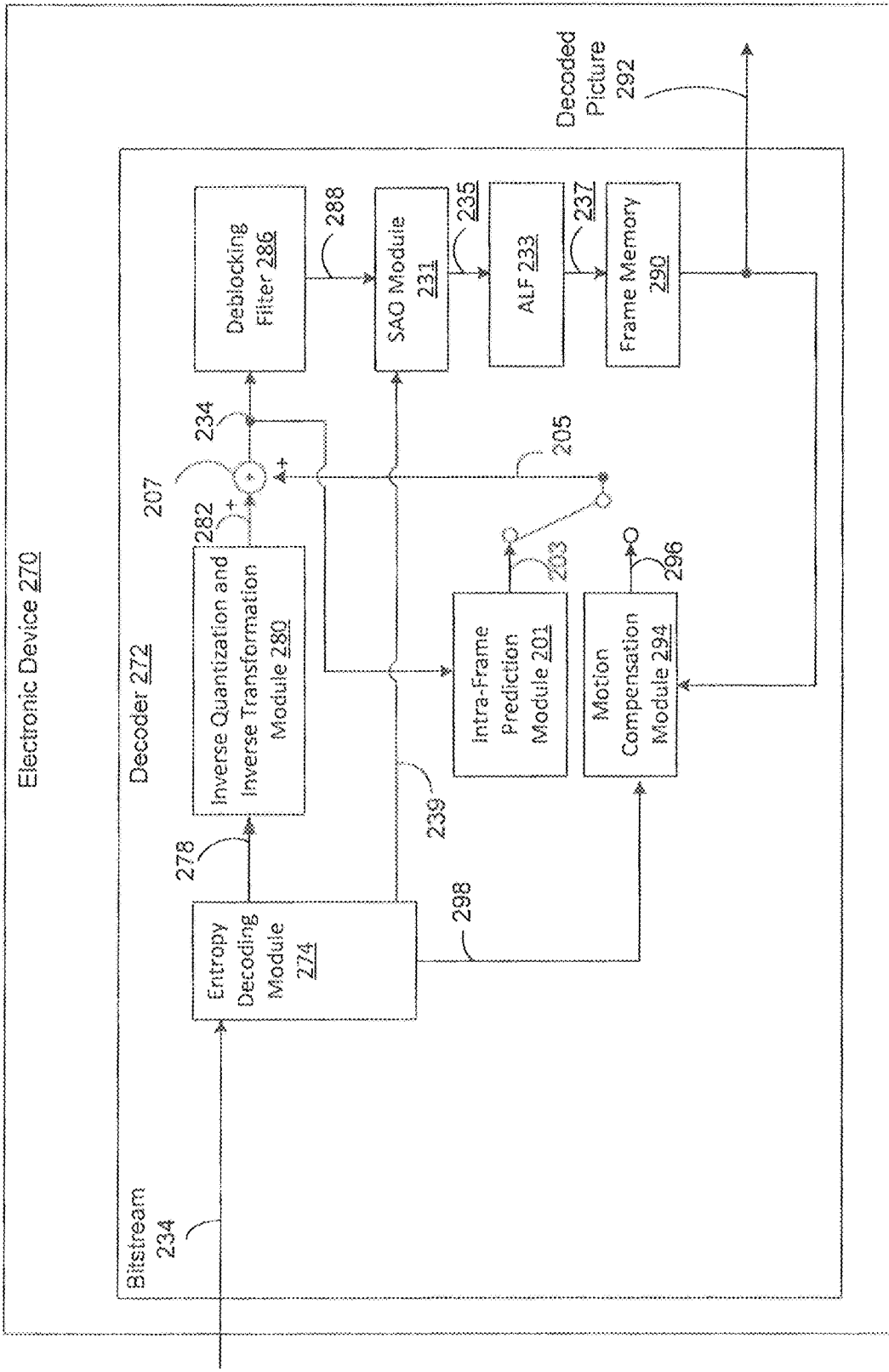
FIG. 2 is a block diagram illustrating one configuration of an electronic device including a HEVC decoder.

FIG. 2 is a block diagram illustrating one configuration of an electronic device 270 including a decoder 272 that may be a high-efficiency video coding (HEVC) decoder. The decoder 272 and one or more of the elements illustrated as included in the decoder 272 may be implemented in hardware, software or a combination of both. The decoder 272 may receive a bitstream 234 (e.g., one or more coded pictures included in the bitstream 234) for decoding. In some configurations, the received bitstream 234 may include received overhead information, such as a received slice header, received picture parameter set (PPS), received buffer description information, classification indicator, etc.

Received symbols (e.g., encoded TQCs) from the bitstream 234 may be entropy decoded by an entropy decoding module 274. This may produce a motion information signal 298 and decoded transformed and quantized coefficients (TQCs) 578.

The motion information signal 298 may be combined with a portion of a decoded picture 292 from a frame memory 290 at a motion compensation module 294, which may produce an inter-frame prediction signal 296. The decoded transformed and quantized coefficients (TQCs) 278 may be inverse quantized and inverse transformed by an inverse quantization and inverse transformation module 280, thereby producing a decoded residual signal 282. The decoded residual signal 282 may be added to a prediction signal 205 by a summation module 207 to produce a combined signal 284. The prediction signal 205 may be a signal selected from either the inter-frame prediction signal 296 produced by the motion compensation module 294 or an intra-frame prediction signal 203 produced by an intra-frame prediction module 201. In some configurations, this signal selection may be based on (e.g., controlled by) the bitstream 234.

The intra-frame prediction signal 203 may be predicted from previously decoded information from the combined signal 284 (in the current frame, for example). The combined signal 284 may also be filtered by a deblocking filter 286. The resulting filtered signal 288 may be provided to a sample adaptive offset (SAO) module 231. Based on the filtered signal 288 and information 239 from the entropy decoding module 274, the SAO module 231 may produce an SAO signal 235 that is provided to an adaptive loop filter (ALF) 233. The ALF 233 produces an ALF signal 237 that is provided to the frame memory 290. The ALF signal 237 may include data from one or more pictures that may be used as reference pictures. The ALF signal 237 may be written to frame memory 290. The resulting ALF signal 237 may include a decoded picture. In some cases the ALF 233 may be omitted.

The frame memory 290 may include a decoded picture buffer (DPB). The frame memory 290 may also include overhead information corresponding to the decoded pictures. For example, the frame memory 290 may include slice headers, picture parameter set (PPS) information, cycle parameters, buffer description information, etc. One or more of these pieces of information may be signaled from a coder (e.g., coder 108).

The frame memory 290 may provide one or more decoded pictures 292 to the motion compensation module 294. Furthermore, the frame memory 290 may provide one or more decoded pictures 292, which may be output from the decoder 272. The one or more decoded pictures 292 may be presented on a display, stored in memory or transmitted to another device, for example.

Figure 3:
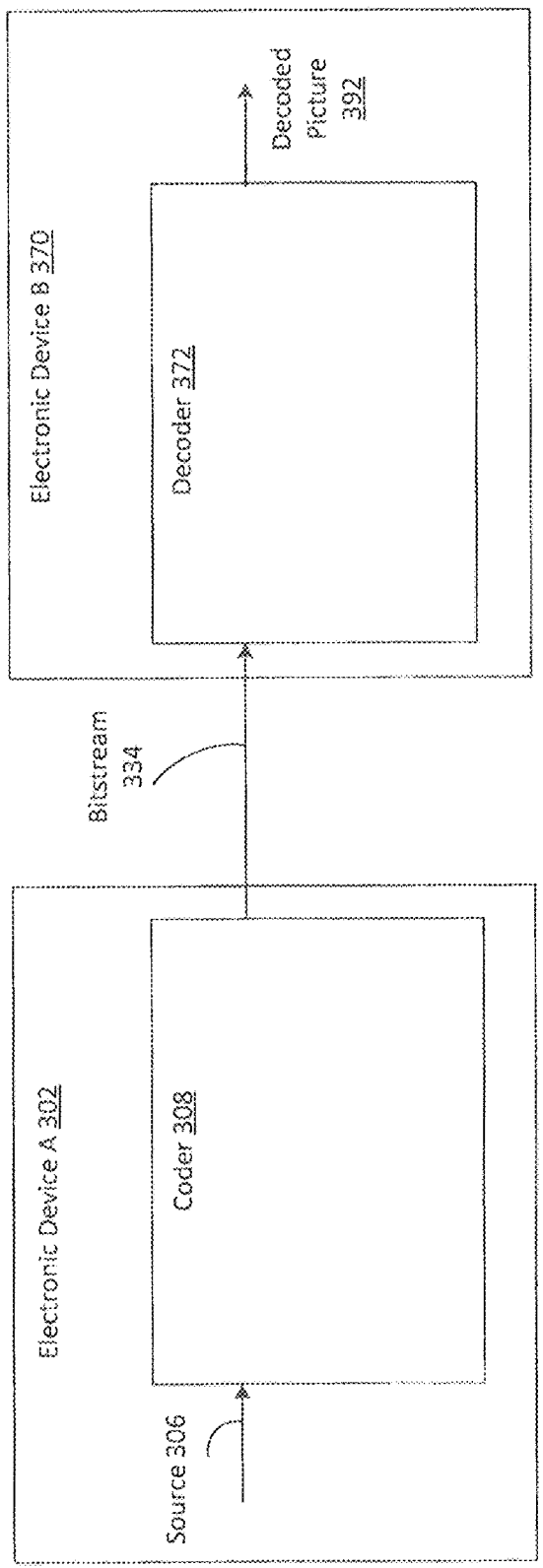
FIG. 3 is a block diagram illustrating one example of a coder and a decoder.

FIG. 3 is a block diagram illustrating one example of a coder 908 and a decoder 372. In this example, electronic device A 302 and electronic device B 370 are illustrated. However, it should be noted that the features and functionality described in relation to electronic device A 302 and electronic device B 370 may be combined into a single electronic device in some configurations.

Electronic device A 302 includes a coder 308. The coder 308 may be implemented in hardware, software or a combination of both. In one configuration, the coder 308 may be a high-efficiency video coding (HEVC) coder. Electronic device A 302 may obtain a source 306. In some configurations, the source 306 may be captured on electronic device A 302 using an image sensor, retrieved from memory or received from another electronic device.

The coder 308 may code the source 306 to produce a bitstream 334. For example, the coder 308 may code a series of pictures (e.g., video) in the source 306. The coder 308 may be similar to the coder 108 described above in connection with FIG. 1.

The bitstream 334 may include coded picture data based on the source 306. In some configurations, the bitstream 334 may also include overhead data, such as slice header information, PPS information, etc. As additional pictures in the source 306 are coded, the bitstream 334 may include one or more coded pictures.

The bitstream 334 may be provided to a decoder 372. In one example, the bitstream 334 may be transmitted to electronic device B 370 using a wired or wireless link. In some cases, this may be done over a network, such as the Internet or a Local Area Network (LAN). As illustrated in FIG. 3, the decoder 372 may be implemented on electronic device B 370 separately from the coder 308 on electronic device A 302. However, it should be noted that the coder 308 and decoder 372 may be implemented on the same electronic device in some configurations. In an implementation where the coder 308 and decoder 372 are implemented on the same electronic device, for instance, the bitstream 334 may be provided over a bus to the decoder 372 or stored in memory for retrieval by the decoder 372.

The decoder 372 may be implemented in hardware, software or a combination of both. In one configuration, the decoder 372 may be a high-efficiency video coding (HEVC) decoder. The decoder 372 may be similar to the decoder 272 described above in connection with FIG. 2.

Figure 4:
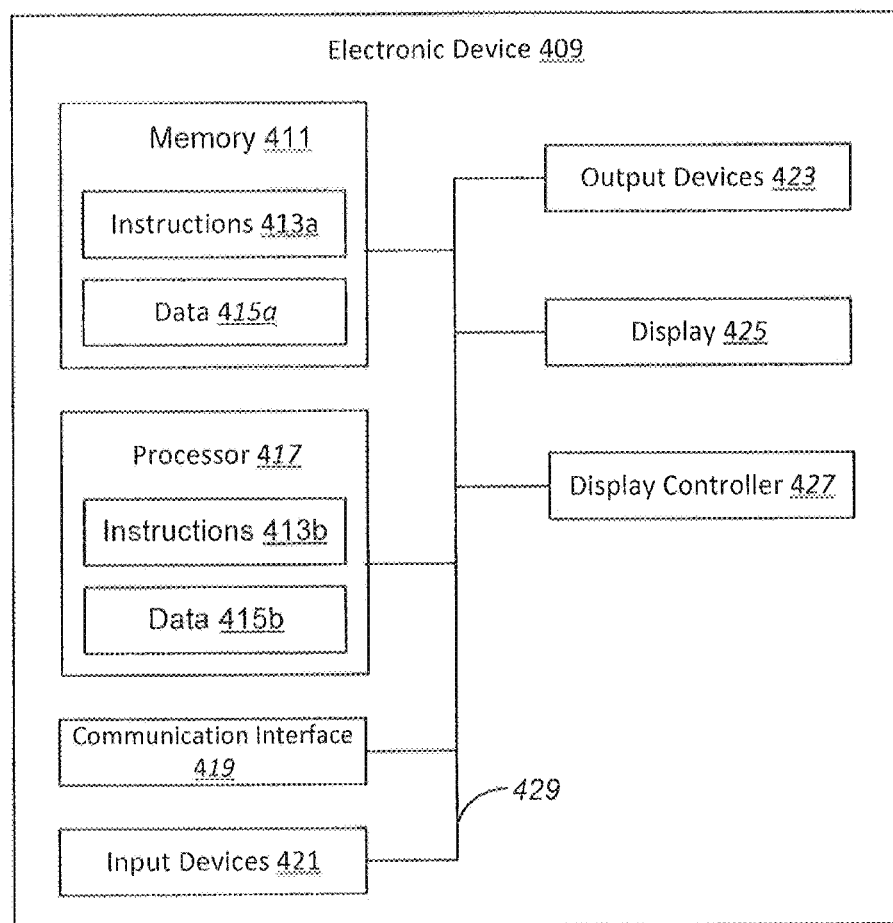
FIG. 4 illustrates various components that may be utilized in an electronic device.

FIG. 4 illustrates various components that may be utilized in an electronic device 1009. The electronic device 1009 may be implemented as one or more of the electronic devices. For example, the electronic device 1009 may be implemented as the electronic device 102 described above in connection with FIG. 1, as the electronic device 570 described above in connection with FIG. 2 or both.

The electronic device 409 includes a processor 417 that controls operation of the electronic device 409. The processor 417 may also be referred to as a CPU. Memory 411, which may include both read-only memory (ROM), random access memory (RAM) or any type of device that may store information, provides instructions 413a (e.g., executable instructions) and data 415a to the processor 417. A portion of the memory 411 may also include non-volatile random access memory (NVRAM). The memory 411 may be in electronic communication with the processor 417.

Instructions 413b and data 415b may also reside in the processor 417. Instructions 413b and/or data 415b loaded into the processor 417 may also include instructions 413a and/or data 415a from memory 411 that were loaded for execution or processing by the processor 417. The instructions 413b may be executed by the processor 417 to implement one or more techniques disclosed herein.

The electronic device 409 may include one or more communication interfaces 419 for communicating with other electronic devices. The communication interfaces 419 may be based on wired communication technology, wireless communication technology, or both. Examples of communication interfaces 419 include a serial port, a parallel port, a Universal Serial Bus (USB), an Ethernet (registered trademark) adapter, an IEEE 1394 bus interface, a small computer system interface (SCSI) bus interface, an infrared (IR) communication port, a Bluetooth (registered trademark) wireless communication adapter, a wireless transceiver in accordance with 3rd Generation Partnership Project (3GPP) specifications and so forth.

The electronic device 409 may include one or more output devices 423 and one or more input devices 421. Examples of output devices 423 include a speaker, printer, etc. One type of output device that may be included in an electronic device 409 is a display device 425. Display devices 425 used with configurations disclosed herein may utilize any suitable image projection technology, such as a cathode ray tube (CRT), liquid crystal display (LCD), light-emitting diode (LED), gas plasma, electroluminescence or the like. A display controller 427 may be provided for converting data stored in the memory 411 into text, graphics, and/or moving images (as appropriate) shown on the display 425. Examples of input devices 421 include a keyboard, mouse, microphone, remote control device, button, joystick, trackball, touchpad, touchscreen, lightpen, etc.

The various components of the electronic device 409 are coupled together by a bus system 429, which may include a power bus, a control signal bus and a status signal bus, in addition to a data bus. However, for the sake of clarity, the various buses are illustrated in FIG. 4 as the bus system 429. The electronic device 409 illustrated in FIG. 4 is a functional block diagram rather than a listing of specific components.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM (registered trademark), CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy (registered trademark) disk and Blu-ray (registered trademark) disc where disks usually reproduce data magnetically, while discs reproduce data optically with lasers. The code for the decoder and/or encoder may be stored on a computer readable medium.

'coding block': An N×N block of samples for some value of N such that the division of a coding tree block into coding blocks is a partitioning.

'coding tree block': An N×N block of samples for some value of N such that the division of a component into coding tree blocks is a partitioning.

'coding tree unit': A coding tree block of luma samples, two corresponding coding tree blocks of chroma samples of a picture that has three sample arrays, or a coding tree block of samples of a monochrome picture or a picture that is coded using three separate colour planes and syntax structures used to code the samples.

'coding unit': A coding block of luma samples, two corresponding coding blocks of chroma samples of a picture that has three sample arrays, or a coding block of samples of a monochrome picture or a picture that is coded using three separate colour planes and syntax structures used to code the samples.

'component': An array or single sample from one of the three arrays (luma and two chroma) that compose a picture in 4:2:0, 4:2:2, or 4:4:4 colour format or the array or a single sample of the array that compose a picture in monochrome format.

'network abstraction layer (NAL) unit': A syntax structure containing an indication of the type of data to follow and bytes containing that data in the form of an RBSP interspersed as necessary with emulation prevention bytes.

'network abstraction layer (NAL) unit stream': A sequence of NAL units.

'picture': An array of luma samples in monochrome format or an array of luma samples and two corresponding arrays of chroma samples in 4:2:0, 4:2:2, and 4:4:4 colour format. A picture may be either a frame or a field. However, in one CVS, either all pictures are frames or all pictures are fields.

'picture parameter set (PPS)': A syntax structure containing syntax elements that apply to zero or more entire coded pictures as determined by a syntax element found in each slice segment header.

'prediction block': A rectangular M×N block of samples on which the same prediction is applied.

'prediction process': The use of a predictor to provide an estimate of the data element (e.g. sample value or motion vector) currently being decoded.

'prediction unit': A prediction block of luma samples, two corresponding prediction blocks of chroma samples of a picture that has three sample arrays, or a prediction block of samples of a monochrome picture or a picture that is coded using three separate colour planes and syntax structures used to predict the prediction block samples.

'predictor': A combination of specified values or previously decoded data elements (e.g. sample value or motion vector) used in the decoding process of subsequent data elements.

'quadtree': A tree in which a parent node can be split into four child nodes, each of which may become parent node for another split into four child nodes.

'quantization parameter': A variable used by the decoding process for scaling of transform coefficient levels.

'raster scan': A mapping of a rectangular two-dimensional pattern to a one-dimensional pattern such that the first entries in the one-dimensional pattern are from the first top row of the two-dimensional pattern scanned from left to right, followed similarly by the second, third, etc., rows of the pattern (going down) each scanned from left to right.

'scaling': The process of multiplying transform coefficient levels by a factor, resulting in transform coefficients.

'sequence parameter set (SPS)': A syntax structure containing syntax elements that apply to zero or more entire CVSs as determined by the content of a syntax element found in the PPS referred to by a syntax element found in each slice segment header.

'slice header': The slice segment header of the independent slice segment that is a current slice segment or the most recent independent slice segment that precedes a current dependent slice segment in decoding order.

'slice segment': An integer number of coding tree units ordered consecutively in the tile scan and contained in a single NAL unit.

'slice segment header': A part of a coded slice segment containing the data elements pertaining to the first or all coding tree units represented in the slice segment.

'tile scan': A specific sequential ordering of coding tree blocks partitioning a picture in which the coding tree blocks are ordered consecutively in coding tree block raster scan in a tile whereas tiles in a picture are ordered consecutively in a raster scan of the tiles of the picture.

'transform block': A rectangular M×N block of samples on which the same transform is applied.

'transform coefficient': A scalar quantity, considered to be in a frequency domain, that is associated with a particular one-dimensional or two-dimensional frequency index in an inverse transform part of the decoding process.

'transform coefficient level': An integer quantity representing the value associated with a particular two dimensional frequency index in the decoding process prior to scaling for computation of a transform coefficient value.

'transform unit': A transform block of luma samples of size 8×8, 16×16, or 32×32 or four transform blocks of luma samples of size 4×4, two corresponding transform blocks of chroma samples of a picture in 4:2:0 colour format; or a transform block of luma samples of size 8×8, 16×16, or 32×32, and four corresponding transform blocks of chroma samples, or four transform blocks of luma samples of size 4×4, and four corresponding transform blocks of chroma samples of a picture in 4:2:2 colour format; or a transform block of luma samples of size 4×4, 8×8, 16×16, or 32×32, and two corresponding transform blocks of chroma samples of a picture in 4:4:4 colour format that is not coded using three separate colour planes and syntax structures used to transform the transform block samples; or a transform block of luma samples of size 8×8, 16×16, or 32×32 or four transform blocks of luma samples of size 4×4 of a monochrome picture or a picture in 4:4:4 colour format that is coded using three separate colour planes; and associated syntax structures used to transform the transform block samples.

'z-scan order': A specified sequential ordering of blocks partitioning a picture, where the order is identical to coding tree block raster scan of the picture when the blocks are of the same size as coding tree blocks, and, when the blocks are of a smaller size than coding tree blocks, i.e. coding tree blocks are further partitioned into smaller coding blocks, the order traverses from coding tree block to coding tree block in coding tree block raster scan of the picture, and inside each coding tree block, which may be divided into quadtrees hierarchically to lower levels, the order traverses from quadtree to quadtree of a particular level in quadtree-of-the-particular-level raster scan of the quadtree of the immediately higher level. An input picture comprising a plurality of coded tree blocks (e.g., generally referred to herein as blocks) may be partitioned into one or several slices. The values of the samples in the area of the picture that a slice represents may be properly decoded without the use of data from other slices provided that the reference pictures used at the encoder and the decoder are the same and that de-blocking filtering does not use information across slice boundaries. Therefore, entropy decoding and block reconstruction for a slice does not depend on other slices. In particular, the entropy coding state may be reset at the start of each slice. The data in other slices may be marked as unavailable when defining neighborhood availability for both entropy decoding and reconstruction. The slices may be entropy decoded and reconstructed in parallel. In an example, no intra prediction and motion-vector prediction is allowed across the boundary of a slice. In contrast, de-blocking filtering may use information across slice boundaries.

Figure 5:
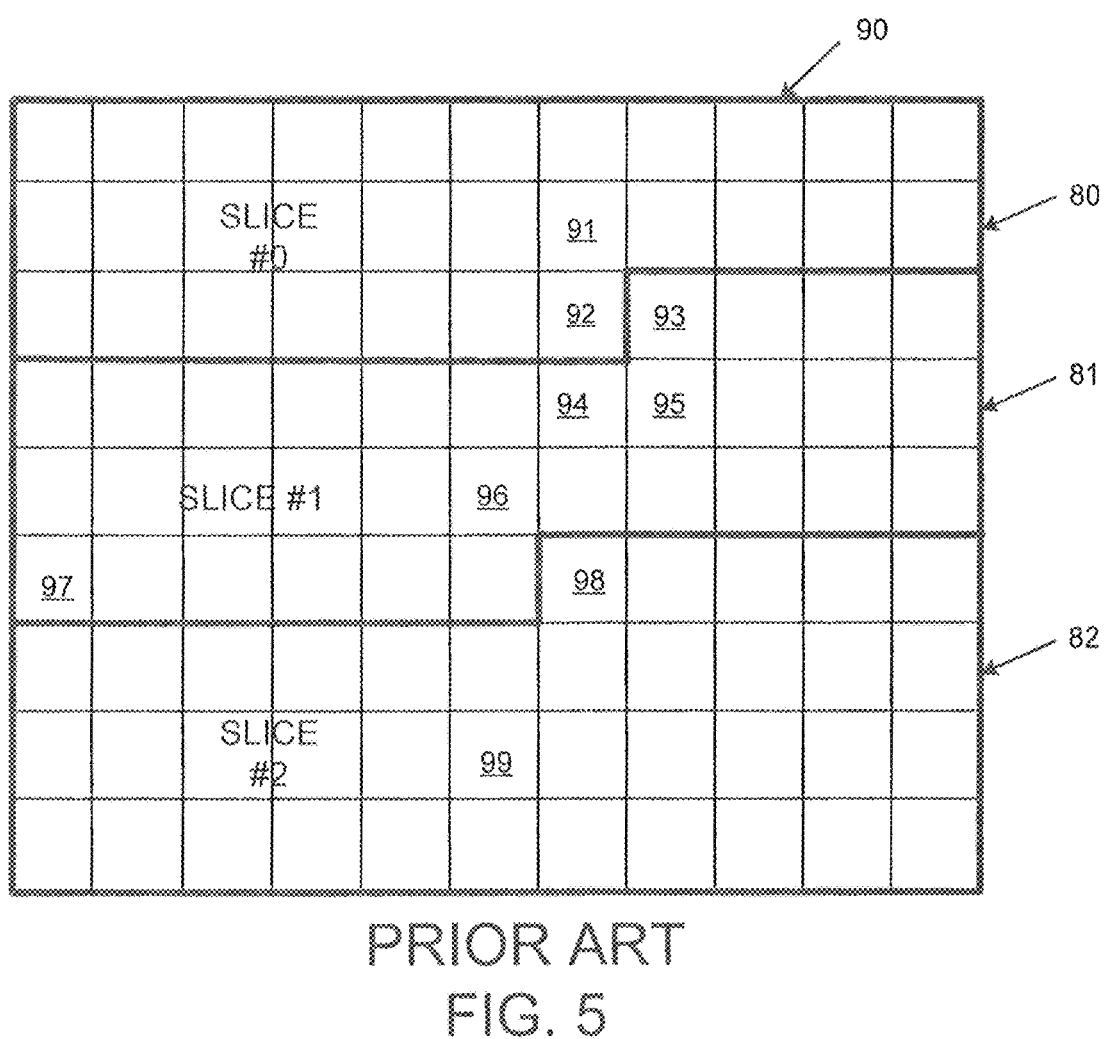
FIG. 5 illustrates an exemplary slice structure.

FIG. 5 illustrates an exemplary video picture 90 comprising eleven blocks in the horizontal direction and nine blocks in the vertical direction (nine exemplary blocks labeled 91-99). FIG. 5 illustrates three exemplary slices: a first slice denoted "SLICE #0" 80, a second slice denoted "SLICE #1" 81 and a third slice denoted "SLICE #2" 82. The decoder may decode and reconstruct the three slices 80, 81, 82 in parallel. Each of the slices may be transmitted in scan line order in a sequential manner. At the beginning of the decoding/reconstruction process for each slice, context models are initialized or reset and blocks in other slices are marked as unavailable for both entropy decoding and block reconstruction. The context model generally represents the state of the entropy encoder and/or decoder. Thus, for a block, for example, the block labeled 93, in "SLICE #1," blocks (for example, blocks labeled 91 and 92) in "SLICE #0" may not be used for context model selection or reconstruction. Whereas, for a block, for example, the block labeled 95, in "SLICE #1," other blocks (for example, blocks labeled 93 and 94) in "SLICE #1" may be used for context model selection or reconstruction. Therefore, entropy decoding and block reconstruction proceeds serially within a slice. Unless slices are defined using a flexible block ordering (FMO), blocks within a slice are processed in the order of a raster scan.

Flexible block ordering defines a slice group to modify how a picture is partitioned into slices. The blocks in a slice group are defined by a block-to-slice-group map, which is signaled by the content of the picture parameter set and additional information in the slice headers. The block-to-slice-group map consists of a slice-group identification number for each block in the picture. The slice-group identification number specifies to which slice group the associated block belongs. Each slice group may be partitioned into one or more slices, wherein a slice is a sequence of blocks within the same slice group that is processed in the order of a raster scan within the set of blocks of a particular slice group. Entropy decoding and block reconstruction proceeds serially within a slice group.

FIG. 5 depicts an exemplary block allocation into three slice groups: a first slice group denoted "SLICE GROUP #0" 103, a second slice group denoted "SLICE GROUP #1" 104 and a third slice group denoted "SLICE GROUP #2" 105. These slice groups 103, 104, 105 may be associated with two foreground regions and a background region, respectively, in the picture 90.

Figure 6:
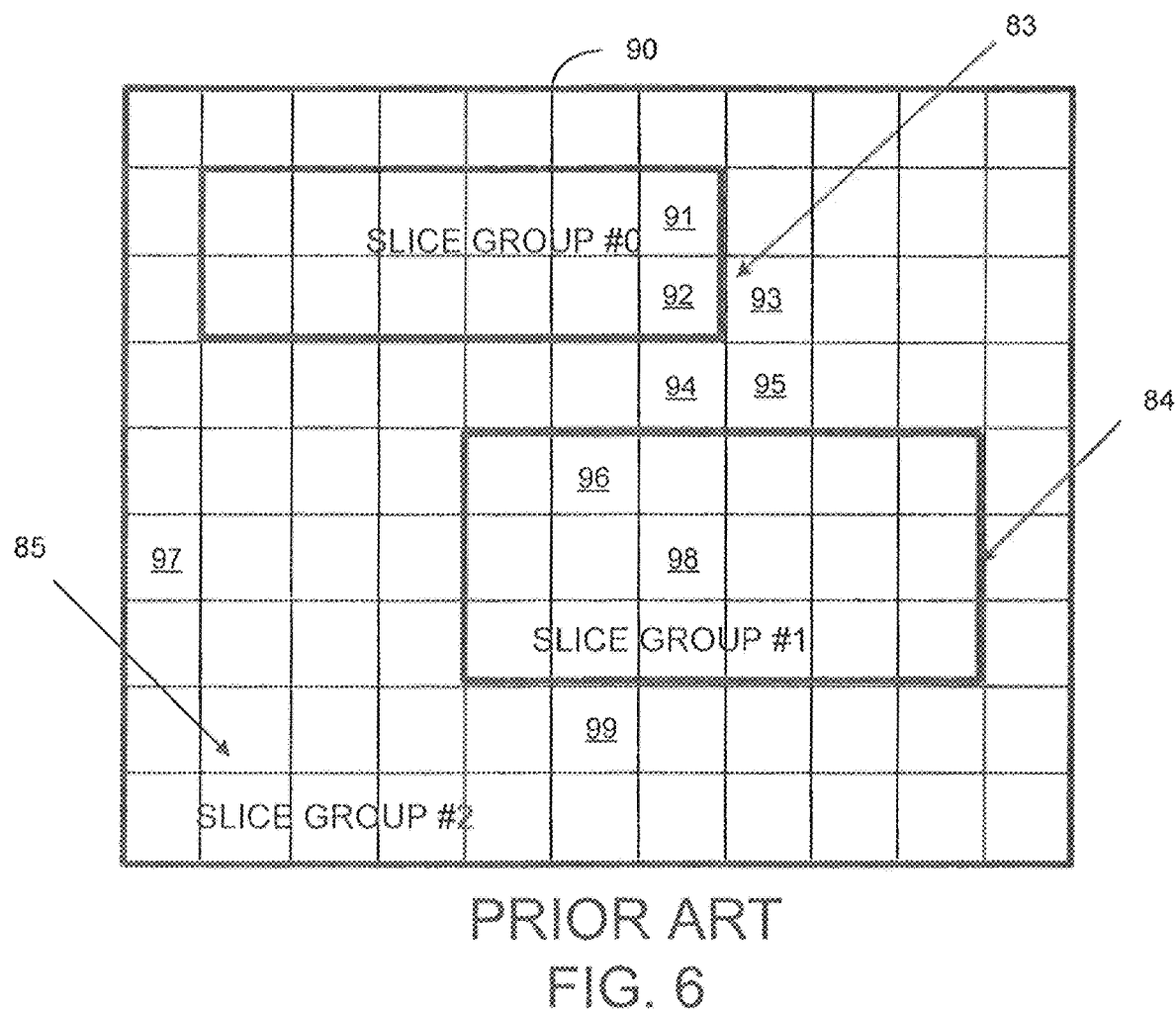
FIG. 6 illustrates another exemplary slice structure.

The arrangement of slices, as illustrated in FIG. 5, may be limited to defining each slice between a pair of blocks in the image scan order, also known as raster scan or a raster scan order. This arrangement of scan order slices is computationally efficient but does not tend to lend itself to the highly efficient parallel encoding and decoding. Moreover, this scan order definition of slices also does not tend to group smaller localized regions of the image together that are likely to have common characteristics highly suitable for coding efficiency. The arrangement of slices, as illustrated in FIG. 6, is highly flexible in its arrangement but does not tend to lend itself to high efficient parallel encoding or decoding. Moreover, this highly flexible definition of slices is computationally complex to implement in a decoder.

Figure 7:
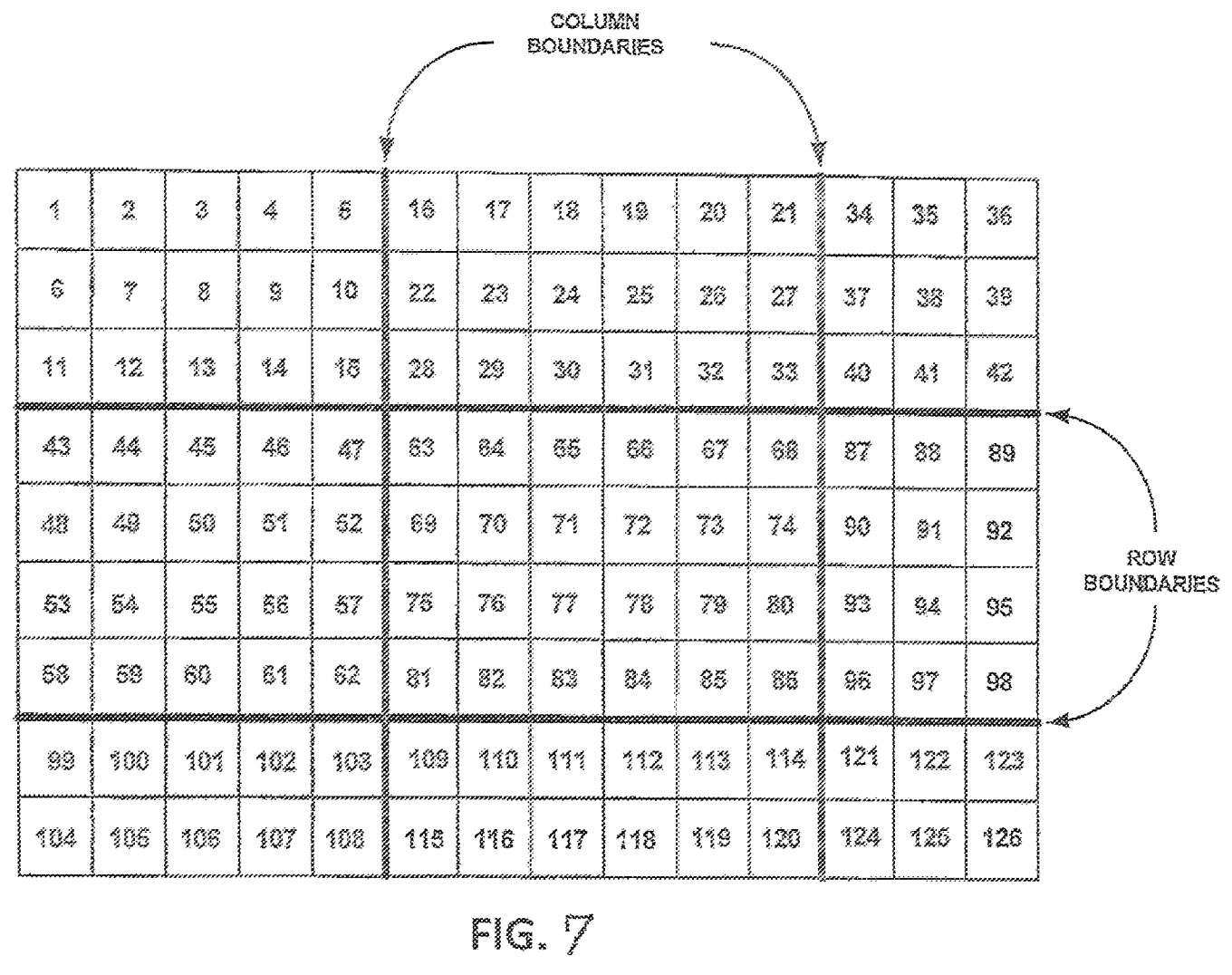

Referring to FIG. 7, a tile technique divides an image into a set of rectangular (inclusive of square) regions. The blocks (alternatively referred to as largest coding units or coding tree blocks in some systems) within each of the tiles are encoded and decoded in a raster scan order. The arrangement of tiles are likewise encoded and decoded in a raster scan order. Accordingly, there may be any suitable number of column boundaries (e.g., 0 or more) and there may be any suitable number of row boundaries (e.g., 0 or more). Thus, the frame may define one or more slices, such as the one slice illustrated in FIG. 7. In some embodiments, blocks located in different tiles are not available for intra-prediction, motion compensation, entropy coding context selection or other processes that rely on neighboring block information.

Figure 8:
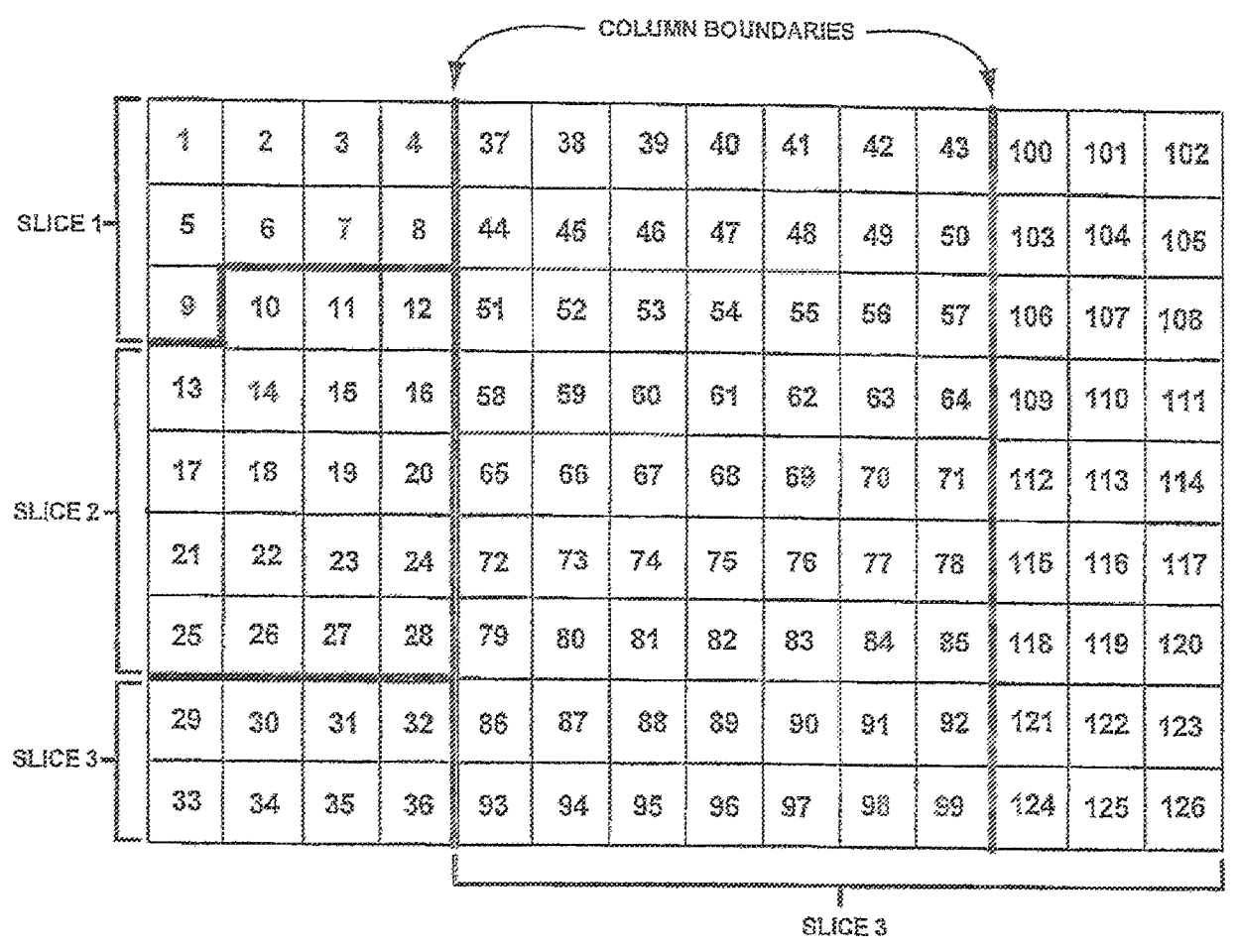

Referring to FIG. 8, the tile technique is shown dividing an image into a set of three rectangular columns. The blocks (alternatively referred to as largest coding units or coded treeblocks in some systems) within each of the tiles are encoded and decoded in a raster scan order. The tiles are likewise encoded and decoded in a raster scan order. One or more slices may be defined in the scan order of the tiles. Each of the slices are independently decodable. For example, slice 1 may be defined as including blocks 1-9, slice 2 may be defined as including blocks 10-28, and slice 3 may be defined as including blocks 29-126 which spans three tiles. The use of tiles facilitates coding efficiency by processing data in more localized regions of a frame.

In one embodiment, the entropy encoding and decoding process is initialized at the beginning of each tile. At the encoder, this initialization may include the process of writing remaining information in the entropy encoder to the bit-stream, a process known as flushing, padding the bit-stream with additional data to reach one of a pre-defined set of bit-stream positions, and setting the entropy encoder to a known state that is pre-defined or known to both the encoder and decoder. Frequently, the known state is in the form of a matrix of values. Additionally, a pre-defined bit-stream location may be a position that is aligned with a multiple number of bits, e.g. byte aligned. At the decoder, this initialization process may include the process of setting the entropy decoder to a known state that is known to both the encoder and decoder and ignoring bits in the bit-stream until reading from a pre-defined set of bit-stream positions.

In some embodiments, multiple known states are available to the encoder and decoder and may be used for initializing the entropy encoding and/or decoding processes. Traditionally, the known state to be used for initialization is signaled in a slice header with an entropy initialization indicator value. With the tile technique illustrated in FIG. 7 and FIG. 8, tiles and slices are not aligned with one another. Thus, with the tiles and slices not being aligned, there would not traditionally be an entropy initialization indicator value transmitted for tiles that do not contain a first block in raster scan order that is co-located with the first block in a slice. For example referring to FIG. 7, block 1 is initialized using the entropy initialization indicator value that is transmitted in the slice header but there is no similar entropy initialization indicator value for block 16 of the next the and it may use the entropy initialization indicator value that is transmitted in the slice header. Similarly, entropy initialization indicator information is not typically present for blocks 34, 43, 63, 87, 99, 109, and 121 for the corresponding tiles for the single slice (which has a slice header for block 1) and may use the entropy initialization indicator value that is transmitted in the slice header.

Referring to FIG. 8, in a similar manner for the three slices, an entropy initialization indicator value is provided in the slice headers for block 1 of slice 1, provided in the slice header for block 10 of slice 2, and provided in the slice header for block 29 of slice 3. However, in a manner similar to FIG. 7, there lacks an entropy initialization indicator value for the central the (starting with block 37) and the right hand the (starting with block 100). Without the entropy initialization indicator value for the middle and right hand tiles, it is problematic to efficiently encode and decode the blocks of the tiles in a parallel fashion and with high coding efficiency. As a general matter the encoder and/or decoder may partition a picture into one or more slices and/or one or more tiles. The tiles typically include a plurality of square coding blocks with sizes such as 4×4; 8×8; 16×16; 32×32; and 64×64. A group of coding blocks adjacent to one another may be grouped together to form what is generally referred to as a largest coding unit and/or a coding tree block. Typically there is more than one coding tree block (e.g., largest coding unit) within the slice. Typically there is more than one coding tree block (e.g., largest coding unit) within the tile.

Referring again to FIG. 7, the decoder knows the location of block 16 in the picture frame but due to entropy encoding is not aware of the positions of bits describing block 16 in the bitstream until block 15 is entropy decoded. This manner of decoding and identifying the next block maintains a low bit overhead, which is desirable. However, it does not facilitate tiles to be decoded in parallel. To increase the ability to identify a specific position in the bit-stream for a specific tile in a frame, so that the different tiles may be simultaneously decoded in parallel in the decoder without waiting for completion of the entropy decoding, a signal may be included in the bitstream identifying the location of tiles in the bit-stream. In an example, the signaling of the location of tiles in the bit-stream is provided in the header of a slice. In an example, if a flag indicates that the location of tiles in the bitstream is transmitted within the slice, then in addition to the location within the slice of the first block of each of the tile(s) within the slice it also may include the number of such tiles within the frame. Further, the location information may be included for only a selected set of tiles, if desired.

It is to be understood that in some cases the video coding may optionally not include tiles, and may optionally include the use of a wave front encoding/decoding pattern for the frames of the video. In this manner, one or more lines of the video (such as a plurality of groups of one or more rows of coded tree blocks, each of which group being representative of a wavefront substream may be encoded/decoded in a parallel fashion. In general, the partitioning of the video may be constructed in any suitable manner. Accordingly, the low bit rate entry point signaling techniques may likewise be applicable to other aspects of the bitstream, such as signaling the length of wavefront substreams.

Video coding standards often compress video data for transmission over a channel with limited frequency bandwidth and/or limited storage capacity. These video coding standards may include multiple coding stages such as intra prediction, transform from spatial domain to frequency domain, quantization, entropy coding, motion estimation, and motion compensation, in order to more effectively encode and decode frames. Many of the coding and decoding stages are unduly computationally complex or otherwise may not operate in an optimal manner.

The video coding and/or decoding technique, especially suitable for tiles, slices, and wavefronts may be any suitable technique, such as those disclosed in the High Efficiency Video Coding (HEVC) and its extensions such as, Scalable High Efficiency Video Coding (SHVC), and Multi-view High Efficiency Video Coding (MVHEVC). The HEVC standard is described in the document "ITU-T Recommendation H.265, "High efficiency video coding," SERIES H: AUDIOVISUAL AND MULTIMEDIA SYSTEMS Infrastructure of audiovisual services—Coding of moving video (04/2013)," which is incorporated by reference in its entirety herein. The text draft for MV-HEVC is given in the document "MV-HEVC Draft Text 7," JCT3V-G1004, and "MV-HEVC Draft Text 8", JCT3V-H1002_v5.doc, Valencia, May 2014, each of which is incorporated by reference in its entirety herein. The text draft for SHVC is given in the document "High Efficiency Video Coding (HEVC) Scalable Extension Draft 6," JCTVC-Q1008_v3.doc, and "High Efficiency Video Coding (HEVC) Range Extension Draft 7", JCTVC-Q1005_v9.doc, Valencia, May 2014, each of which is incorporated by reference in its entirety herein.

Suitable definitions for the aforementioned HEVC, SHVC, and MV-HEVC include the following:

\* Multiplication, including matrix multiplication.

/ Integer division with truncation of the result toward zero. For example, 7/4 and −7/−4 are truncated to 1 and −7/4 and 7/−4 are truncated to −1.

÷ Used to denote division in mathematical equations where no truncation or rounding is intended.

x?y: z If x is TRUE or not equal to 0, evaluates to the value of y; otherwise, evaluates to the value of z.

x>>y Arithmetic right shift of a two's complement integer representation of x by y binary digits. This function is defined only for non-negative integer values of y. Bits shifted into the MSBs as a result of the right shift have a value equal to the MSB of x prior to the shift operation.

x<<y Arithmetic left shift of a two's complement integer representation of x by y binary digits. This function is defined only for non-negative integer values of y. Bits shifted into the LSBs as a result of the left shift have a value equal to 0.

Log 2(x) the base-2 logarithm of x $$\mathrm{Min}(x, y) = \begin{cases} x; & x <= y \\ y; & x > y \end{cases}$$

$$\mathrm{Max}(x, y) = \begin{cases} x; & x >= y \\ y; & x < y \end{cases}$$

$$\mathrm{Clip3}(x, y, z) = \begin{cases} x; & z < x \\ y; & z > y \\ z; & \text{otherwise} \end{cases}$$

The following relational operators are defined as follows:
> Greater than.
>= Greater than or equal to.
< Less than.
<= Less than or equal to.
== Equal to.
!= Not equal to.

When a relational operator is applied to a syntax element or variable that has been assigned the value "na" (not applicable), the value "na" is treated as a distinct value for the syntax element or variable. The value "na" is considered not to be equal to any other value.

Ceil(x) corresponds to the smallest integer greater than or equal to x.

read_bits(n) reads the next n bits from the bitstream and advances the bitstream pointer by n bit positions. When n is equal to 0, read_bits(n) is specified to return a value equal to 0 and to not advance the bitstream pointer.

u(n) corresponds to unsigned integer using n bits. When n is "v" in the syntax table, the number of bits varies in a manner dependent on the value of other syntax elements. The parsing process for this descriptor is specified by the return value of the function read_bits(n) interpreted as a binary representation of an unsigned integer with most significant bit written first.

ue(v) corresponds to unsigned integer 0-th order Exp-Golomb-coded syntax element with the left bit first.

The samples are processed in units of coding tree blocks. The array size for each luma coding tree block in both width and height is CtbSizeY in units of samples. The width and height of the array for each chroma coding tree block are CtbWidthC and CtbHeightC, respectively, in units of samples. The variables CtbSizeY and CtbSizeC may be derived using syntax elements signaled in the sequence parameter set.

For a CABAC context, the variable pStateIdx corresponds to a probability state index and the variable valMps corresponds to the value of the most probable symbol.

The syntax element dependent_slice_segments_enabled_flag is signaled in picture parameter set. dependent_slice_segments_enabled_flag equal to 1 specifies the presence of the syntax element dependent_slice_segment_flag in the slice segment headers for coded pictures referring to the PPS. dependent_slice_segments_enabled_flag equal to 0 specifies the absence of the syntax element dependent_slice_segment_flag in the slice segment headers for coded pictures referring to the PPS.

The syntax element end_of_slice_segment_flag is signaled in slice segment data. end_of_slice_segment_flag equal to 0 specifies that another coding tree unit is following in the slice. end_of_slice_segment_flag equal to 1 specifies the end of the slice segment, i.e. that no further coding tree unit follows in the slice segment.

The syntax element dependent_slice_segment_flag is signaled in the slice segment header. dependent_slice_segment_flag equal to 1 specifies that the value of each slice segment header syntax element that is not present is inferred to be equal to the value of the corresponding slice segment header syntax element in the slice header. When not present, the value of dependent_slice_segment_flag is inferred to be equal to 0.

When wave front encoding/decoding pattern for the frames of the video is used then the slice segment header syntax element 'entropy_coding_sync_enabled_flag' is signaled with its value set equal to 1.

Scaling list data is signaled in picture parameter set and is used in the derivation of values assigned to the elements of a 4-dimensional array ScalingFactor.

BitDepthY is the bit depth of the samples of the luma array.

BitDepthC is the bit depth of the samples of the chroma arrays.

The syntax element extended_precision_processing_flag is signaled in Sequence parameter set range extensions. extended_precision_processing_flag equal to 1 specifies that an extended dynamic range is used for inter prediction interpolation and inverse transform processing. extended_precision_processing_flag equal to 0 specifies that the extended dynamic range is not used. When not present, the value of extended_precision_processing_enabled_flag is inferred to be equal to 0.

The variables CoeffMinY, CoeffMinC, CoeffMaxY and CoeffMaxC are derived as follows:

CoeffMin$Y$=−(1<<(extended_precision_processing_flag?Max(15,BitDepth$Y$+6): 15))

CoeffMin$C$=−(1<<(extended_precision_processing_flag?Max(15,BitDepth$C$+6): 15))

CoeffMax$Y$=(1<<(extended_precision_processing_flag?Max(15,BitDepth$Y$+6): 15))−1

CoeffMax$C$=(1<<(extended_precision_processing_flag?Max(15,BitDepth$C$+6): 15))−1

CuPredMode[xTbY][yTbY] is the prediction mode of the coding unit for a corresponding location (xTbY, yTbY).

MODE_INTRA corresponds to intra-coding mode.

MODE_INTER corresponds to inter-coding mode.

The transform coefficient levels are represented by the arrays TransCoeffLevel[x0][y0][cIdx][xC][yC]. The array indices x0, y0 specify the location (x0, y0) of the top-left luma sample of the considered transform block relative to the top-left luma sample of the picture. The array index cIdx specifies an indicator for the colour component; it is equal to 0 for Y, 1 for Cb, and 2 for Cr. The array indices xC and yC specify the transform coefficient location (xC, yC) within the current transform block. When the value of TransCoeffLevel [x0][y0][cIdx][xC][yC] is not specified, it is inferred to be equal to 0.

The variable PicSizeInCtbsY corresponds to the number of coding tree blocks in luma component of the picture.

The variable CtbAddrInRs corresponds to coding tree block address in raster scan order.

The variable CtbAddrInTs corresponds to coding tree block address in tile scan order.

The list CtbAddrRsToTs[ctbAddrRs] specifies the conversion from a coding tree block address in raster scan to coding tree block address in tile scan.

The list TileId[ctbAddrTs] for ctbAddrTs ranging from 0 to PicSizeInCtbsY−1, inclusive, specifies the conversion from a coding tree block address in tile scan to a tile ID.

pic_width_in_luma_samples specifies the width of each decoded picture in units of luma samples. The variable PicWidthInCtbsY corresponds to Ceil(pic_width_in_luma_samples÷CtbSizeY).

The variable PredictorPaletteSize specifies the size of the palette table predictor.

The variable PreviousPaletteSize specifies the size of the previously coded palette table.

The variable PredictorPaletteEntries specifies the entries within the palette table predictor.

In particular, the aforementioned HEVC, SHVC, and MV-HEVC include the following flag to specify wavefronts and dependent slices. Dependent slices allow data associated with a particular wavefront entry point or tile to be carried in a separate NAL unit, and thus potentially make that data available to a system for fragmented packetization with lower latency than if it were all coded together in one slice. A dependent slice for a wavefront entry point can only be decoded after at least part of the decoding process of another slice segment has been performed. A plurality of dependent slices together form a slice.

The syntax element entropy_coding_sync_enabled_flag may be signaled in the picture parameter set. 'entropy_coding_sync_enabled_flag' equal to 1 specifies that a specific synchronization process for context variables is invoked before decoding the coding tree unit which includes the first coding tree block of a row of coding tree blocks in each tile in each picture referring to the PPS, and a specific storage process for context variables is invoked after decoding the coding tree unit which includes the second coding tree block of a row of coding tree blocks in each tile in each picture referring to the PPS. entropy_coding_sync_enabled_flag equal to 0 specifies that no specific synchronization process for context variables is required to be invoked before decoding the coding tree unit which includes the first coding tree block of a row of coding tree blocks in each tile in each picture referring to the PPS, and no specific storage process for context variables is required to be invoked after decoding the coding tree unit which includes the second coding tree block of a row of coding tree blocks in each tile in each picture referring to the PPS.

It may be a requirement of bitstream conformance that the value of entropy_coding_sync_enabled_flag shall be the same for all PPSs that are activated within a coded video sequence (CVS).

When entropy_coding_sync_enabled_flag is equal to 1 and the first coding tree block in a slice is not the first coding tree block of a row of coding tree blocks in a tile, it is a requirement of bitstream conformance that the last coding tree block in the slice shall belong to the same row of coding tree blocks as the first coding tree block in the slice.

When entropy_coding_sync_enabled_flag is equal to 1 and the first coding tree block in a slice segment is not the first coding tree block of a row of coding tree blocks in a tile, it is a requirement of bitstream conformance that the last coding tree block in the slice segment shall belong to the same row of coding tree blocks as the first coding tree block in the slice segment.

When tiles are not enabled and entropy_coding_sync_enabled_flag is equal to 1, each subset of slice segment data corresponding to entry points shall consist of all coded bits of all coding tree units in the slice segment that include luma coding tree blocks that are in the same luma coding tree block row of the picture, and the number of subsets shall be equal to the number of coding tree block rows of the picture that contain coding tree units that are in the coded slice segment.

When tiles are enabled and entropy_coding_sync_enabled_flag is equal to 1, each subset of slice segment data corresponding to entry points shall consist of all coded bits of all coding tree units in the slice segment that include luma coding tree blocks that are in the same luma coding tree block row of a tile, and the number of subsets shall be equal to the number of luma coding tree block rows of a tile that contain coding tree units that are in the coded slice segment.

The initialization process of the CABAC parsing process is invoked when starting the parsing of one or more of the following:

the slice segment data syntax the coding tree unit syntax and the coding tree unit is the first coding tree unit in a tile the coding tree unit syntax, entropy_coding_sync_enabled_flag is equal to 1, and the associated luma coding tree block is the first luma coding tree block in a coding tree unit row While parsing the slice segment data the storage process for context variables and Rice parameter initialization states is applied as follows:

When ending the parsing of the coding tree unit syntax, entropy_coding_sync_enabled_flag is equal to 1, and either CtbAddrInRs % PicWidthInCtbsY is equal to 1 or both CtbAddrInRs is greater than 1 and TileId[CtbAddrInTs] is not equal to TileId[CtbAddrRsToTs[CtbAddrInRs−2]], the storage process for context variables and Rice parameter initialization is invoked with TableStateIdxWpp, TableMpsValWpp, and TableStatCoeffWpp as outputs.

When ending the parsing of the general slice segment data syntax, dependent_slice_segments_enabled_flag is equal to 1 and end_of_slice_segment_flag is equal to 1, the storage process for context variables and Rice parameter initialization states is invoked with TableStateIdxDs, TableMpsValDs, and TableStatCoeffDs as outputs.

The initialization process of the CABAC parsing process is specified as follows:

Outputs of this process are initialized CABAC internal variables and the initialized Rice parameter initialization states StatCoeff.

The context variables of the arithmetic decoding engine are initialized as follows:
  If the coding tree unit is the first coding tree unit in a tile, the following applies:
    The initialization process for context variables is invoked.
    The variables StatCoeff[k] are set equal to 0, for k in the range 0 to 3, inclusive.
  Otherwise, if entropy_coding_sync_enabled_flag is equal to 1 and either CtbAddrInRs % PicWidthInCtbsY is equal to 0 or TileId[CtbAddrInTs] is not equal to TileId[CtbAddrRsToTs[CtbAddrInRs−1]], the following applies:
    The location (xNbT, yNbT) of the top-left luma sample of the spatial neighbouring block T is derived using the location (x0, y0) of the top-left luma sample of the current coding tree block as follows:

$(xNbT,yNbT)=(x0+CtbSizeY,y0-CtbSizeY)$

The availability derivation process for a block in z-scan order is invoked with the location (xCurr, yCurr) set equal to (x0, y0) and the neighbouring location (xNbY, yNbY) set equal to (xNbT, yNbT) as inputs, and the output is assigned to availableFlagT.
    The synchronization process for context variables is invoked as follows:
      If availableFlagT is equal to 1, the synchronization process for context variables and Rice parameter initialization states is invoked with TableStateIdx-Wpp, TableMpsValWpp, and TableStatCoeffWpp as inputs.
      Otherwise, the following applies:
        The initialization process for context variables is invoked.
        The variables StatCoeff[k] are set equal to 0, for k in the range 0 to 3, inclusive.
  Otherwise, if CtbAddrInRs is equal to slice_segment_address and dependent_slice_segment_flag is equal to 1, the synchronization process for context variables and Rice parameter initialization states is invoked with TableStateIdxDs, TableMpsValDs, and TableStatCoeffDs as inputs.
  Otherwise, the following applies:
    The initialization process for context variables is invoked.
    The variables StatCoeff[k] are set equal to 0, for k in the range 0 to 3, inclusive.
The initialization process for the arithmetic decoding engine is invoked The storage process for context variables and Rice parameter initialization states may be as described below.

Inputs to this process are: The CABAC context variables indexed by ctxTable and ctxIdx. The Rice parameter initialization states indexed by k.

Outputs of this process are: The variables tableStateSync and tableMPSSync containing the values of the variables pStateIdx and valMps used in the initialization process of context variables and Rice parameter initialization states that are assigned to all syntax elements in: General slice segment data syntax, Coding tree unit syntax, Sample adaptive offset syntax, Coding quadtree syntax, Coding unit syntax, Prediction unit syntax, PCM sample syntax, Transform tree syntax, Motion vector difference syntax, Transform unit syntax, Residual coding syntax, except a subset of pre-determined syntax elements. The variables tableStatCoeffSync containing the values of the variables StatCoeff[k] used in the initialization process of context variables and Rice parameter initialization states.

For each context variable, the corresponding entries pStateIdx and valMps of tables tableStateSync and tableMPSSync are initialized to the corresponding pStateIdx and valMps.

For each Rice parameter initialization state k, each entry of the table tableStatCoeffSync is initialized to the corresponding value of StatCoeff[k].

The synchronization process for context variables and Rice parameter initialization states may be as described below.

The inputs to the process are: The variables tableState-Sync and tableMPSSync containing the values of the variables pStateIdx and valMps used in the storage process of context variables that are assigned to all syntax elements in: General slice segment data syntax, Coding tree unit syntax, Sample adaptive offset syntax, Coding quadtree syntax, Coding unit syntax, Prediction unit syntax, PCM sample syntax, Transform tree syntax, Motion vector difference syntax, Transform unit syntax, Residual coding syntax, except a subset of pre-determined syntax elements. The variable tableStatCoeffSync containing the values of the variables StatCoeff[k] used in the storage process of context variables and Rice parameter initialization states.

Outputs of this process are: The initialized CABAC context variables indexed by ctxTable and ctxIdx. The initialized Rice parameter initialization states StatCoeff indexed by k.

For each context variable, the corresponding context variables pStateIdx and valMps are initialized to the corresponding entries pStateIdx and valMps of tables tableState-Sync and tableMPSSync.

For each Rice parameter initialization state, each variable StatCoeff[k] is initialized to the corresponding entry of table tableStatCoeffSync.

The context variables of the arithmetic decoding engine are initialized as follows:
  If the coding tree unit is the first coding tree unit in a tile, the initialization process for context variables is invoked.
  Otherwise, if entropy_coding_sync_enabled_flag is equal to 1 and before decoding the coding tree unit which includes the first coding tree block of a row of coding tree blocks in each tile in each picture referring to the PPS, the following applies:
    The location (xNbT, yNbT) of the top-left luma sample of the spatial neighbouring block T is derived using the location (x0, y0) of the top-left luma sample of the current coding tree block as follows: (xNbT, yNbT)= (x0+CtbSizeY, y0−CtbSizeY)
    The availability for a block in z-scan order with the current location (x0, y0) and neighbouring location (xNbT, yNbT) is determined and assigned to availableFlagT.
    The synchronization process for context variables is invoked as follows:
      If availableFlagT is equal to 1, the synchronization process for context variables is invoked with TableStateIdxWpp and TableMpsValWpp as inputs.
      Otherwise, the initialization process for context variables is invoked
  Otherwise, if first CTB in dependent slice, the synchronization process for context variables is invoked with TableStateIdxDs and TableMpsValDs as inputs.
  Otherwise, the initialization process for context variables is invoked.

The dequantization/scaling process for the received video stream is a scaling process for the coefficients and may be described as below.

The inputs to the process may include, for example, the following:

a luma location (xTbY, yTbY) specifying the top-left sample of the current luma transform block relative to the top left luma sample of the current picture, a variable nTbS specifying the size of the current transform block, a variable cIdx specifying the colour component of the current block, a variable qP specifying the quantization parameter.

The outputs to the process may include, for example, a (nTbS)×(nTbS) array d of scaled transform coefficients with elements d[x][y].

The variables log 2TransformRange, bdShift, coeffMin and coeffMax are derived as follows:

If cIdx is equal to 0, log 2TransformRange=extended_precision_processing_flag?Max(15,BitDepth$_Y$+6): 15 bdShift=BitDepthy+Log 2(*nTbS*)+10−log 2TransformRange coeffMin=CoeffMin$_Y$ coeffMax=CoeffMax$_Y$ Otherwise, log 2TransformRange=extended_precision_processing_flag?Max(15,BitDepth$_C$+6): 15 bdShift=BitDepth$_C$+Log 2(*nTbS*)+10 log 2TransformRange coeffMin=CoeffMin$_C$ coeffMax=CoeffMax$_C$ The list levelScale[ ] is specified as levelScale[k]={40, 45, 51, 57, 64, 72} with k=0.5.

For the derivation of the scaled transform coefficients d[x][y] with x=0 . . . nTbS−1, y=0 . . . nTbS−1, the following applies:

If one or more of the following conditions are true, m[x][y] is set equal to 16:
  scaling_list_enabled_flag is equal to 0,
  transform_skip_flag[xTbY][yTbY] is equal to 1 and nTbS is greater than 4.
Otherwise, the following applies:
  m[x][y]=ScalingFactor[sizeId][matrixId][x][y]

Where sizeId is the size of the quantization matrix equal to (nTbS)×(nTbS) and matrixId is specified according to sizeId, prediction mode and color component sizeId, CuPredMode[xTbY][yTbY], and cIdx, respectively. An example mapping is shown below:

TABLE (3)

| sizeId | CuPredMode | cIdx (colour component) | matrixId |
|---|---|---|---|
| 0, 1, 2, 3 | MODE_INTRA | 0 (Y) | 0 |
| 0, 1, 2, 3 | MODE_INTRA | 1 (Cb) | 1 |
| 0, 1, 2, 3 | MODE_INTRA | 2 (Cr) | 2 |
| 0, 1, 2, 3 | MODE_INTER | 0 (Y) | 3 |
| 0, 1, 2, 3 | MODE_INTER | 1 (Cb) | 4 |
| 0, 1, 2, 3 | MODE_INTER | 2 (Cr) | 5 |

The scaled transform coefficient d[x][y] may be derived as follows:

d[x][y]=Clip3(coeffMin,coeffMax,((TransCoeffLevel [xTbY][yTbY][cIdx][x][y]*m[x][y]*levelScale [qP %6]<<(qP/6))+(1<<(bdShift−1)))>>bdShift).

A screen capture tool facilitates a computer to record an image displayed on a visual display unit, such as a computer monitor. In a similar manner, for computer generated graphical content, the computer may record an image to be displayed on the visual display unit.

Figure 9:
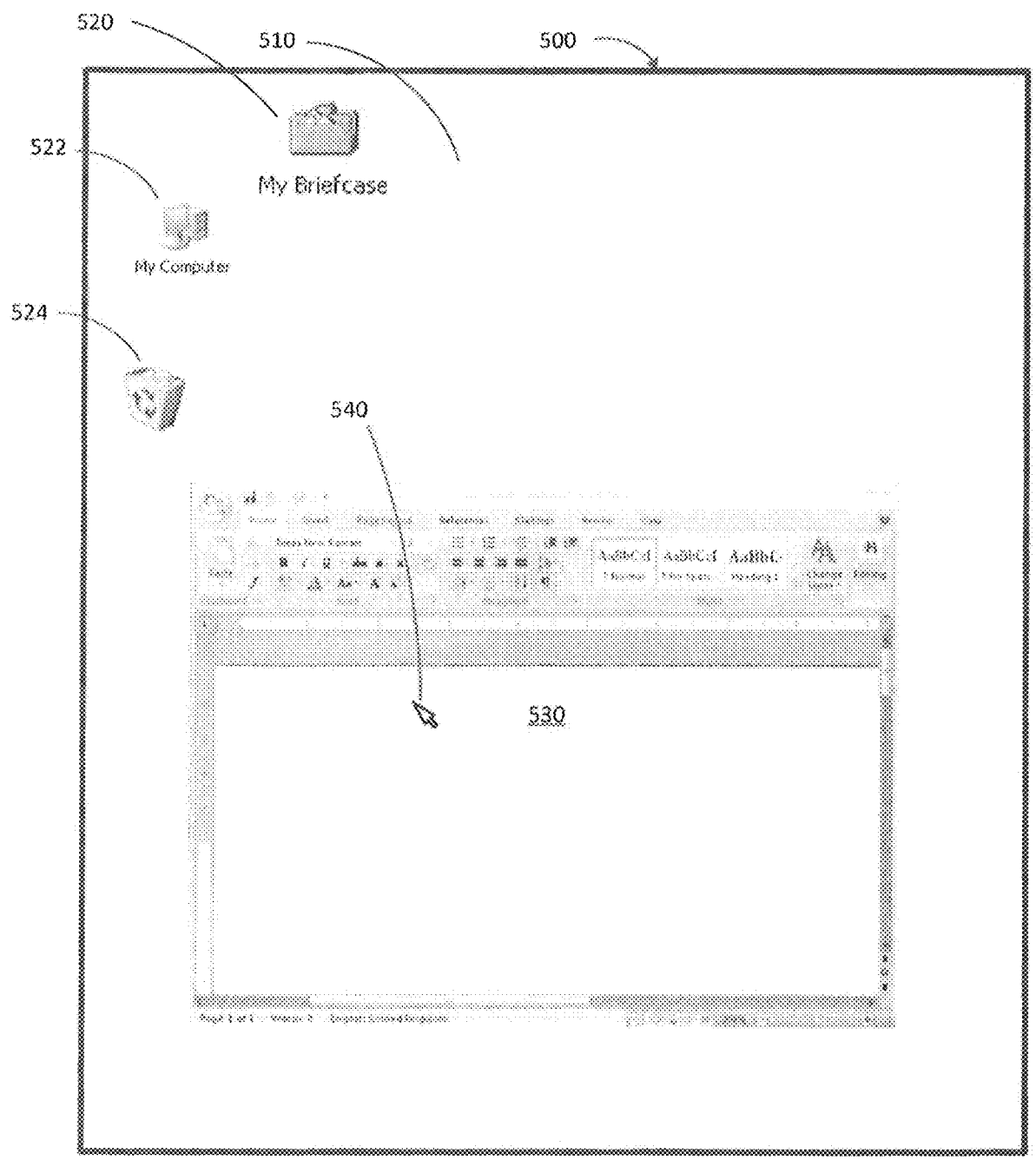
FIG. 9 illustrates a screen with content thereon.

FIG. 9. illustrates a captured screen area 500 of a computer desktop environment. The captured screen area 500 shows the entire desktop, but could instead show only the window 530 or some other portion of the desktop. A cursor graphic 540 overlays the window 530, and several icon graphics 520, 522, 524 overlay the background 510. The captured screen area 500 could be part of a series. Through the series, such as a video sequence, much of the screen content in the captured screen area 500 would probably remain the same. Screen content such as the background 510 and icon graphics 520, 522, 524 usually does not change from frame to frame. On the other hand, the cursor graphic 540 often changes position and shape as the user manipulates a mouse or other input device, and the contents of the window 530 often change as a user types, adds graphics, etc. Like other forms of digital video, screen capture video consumes large amounts of storage and transmission capacity.

Screen capture images may contain a mixture of continuous tone content and palletized content. Continuous tone content includes, for example, photographs or other images with gradually varying colors or tones, and typically uses a range of image tones that appears substantially continuous to the human eye. Palletized content includes, for example, icons, toolbars, and command or notepad windows consisting of a flat color background and foreground text of a contrasting color. A color palette for palletized content typically includes a relatively small set of image colors or tones (e.g., 256 different 24-bit colors). Palletized content often includes areas of perceptually important fine detail—spatially localized, high frequency variations depicting text elements or other image discontinuities.

A series of captured screen areas typically result in a very high bitrate of storing the series or transmitting the series across a network. Compression techniques of captured screen areas are often used to reduce the bitrate. Lossless compression techniques may be used, but the resulting bitrate reduction tends to be limited. Lossy compression techniques can be used, where the resulting bitrate reduction tends to be greater but the quality of the video tends to suffer.

Applying lossy compression to palletized content tends to result in the loss of perceptually important fine detail. For example, text and sharp edges may be blurred or distorted in the decompressed content. As a result, lossless encoding of palletized content is preferred in many circumstances. In some system which desire to trade quality for bitrate, screen capture video may undergo quantization while still being considered as palletized content. On the other hand, in some scenarios it is desirable to encode continuous tone content using only lossless compression if sufficient resources are available. Lossy compression can be used in some systems to effectively compress continuous tone content at a lower bitrate.

Video coders use a variety of different compression techniques. These compression techniques typically involve transforms, quantization, and entropy coding for individual frames, and motion estimation for a series of frames. The compression techniques often include run length encoding and CABAC coding.

Run length encoding is a compression technique used for camera video, audio, text, and other types of content. In general, run length encoding replaces a sequence (i.e., run) of consecutive symbols having the same value with the value and the length of the sequence. In run length decoding, the sequence of consecutive symbols is reconstructed from the run value and run length. The results of run length encoding (e.g., the run values and run lengths) can be coded using CABAC to further reduce bitrate.

In the run length encoding adapted to palletized screen capture content, the encoder encodes runs of color value symbols, above symbols, and/or escape symbols. For a given pixel in a row of a frame, a color value symbol can indicate the color value (e.g., the index to a color palette, or the color component value(s) in some color space) for the given pixel, an above symbol can reference the color value of the pixel just above the given pixel, or an escape symbol can signal the color value of the pixel directly. Some runs can be run length encoded only with the color value symbols for the runs. On the other hand, in some cases, a particular series of pixels might instead be encoded with the above symbol or the escape symbol.

Figure 10:
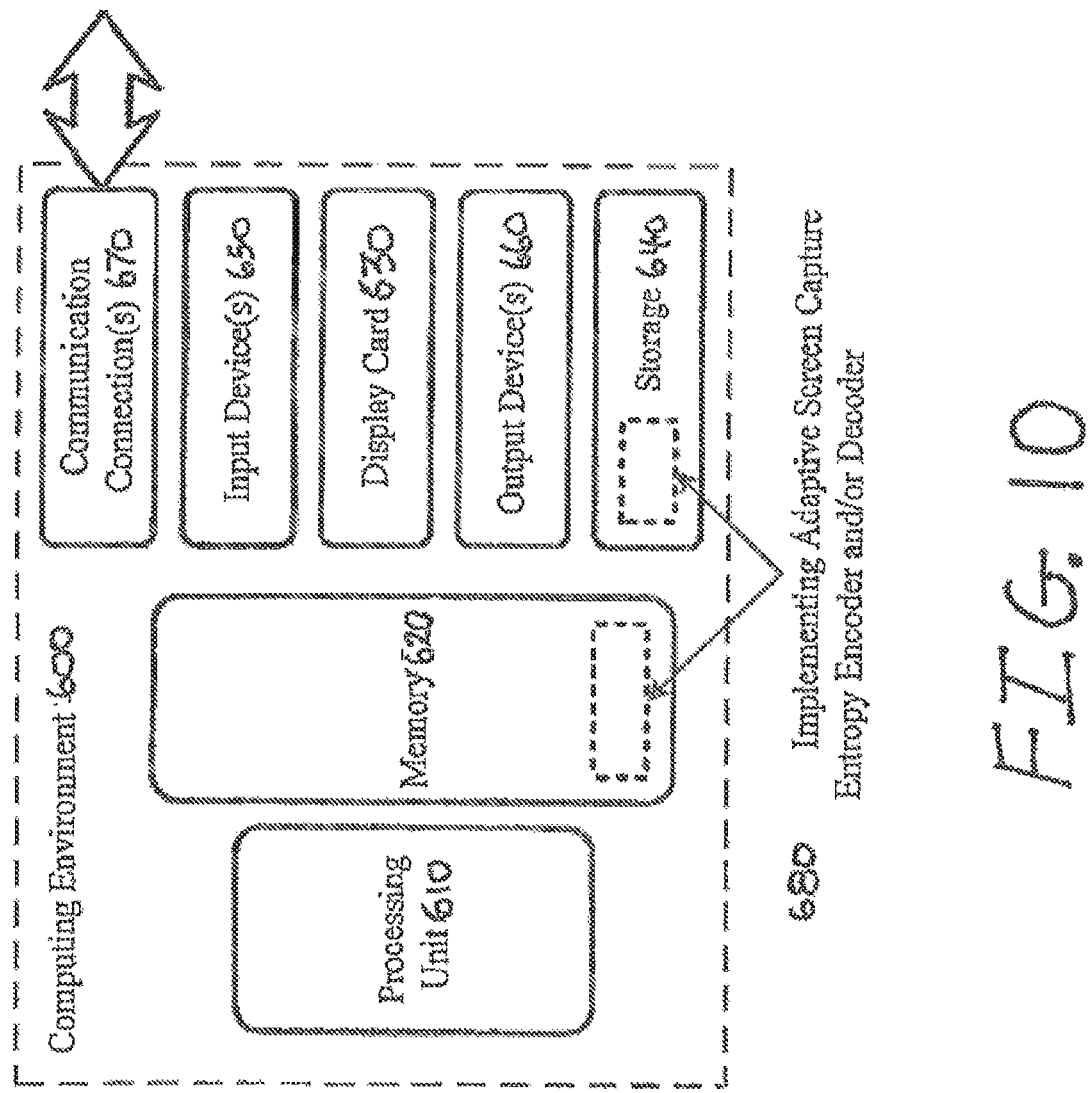
FIG. 10 illustrates another computing environment.

With reference to FIG. 10, a computing environment 600 includes at least one processing unit 610 and memory 620. The processing unit 610 executes computer-executable instructions and may be a real or a virtual processor. In a multi-processing system, multiple processing units execute computer-executable instructions to increase processing power. The memory 620 may be volatile memory (e.g., registers, cache, RAM), non-volatile memory (e.g., ROM, EEPROM, flash memory, etc.), or some combination of the two. The memory 620 stores software 680 implementing an adaptive screen capture entropy encoder and/or decoder.

The computing environment 600 also includes a display card 630. The display card 630 (alternatively called the video card, graphics card, graphics output device, display adapter, video graphics adapter, etc.) delivers output to a visual display unit such as a computer monitor. The display card 630 includes a frame buffer that stores pixel information for display on a screen. The frame buffer is often some type of RAM on the display card 630, but can instead be some other kind of memory and/or not physically located on the display card itself. The display card 630 can include a graphics processor, graphics accelerator, and/or other specialized display hardware. Typically, operating system software (not shown) provides an operating environment for other software executing in the computing environment 600, and coordinates activities of the components of the computing environment 600. In addition, display driver software allows access to various features of the display card 630. The display driver software can work in conjunction with one or more layers of operating system software through which access to the features of the display card 630 is exposed. For example, through such features, a screen capture tool might retrieve pixel information from the frame buffer of the display card 630 for screen content currently displayed on a screen of a visual display unit.

A computing environment may have additional features. For example, the computing environment 600 includes storage 640, one or more input devices 650, one or more output devices 660, and one or more communication connections 670. An inter-connection mechanism (not shown) such as a bus, controller, or network interconnects the components of the computing environment 600.

The storage 640 may be removable or non-removable, and includes magnetic disks, magnetic tapes or cassettes, CD-ROMs, CD-RWs, DVDs, or any other medium which can be used to store information and which can be accessed within the computing environment 600. The storage 640 stores instructions for the software 680 implementing an adaptive screen capture entropy encoder and/or decoder. The input device(s) 650 may be a touch input device such as a keyboard, mouse, pen, or trackball, a voice input device, a scanning device, sound card, TV tuner/video input card, or other device that provides input to the computing environment 600.

The output device(s) 660 may be a visual display unit, printer, speaker, CD-writer, or other device that provides output from the computing environment 600. A visual display unit presents screen content based upon output delivered from the display card 630.

The communication connection(s) 670 enable communication over a communication medium to another computing entity. The communication medium conveys information such as computer-executable instructions, compressed captured screen area information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Within a video bitstream, a palette coding technique may be enabled or disabled by using a "palette_enabled_flag" in a sequence parameter set. This may be signaled when the sps_extension_flag is equal to 1. The sequence parameter set (SPS) may be a syntax structure containing syntax elements that apply to zero or more entire coded video sequences as determined by the content of a syntax element found in the picture parameter set referred to by a syntax element found in each slice segment header. The picture parameter set (PPS) is a syntax structure containing syntax elements that apply to zero or more entire coded pictures as determined by a syntax element found in each slice segment header. The palette_enabled_flag equal to 1 specifies that the palette mode may be used for intra blocks, while the palette_enabled_flag equal to 0 specifies that the palette mode is not applied. When the palette_enabled_flag is not present, the value of the palette_enabled_flag is inferred to be equal to zero.

In an example, the use of palette coding for a block of pixels may be signaled using a flag. In an example, the use of palette coding for a block of pixels may be inferred by the decoder using past data of the bit stream.

Within a video bitstream, the palette coding technique may be enabled or disabled by a "palette_mode_flag" for each coding unit. The palette mode within each coding unit may be signaled when the "palette_enabled_flag" is enabled (==1) and intra mode (CuPredMode [x0][y0]==MODE_INTRA (e.g., intra mode coding of the coding unit). The palette_mode_flag [x0][y0] equal to 1 specifies that the current coding unit is coded using the palette mode, while if the palette_mode_flag [x0][y0] equal to 0 specifies that the current coding unit is not coded using the palette mode. The array indices x0, y0 specify the location (x0, y0) of the top left luma sample of the considered coding block relative to the top left luma sample of the picture. By reference to coder, it is intended to include both the encoder and the decoder.

In an example embodiment palette coding may be used for non-intra modes (e.g. inter mode). In an example embodiment palette coding may be used for non-intra modes (e.g. inter mode) in addition to the intra mode.

Within a video bitstream, the palette coding may be indicated by a "palette_mode_flag" being enabled (i.e., palette_mode_flag is equal to 1). This indicates a palette table is being used and the palette table is generated for the coding unit and each pixel value of the coding unit is coded using the palette table.

Referring to FIG. 11, an exemplary palette table is illustrated for sets of red (R), green (G), and blue (B) pixels, each set of three pixels indicating a particular pixel color. For each of the sets of red, green, and blue pixel values an index value may be assigned. The palette table may indicate the pixel's color in any manner together with any manner of indicating an index. Typically there are pairs of an index and pixel values.

For example, the entries of the palette table may be derived using a histogram of the representative pixel values e.g. quantized pixel values, of the current coding unit in the encoder. In this manner, the system may use pixel values that are quantized to increase the coding efficiency. Based upon the palette table, the representative pixel values of a coding unit are coded and decoded in a suitable manner.

The palette table may be generated for a particular coding unit and the pixels of the coding unit encoded using the generated palette table. Rather than signaling a separate palette table in the bitstream for each subsequent coding unit, it is more efficient to predict, at least a part of, if not all of, the subsequent palette table entries from the previous palette table entries. Those portions of the subsequent palette table that are not predicted based upon the previous palette table may be updated in the bitstream to include new entries in the subsequent palette table. The subsequent palette table may be referred to as a predicted palette table.

Figure 12:
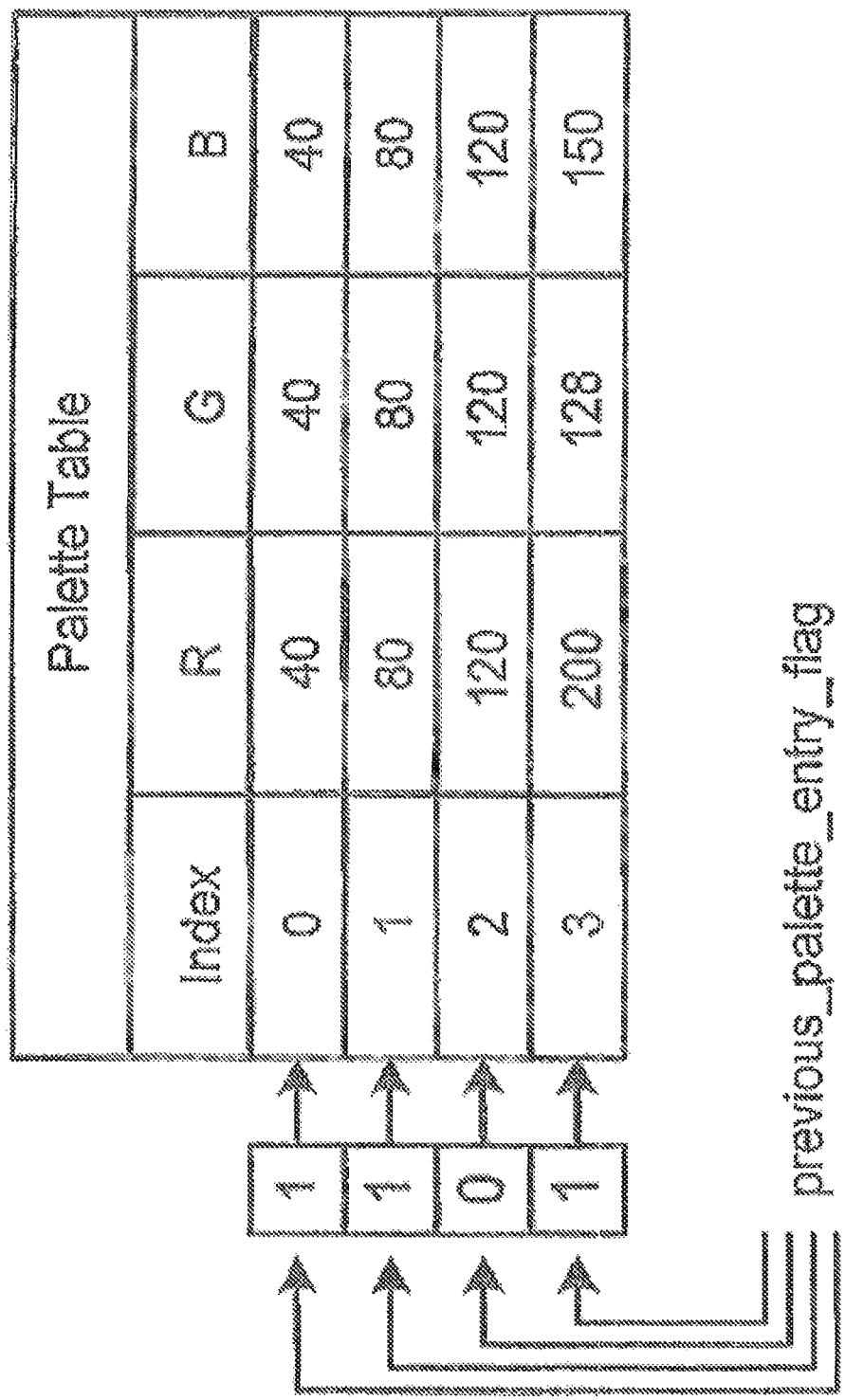
FIG. 12 illustrates a palette table and a set of flags.

Referring to FIG. 12, by way of example the predicted palette table may be based upon a set of flags (e.g., a 1 dimensional table), such as a "previous_palette_entry_flag" for each of the entries in the index. For example, a previous_palette_entry_flag[i]=1 (or otherwise inferred) for i-th index value indicates to maintain the i-th palette table entries from the previous palette table. For example, a previous_palette_entry_flag[i]=0 (or otherwise inferred) for i-th index value indicates to not include the i-th palette table entries from the previous palette table. In an example, the previous_palette_entry_flag[i] is coded for all of the index values of the previous palette table, although some of the entries may be inferred, if desired. Additional palette table entries may be added to the predicted palette table to form an updated palette table for the subsequent coding unit. The previous_palette_entry_flag[i] equal to 1 specifies that the i-th palette entry from the previous used palette is copied, while the previous_palette_entry_flag[i] equal to 0 specifies that the i-th palette entry from the previously used palette is not copied.

Figure 13:
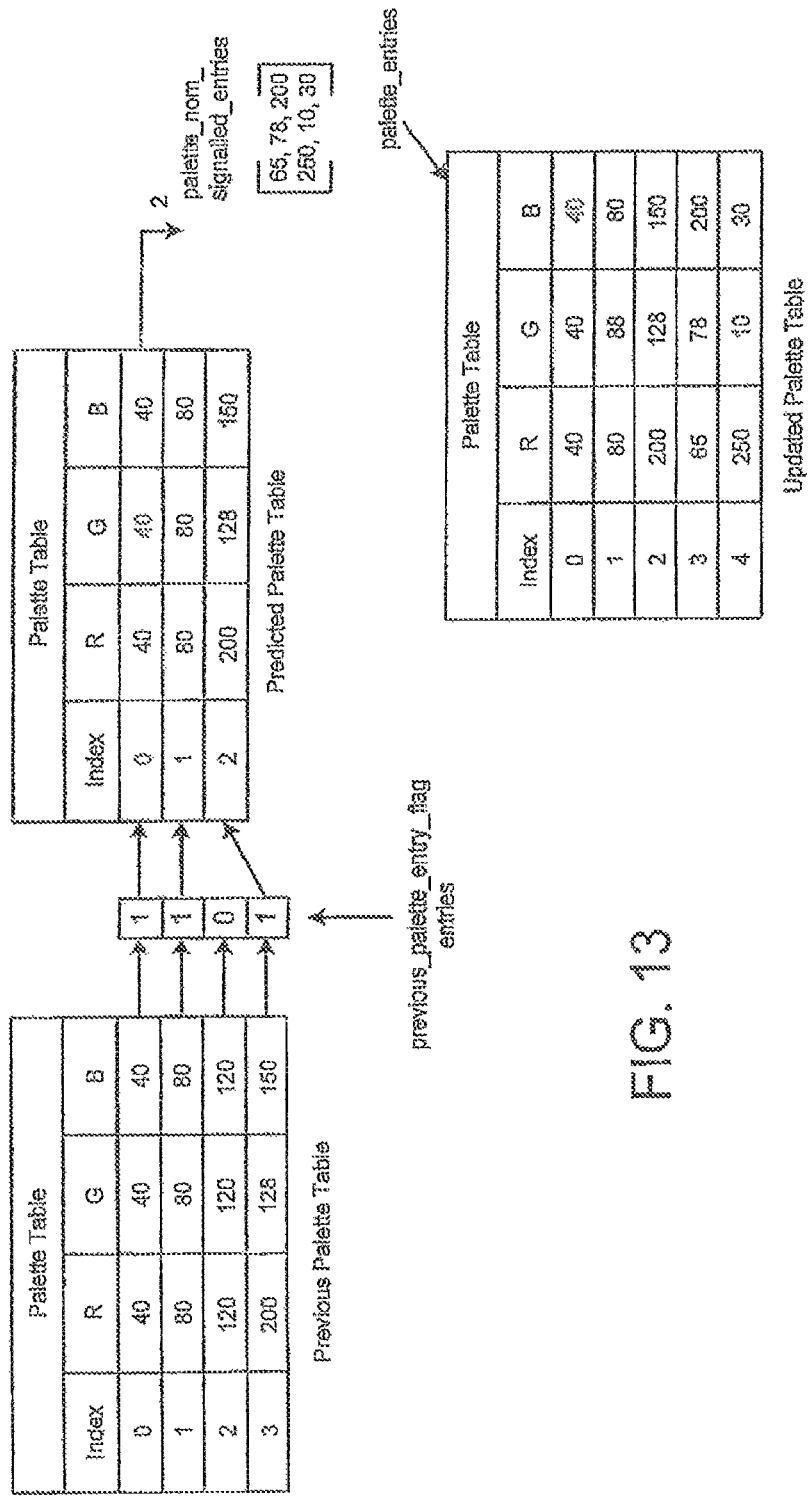
FIG. 13 illustrates a previous palette table, a predicted palette table, and an updated palette table.

Referring to FIG. 13, a previous palette table is illustrated together with a set of flags of previous_palette_entry_flag[i], one for each of the indexes. As illustrated, the set of flags [1 1 0 1] may represent, index 0 maintain, index 1 maintain, index 2 do not maintain, and index 3 maintain. Based upon the set of flags a predicted palette table is illustrated, where any palette table entries that are not maintained are replaced by any subsequent indexes. In this manner, a re-indexing may be performed, if desired.

For additional entries to be included in the re-indexed predicted palette table a corresponding syntax element may be included, such as "palette_num_signalled_entries", to indicate the number of additional entries for the predicted palette table. For each of the palette_num_signalled_entries a syntax element "palette_entries[cIdx][j]" which specifies the j-th element in the palette for the color component cIdx.

For example, a new set of entries for palette_entries[cIdx][j] {e.g., [[65, 78, 200] [250, 10, 30]]} may be signaled, based upon signaling palette_num_signalled_entries of 2. The result is an updated palette table, that includes the new set of entries, for the subsequent coding unit. The palette_num_signalled_entries specifies the number of entries in the palette that are explicitly signaled for the current coding unit, while when palette_num_signalled_entries is not present, it is inferred to be equal to 0. The palette_entries [cIdx][j] specifies the j-th element in the palette for the color component cIdx. The variable palette_size is derived as the sum of number of palette table entries predicted from previous palette table and value of palette_num_signalled_entries.

The pixels in the coding unit may be coded in a raster scan order based upon the updated palette table using one of three modes.

The first mode may include an INDEX_MODE, where one color index is signaled, and all indices in the current line are set to the signaled color index. For example upon signaling the INDEX_MODE, the syntax may include a palette_index (e.g., identify the palette index) that is signaled followed by a value M (e.g., which may be referred to as palette_run) which represents that the following M palette indexes are the same as the one signaled. This is a horizontal direction prediction. The palette_run specifies the number of consecutive locations, following the current location, with the same palette index.

The second mode may include a COPY_ABOVE_MODE, where the indices of the current line are copied from the above line. For example upon signaling the COPY_ABOVE_MODE, the syntax may include a value N (e.g., which may be referred to as palette_run) which represents that the following N palette indexes are the same as their above neighbors, respectively. This is a vertical direction prediction.

The third mode may include an ESCAPE mode signaled, followed by a palette_escape_val, where the pixel value itself (which may or may not be quantized) is transmitted without being determined based upon a palette table. For example, upon signaling the ESCAPE mode, the following palette_escape_val syntax element may include the pixel value. The pixel value may be a quantized (or non-quantized) pixel value to be transmitted in the ESCAPE mode.

In a conforming bitstream the summation of all (palette_run+1) received in the coding unit and the number of escape pixels decoded shall equal the total number of pixels in the coding unit. In another example, for a conforming bitstream the number of pixel values decoded for a coding unit shall equal the total number of pixels in the coding unit.

A syntax element palette_run_type_flag may be coded to indicate the run type as follows.

If palette_run_type_flag is equal to 0 then the mode is INDEX_MODE. In this case the system signals the "index" information. If the Index is equal to the palette_size then the system codes the quantized pixel values directly, otherwise the system signals the palette_run information.

If palette_run_type_flag is equal to 1 then the mode is COPY_ABOVE_MODE. In this case, the system signals the palette_run information.

The ESCAPE mode is enabled when the following two conditions are satisfied. The first condition is if the palette_run_type_flag is equal to 0. The second condition is if the currently coded palette_index is equal to palette_size. The palette index is an index to the palette entries. The palette_size indicates the number of palette index entries.

In an example, the first row of each coding unit, the system element palette_run_type_flag is not transmitted but inferred to be 0 (i.e., INDEX_MODE) because there is no above line available from which the COPY_ABOVE_MODE can copy.

Figure 14:
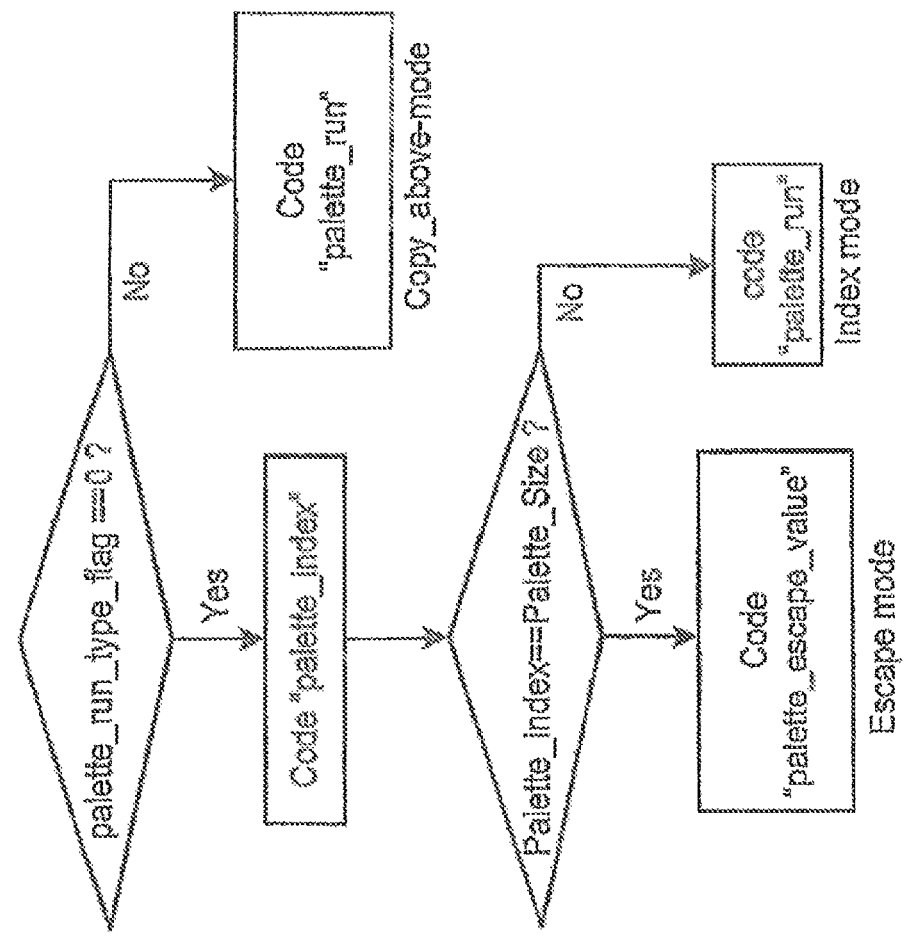
FIG. 14 illustrates a selection process for escape mode, index mode, and copy above mode.

Referring to FIG. 14, an exemplary flow for the index map coding structure is illustrated. If the palette_run_type_flag is not 0 then the system codes the palette_run using the COPY_ABOVE_MODE. If the palette_run_type_flag is 0, then the system codes the palette_index. The system then determines if the palette_index is the same as the palette_size, which if not true, then the system codes the palette_run in INDEX_MODE. If system determines that the palette_index is the same as the palette_size, then the system codes the palette_escape_value in ESCAPE mode.

In an example embodiment palette coding may be performed independently for each color component of a CVS. In another example color components may be grouped together and each group performs palette coding, independently, for a CVS.

In an example embodiment palette coding may be performed independently for each color component within a subset of CVS e.g. subset of slices within a CVS, subset of pictures within a CVS. In another example color components may be grouped together and each group performs palette coding, independently, within a subset of CVS e.g. subset of slices within a CVS, subset of pictures within a CVS.

In an example embodiment the previous palette table and the current palette table predictor for the current block of pixels may be different.

In an example embodiment the palette table predictor may be generated at least in part by using entries within previous palette table predictor and previous palette table.

In an example embodiment the palette table predictor may be generated at least in part by multiplexing a subset of entries within previous palette table predictor and the previous palette table.

In an example embodiment the variables associated with the palette table predictor and the entries within a palette table predictor may be set to a predetermined set of values.

In an example embodiment the maximum size of a palette table may be signaled in the bitstream (e.g. sequence parameter set). In other words, the maximum size of a palette table may be received by a decoder in the bitstream. In an example embodiment the maximum size of a palette table may be derived using past data signaled in the bitstream, i.e. received by a decoder. In an example embodiment the maximum size of a palette table may be set to a predetermined value.

In an example embodiment the maximum size of a palette table predictor may be signaled in the bitstream (e.g. sequence parameter set), i.e. received by a decoder. In an example embodiment the maximum size of a palette table predictor may be derived using past data signaled in the bitstream, i.e. received by a decoder. In an example embodiment the maximum size of a palette table predictor may be set to a predetermined value.

An exemplary syntax and semantic where the maximum size of the palette table and the palette table predictor is received in the sequence parameter set is listed below:

TABLE (4)

| | Descriptor |
|---|---|
| sps_scc_extensions( ) { | |
| ... | |
|    palette_mode_enabled_flag | u(1) |
|    if( palette_mode_enabled_flag ) { | |
|       palette_max_size | ue(v) |
|       palette_max_predictor_size | ue(v) |
|    } | |
| ... | |

Where,

'palette_mode_enabled_flag' equal to 1 specifies that the palette mode may be used for intra blocks. palette_mode_enabled_flag equal to 0 specifies that the palette mode is not applied. When not present, the value of palette_mode_enabled_flag is inferred to be equal to 0.

'palette_max_size' specifies the maximum allowed palette size. When not present, the value of palette_max_size is inferred to be 0.

'delta_palette_max_predictor_size' specifies the maximum palette table predictor size. When not present, the value of palette_max_predictor_size is inferred to be 0.

In an example embodiment, the maximum size of the palette table predictor is always greater than or equal to the maximum size of the palette table. In such an event, a bit efficient way to signal maximum size of the palette table predictor is to subtract maximum size of the palette table from it and signal this difference. Note, this difference is always greater than or equal to 0. The decoder then receives the maximum size of the palette table predictor and the signaled difference and recovers the maximum size of the palette table predictor by adding this received difference value to the maximum size of the palette table.

An exemplary syntax and semantic for receiving "the maximum size of the palette table" and "the difference between the maximum size of the palette table and the maximum size of the palette table predictor" is listed below:

TABLE (5)

| | Descriptor |
|---|---|
| sps_scc_extensions( ) { | |
| ... | |
|    palette_mode_enabled_flag | u(1) |
|    if( palette_mode_enabled_flag ) { | |
|       palette_max_size | ue(v) |
|       delta_palette_max_predictor_size | ue(v) |
|    } | |
| ... | |
| } | |

'palette_mode_enabled_flag' equal to 1 specifies that the palette mode may be used for intra blocks. palette_mode_enabled_flag equal to 0 specifies that the palette mode is not applied. When not present, the value of palette_mode_enabled_flag is inferred to be equal to 0.

'palette_max_size' specifies the maximum allowed palette size. When not present, the value of palette_max_size is inferred to be 0.

'delta_palette_max_predictor_size' specifies the difference between the maximum palette table predictor size and the maximum allowed palette size "palette_max_size". When not present, the value of delta_palette_max_predictor_size is inferred to be 0.

The decoder derives the maximum palette table predictor size as the sum of values corresponding to palette_max_size and delta_palette_max_predictor_size syntax elements.

In an example embodiment, the maximum size of the palette table predictor is always greater than or equal to the maximum size of the palette table. In such an event, the syntax element corresponding to the maximum size of the palette table predictor is restricted to the set of values greater than or equal to the maximum size of the palette table. In an example embodiment this restriction corresponds to a bitstream conformance requirement. In an example embodiment this restriction is a constraint on the semantics of the syntax element corresponding to the maximum size of the palette table predictor (for e.g., the value of syntax element palette_max_predictor_size shall be greater than or equal to value of syntax element palette_max_size).

In an example embodiment when the palette sharing mode is enabled the palette for the current coding unit is derived by copying the first PreviousPaletteSize entries from the palette table predictor.

In the examples herein, coding unit level determination(s) may be made. However, the disclosure is applicable to any block of pixels using palette coding. It should be appreciated by one of ordinary skill in the art that it may be possible and practical to make these determinations at another level than the coding unit level, e.g. the transform unit level, the prediction unit level, the slice level, the picture level, the sequence level, or the like.

The palette coding mode operates on block of pixels in the pixel value domain, while the dequantization/scaling of the blocks of pixels used during coding may be designed to operate in another domain, such as a frequency domain. As a result dequantization/scaling may associate weights. In an example embodiment these weights are dependent on the position of the pixel being decoded within the block of pixel under consideration. These weights may represent values to be multiplied by the corresponding pixel data during the dequantization/scaling process. Using dequantization/scaling coding operations that are simultaneously operating both in the pixel value domain and a different domain for the same picture are not necessarily compatible with one another, tending to result in image artifacts in the decoded image. To reduce the effects that occur when palette coding is used together with dequantization/scaling operations designed to operate in a different domain, it is desirable to include limitations when using the palette coding mode. For example, when a coding unit is being coded using a palette coding technique and (1) the transform block size belongs to a set of particular values (one such set of values may include all transform block sizes) and (2) the coding unit size belongs to a particular set of values (one such set of values may include all coding unit sizes), then it is desirable to modify the coding technique being used. One manner of modifying the coding technique being used is to use pre-determined weights for dequantization/scaling. In an example embodiment the weights correspond to scaling factors and are derived using scaling lists signaled in the bitstream, the modification would then override the signaled weights with pre-determined values whenever palette coding is used and the associated condition is satisfied.

In an example, this may correspond to setting all the elements of a scaling factor array m[x][y] to a value of 16 during the scaling process for transform coefficients.

The use of this modified scaling factor array may be performed when the following conditions are encountered.

(1) the palette coding mode is being used for the current coding unit;

(2) the transform block size is greater than "x", where x is a constant or x is a value that is determined using data signaled in the past within the bitstream (e.g., x=4);

(3) the coding unit size is greater than "y", where y is a constant or y is a value that is determined using data signaled in the past within the bitstream (e.g., y=8).

In an example embodiment, only when using ESCAPE mode within palette coding, dequantizer capable of using weights are used. During dequantization/scaling such embodiments may use a flat scaling factor array for palette coding, with each element of the scaling factor array set to 16. In an example embodiment the scaling factor array corresponds to m[x][y].

It is to be understood that this coding technique may be used for other units of the coded bitstream, such as coded tree blocks (CTBs), transform units, coding units, or otherwise.

Figure 15:
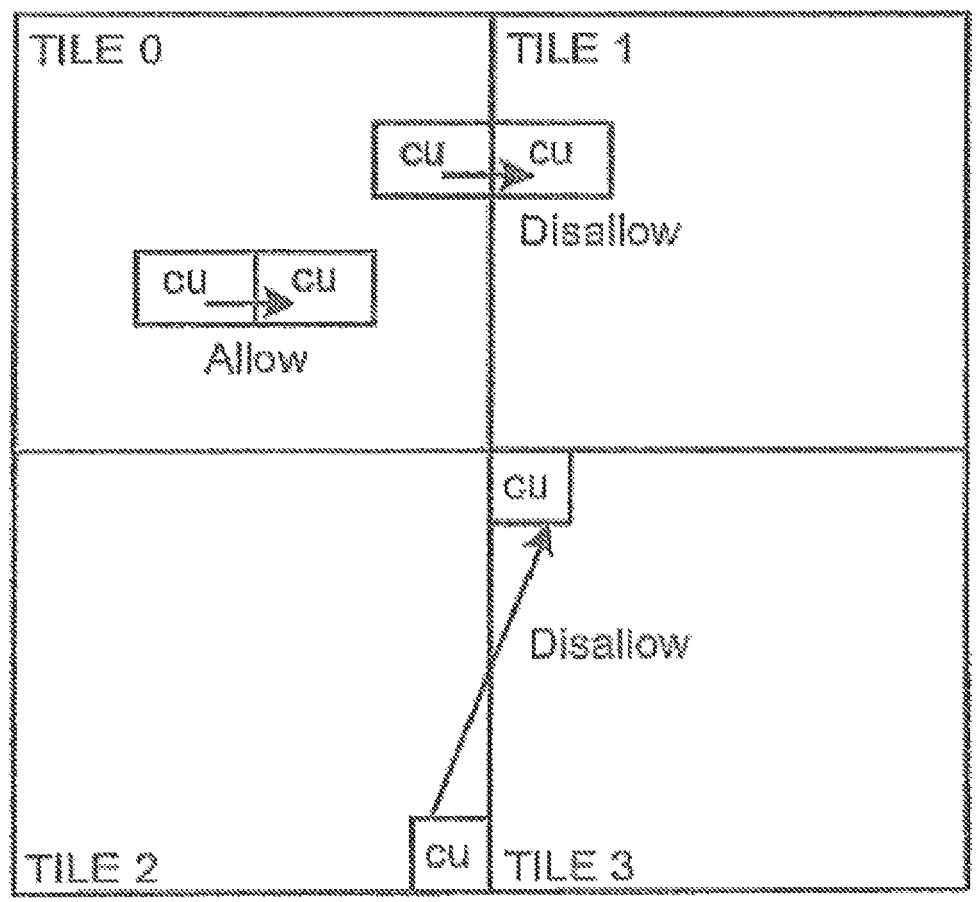
FIG. 15 illustrates a set of tiles, coding units, and prediction of palette tables.

Referring to FIG. 15, the palette coding technique is based, at least in part, upon the prediction of the predicted palette table and/or updated palette table based upon a previous palette table, sometimes referred to as the palette table predictor. The arrows indicate the palette table prediction, and the tile may be composed of a significant number of coding units (e.g., cu). However, tiles which include coding units therein are each decodable in a manner independently of the other tiles. With tiles being decodable in a manner independently of the other tiles, it is desirable to indicate within the syntax that there is no prediction for palette coding permitted across the boundaries between tiles. In an example, the data and pixel values associated with the palette coded coding unit are flagged as unavailable for such boundaries. In an example, the palette table predictor is flagged as unavailable for such boundaries. In an example the palette table predictor is flagged as unavailable using the tile boundary information.

In an example, the palette table predictor is the previously coded palette table. In an example, flagging the palette table predictor as unavailable may be accomplished by setting the variables associated with the palette table predictor to predetermined values. In an example flagging the palette table predictor as unavailable is accomplished by setting the variable indicating the palette table predictor's size to zero. In an example, flagging the palette table predictor as unavailable is carried out during CABAC initialization since the CABAC is always initialized at the start of a tile. In an example, the variable indicating the palette table predictor's size is set to zero during CABAC initialization since the CABAC is always initialized at the start of a tile.

The use of the term "flagging" may be as a result of signaling a flag within the bitstream, and may be achieved without signaling a flag within the bitstream.

Figure 16:
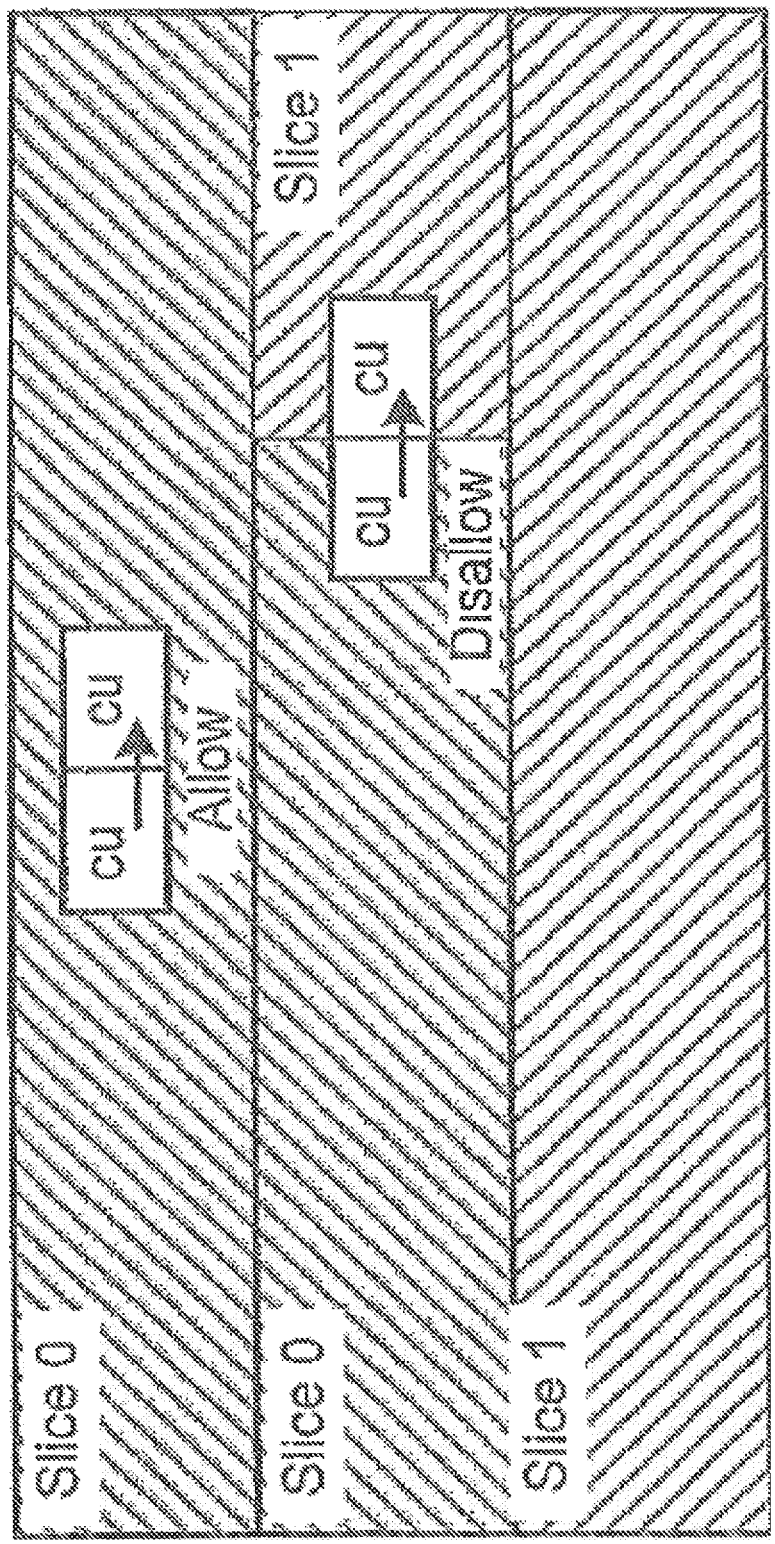
FIG. 16 illustrates a set of slices, coding units, and prediction of palette tables.

Referring to FIG. 16, the palette coding technique is based, at least in part, upon the prediction of the predicted palette table and/or updated palette table based upon a previous palette table, sometimes referred to as the palette table predictor. However, slices which include coding units therein are each decodable in a manner independently of the other slices. With slices being decodable in a manner independently of the other slices, it is desirable to indicate within the syntax that there is no prediction for palette coding permitted across the boundaries between slices. In an example, the data and pixel values associated with the palette coded coding unit are flagged as unavailable for such boundaries. In an example, the palette table predictor is flagged as unavailable for such boundaries. In an example the palette table predictor is flagged as unavailable using the slice boundary information.

In an example, the palette table predictor is the previously coded palette table. In an example, flagging the palette table predictor as unavailable may be accomplished by setting the variables associated with the palette table predictor to pre-determined values. In an example flagging the palette table predictor as unavailable is accomplished by setting the variable indicating the palette table predictor's size to zero. In an example, flagging the palette table predictor as unavailable is carried out during CABAC initialization since the CABAC is always initialized at the start of a slice. In an example, the variable indicating the palette table predictor's size is set to zero during CABAC initialization since the CABAC is always initialized at the start of a slice.

In an example embodiment preventing palette table prediction across tile and slice boundary is achieved by modifying the initialization process of the CABAC parsing process as follows:

Outputs of this process are initialized CABAC internal variables, the initialized Rice parameter initialization states StatCoeff and the palette table predictor variable corresponding to it size previousPaletteSize.

The context variables of the arithmetic decoding engine are initialized as follows:
If the coding tree unit is the first coding tree unit in a tile, the following applies:
  The initialization process for context variables is invoked.
  The variables StatCoeff[k] are set equal to 0, for k in the range 0 to 3, inclusive.
  The variable previousPaletteSize is set equal to 0.
Otherwise, if entropy_coding_sync_enabled_flag is equal to 1 and either CtbAddrInRs % PicWidthInCtbsY is equal to 0 or TileId[CtbAddrInTs] is not equal to TileId[CtbAddrRsToTs[CtbAddrInRs−1]], the following applies:
  The location (xNbT, yNbT) of the top-left luma sample of the spatial neighbouring block T is derived using the location (x0, y0) of the top-left luma sample of the current coding tree block as follows:

$(xNbT,yNbT)=(x0+CtbSizeY,y0-CtbSizeY)$

The availability derivation process for a block in z-scan order is invoked with the location (xCurr, yCurr) set equal to (x0, y0) and the neighbouring location (xNbY, yNbY) set equal to (xNbT, yNbT) as inputs, and the output is assigned to availableFlagT.
  The synchronization process for context variables is invoked as follows:
    If availableFlagT is equal to 1, the synchronization process for context variables and Rice parameter initialization states is invoked with TableStateIdxWpp, TableMpsValWpp, and TableStatCoeffWpp as inputs.
    Otherwise, the following applies:
      The initialization process for context variables is invoked.
      The variables StatCoeff[k] are set equal to 0, for k in the range 0 to 3, inclusive.
      The variable previousPaletteSize is set equal to 0.
Otherwise, if CtbAddrInRs is equal to slice_segment_address and dependent_slicesegment_flag is equal to 1, the synchronization process for context variables and Rice parameter initialization states is invoked with TableStateIdxDs, TableMpsValDs, and TableStatCoeffDs as inputs.
Otherwise, the following applies:
  The initialization process for context variables is invoked.
  The variables StatCoeff[k] are set equal to 0, for k in the range 0 to 3, inclusive.
  The variable previousPaletteSize is set equal to 0.

The initialization process for the arithmetic decoding engine is invoked

In another example embodiment where palette tables corresponding to spatially adjacent are used as predictors, the prediction of palette table across slice/tile boundary is prevented by flagging the data/pixel values corresponding to the spatially adjacent blocks as unavailable.

Figure 17:
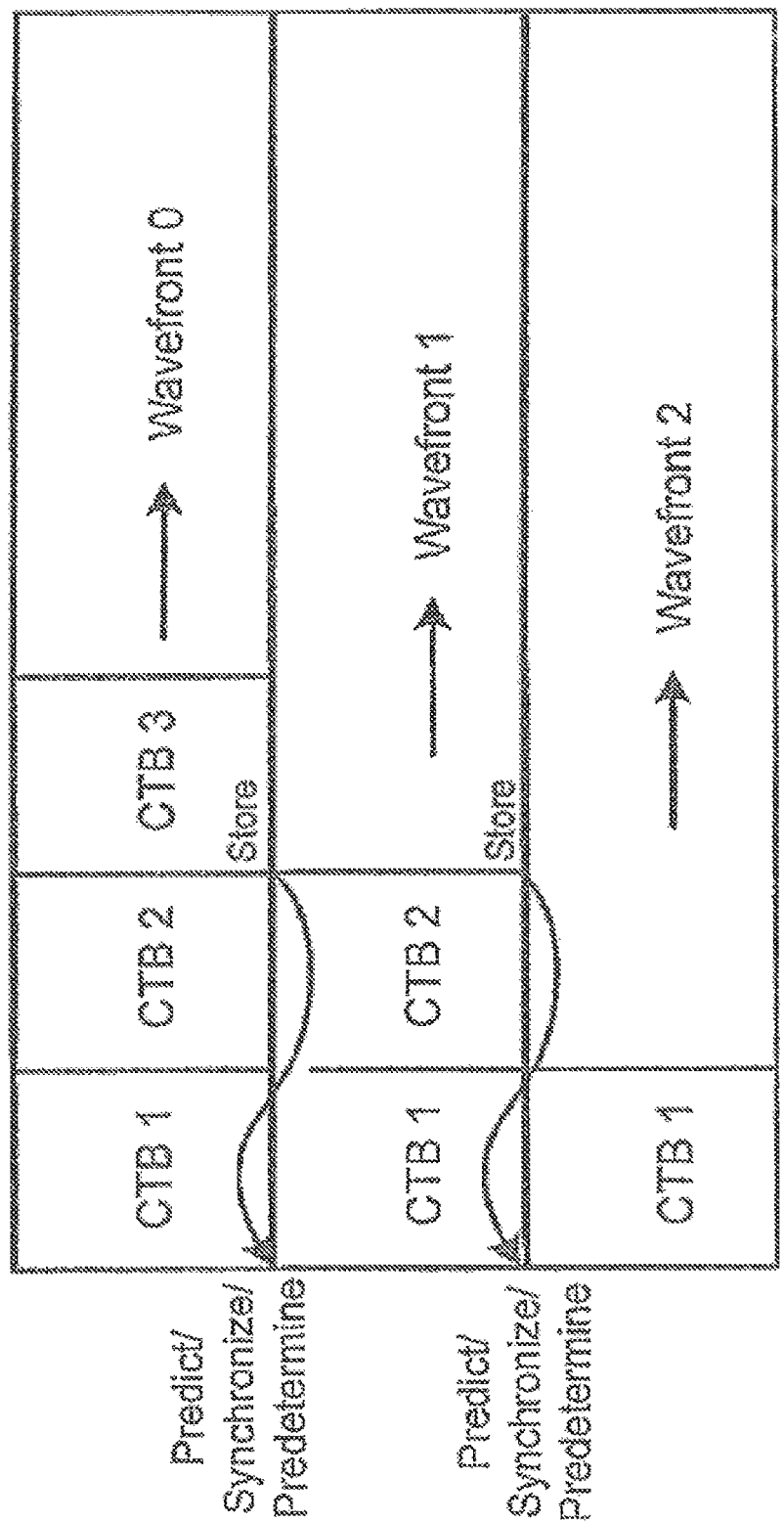
FIG. 17 illustrates a set of wavefronts, coded tree blocks, and prediction of palette tables.

Referring to FIG. 17, the palette coding technique is based, at least in part, upon the prediction of the predicted palette table and/or updated palette table based upon a previous palette table, sometimes referred to as the palette table predictor. However, as a set of coded tree blocks of a plurality of wavefronts are decoded, which include coding units therein, a set of palette tables are generated, predicted, updated for each of the wavefronts. With the subsequent wavefronts starting the decoding process at a later time than the earlier wavefronts, some of the predicted palette tables and/or updated palette tables of an earlier wavefront may be made available for predicting and/or updating a palette table for a subsequent wavefront. In an example, the palette table of one wavefront is stored and used to synchronize (e.g., by being used as a palette table predictor) a subsequent wavefront. In an example, the subsequent wavefront is the wavefront in coding tree block row below. In an example, one wavefront stores a palette table after decoding the coding tree unit which includes the second coding tree block of a row of coding tree blocks, which is used to synchronize a subsequent wavefront, by setting as palette table predictor the stored palette table, before decoding the coding tree unit which includes the first coding tree block of a row of coding tree blocks. In another embodiment, the palette coding technique may initialize to pre-determined values the variables associated with palette table predictor before decoding the first coding unit of the first coded tree block of each wavefront.

Figure 20A:
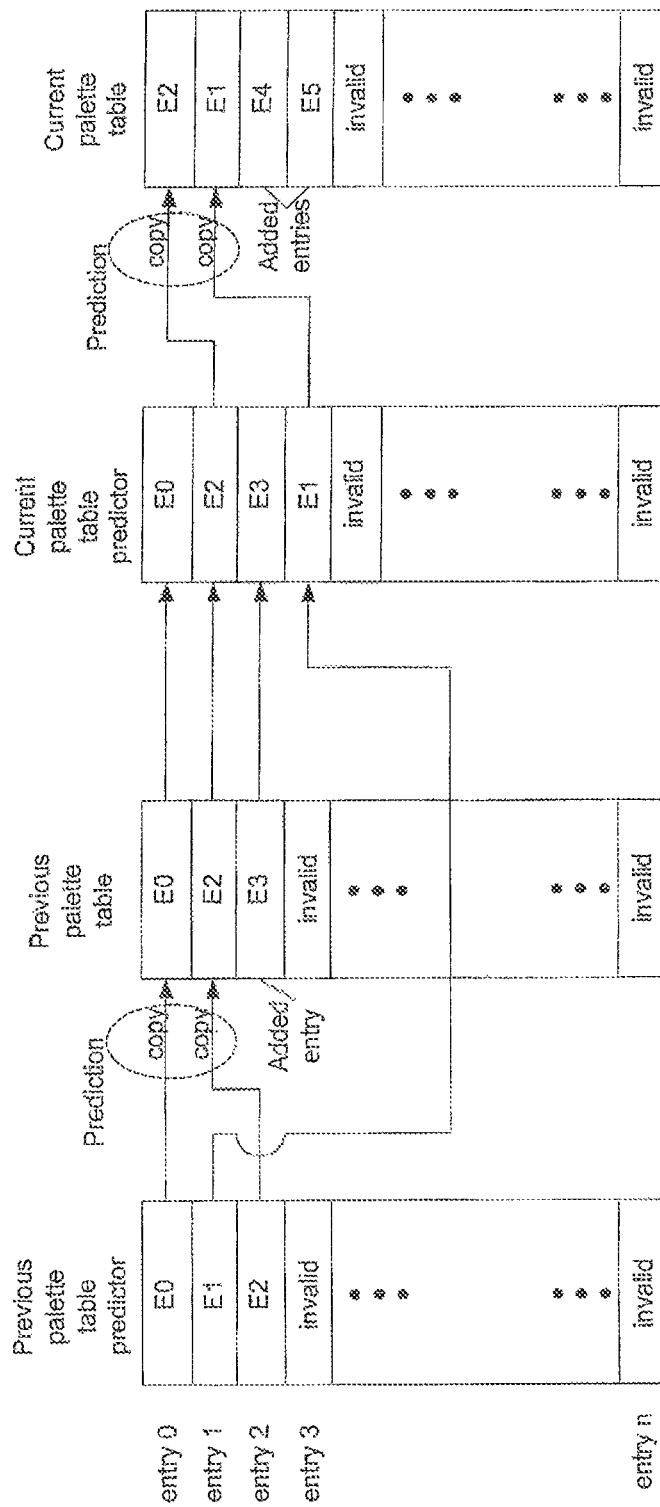
FIG. 20A illustrates an exemplary palette table prediction process.

Referring to FIG. 20A, a previous palette table is illustrated as being predicted from a previous palette table predictor. As illustrated, the previous palette table may also be updated with additional entries. Unfilled entries in the previous palette table predictor and previous palette table may include invalid data. As illustrated, the current palette table predictor may then be generated using entries within previous palette table predictor and previous palette table. The current palette table may then be predicted using the current palette table predictor. As illustrated, in an example the prediction of a palette table from a palette table predictor may correspond to copying select entries.

Figure 20B:
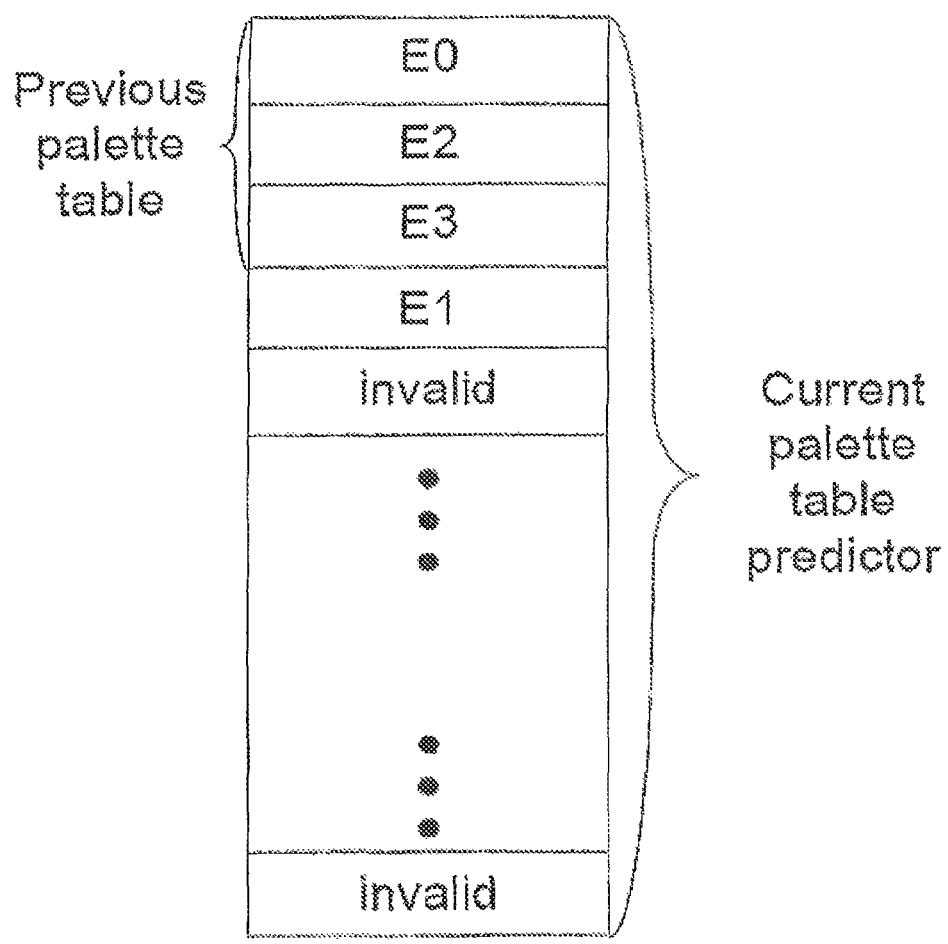
FIG. 20B illustrates an example where previous palette table and current palette table predictor may use the same storage.

Referring to FIG. 20B, the previous palette table and the current palette table predictor may use the same memory storage area because the entries within previous palette table and the current palette table predictor overlap. The sizes of the previous palette table and current palette table predictor may need to be stored in separate variables to identify which part of the table corresponds to previous palette table predictor and which corresponds to current palette table predictor. In an example, the variables may include PredictorPaletteSizeSync and PreviousPaletteSizeSync. In an example, these variables may be bounded. In an example, PredictorPaletteSizeSync may be equal to Min(MaxStorePaletteSize, PredictorPaletteSize) where MaxStorePaletteSize denotes the maximum size of palette table predictor to be stored. In an example, PreviousPaletteSizeSync may be equal to Min(MaxStorePaletteSize, PreviousPaletteSize) where MaxStorePaletteSize denotes the maximum size of palette table predictor to be stored.

In an example, the current palette table predictor is generated by copying the valid entries within the previous palette table and if more space is available within the current palette table predictor then the entries not used for prediction within the previous palette table predictor are appended to the current palette table predictor one at time until no further space is available within the current palette table predictor. If after these steps no more still more space is available within the current palette table predictor then it may contain invalid data.

It is to be understood that palette tables and palette table predictors may include data that identify the number of valid entries within these tables.

It is to be understood that palette tables and palette table predictors may include data that identify the maximum number of entries allowed within these tables.

In an example embodiment the maximum number of entries allowed within a palette table and a palette table predictor may be different.

In an example embodiment the maximum number of entries allowed within a palette table and a palette table predictor may be same.

Referring to FIG. 17, in an example embodiment, the palette coding technique is based, at least in part, upon the prediction of a palette table using a palette table predictor. In an example, the palette table predictor may be generated at least in part, based on at least one previously coded palette table, e.g. a plurality of previously coded palette tables or a single previously coded palette table, but in another example the palette table predictor may be generated using predetermined information. As a set of coded tree blocks of a plurality of wavefronts are decoded, which include coding units therein, a set of palette table predictors are generated, updated for each of the wavefronts. With the subsequent wavefronts starting the decoding process at a later time than the earlier wavefronts, some of the palette table predictors of an earlier wavefront, or a part thereof, may be made available for predicting and/or updating a palette table for a subsequent wavefront. In an example, the palette table predictor of one wavefront, or a part thereof, is stored and used to synchronize (e.g., by being used for prediction of a palette table) a subsequent wavefront.

Figure 21:
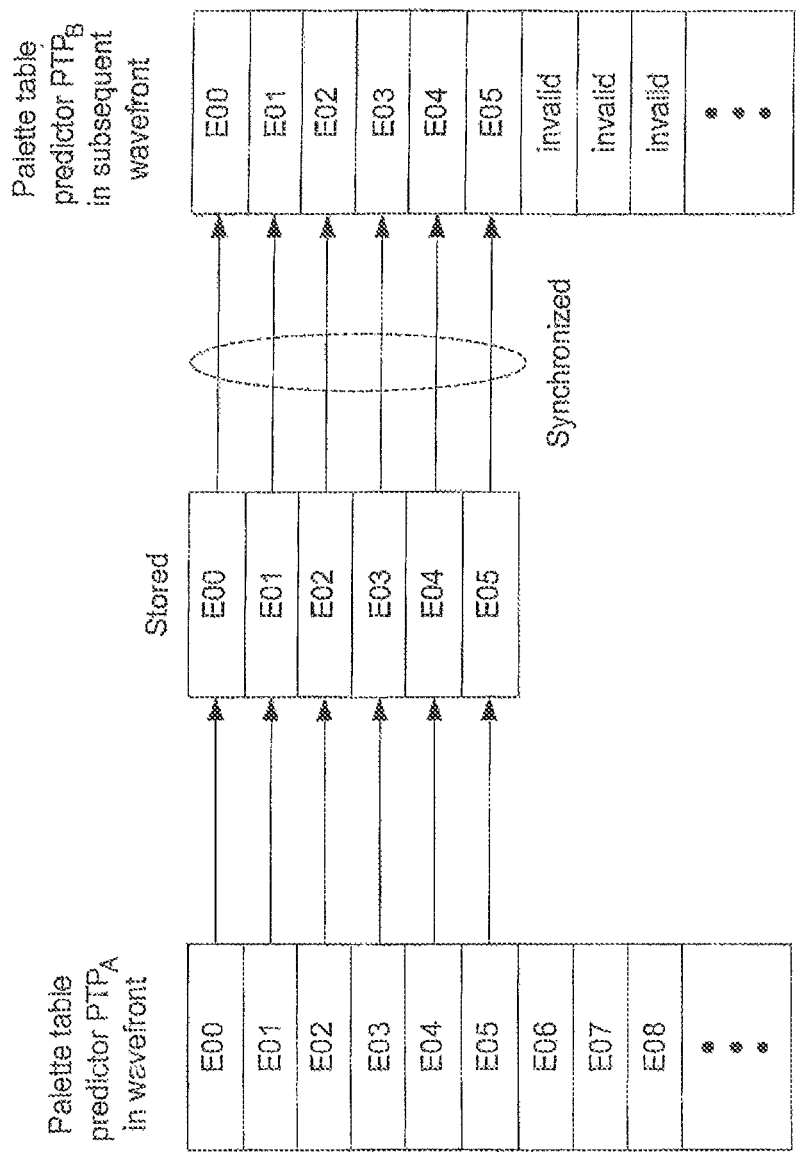
FIG. 21 illustrates an example embodiment where a part of palette table predictor is stored and used for synchronization.
Figure 22:
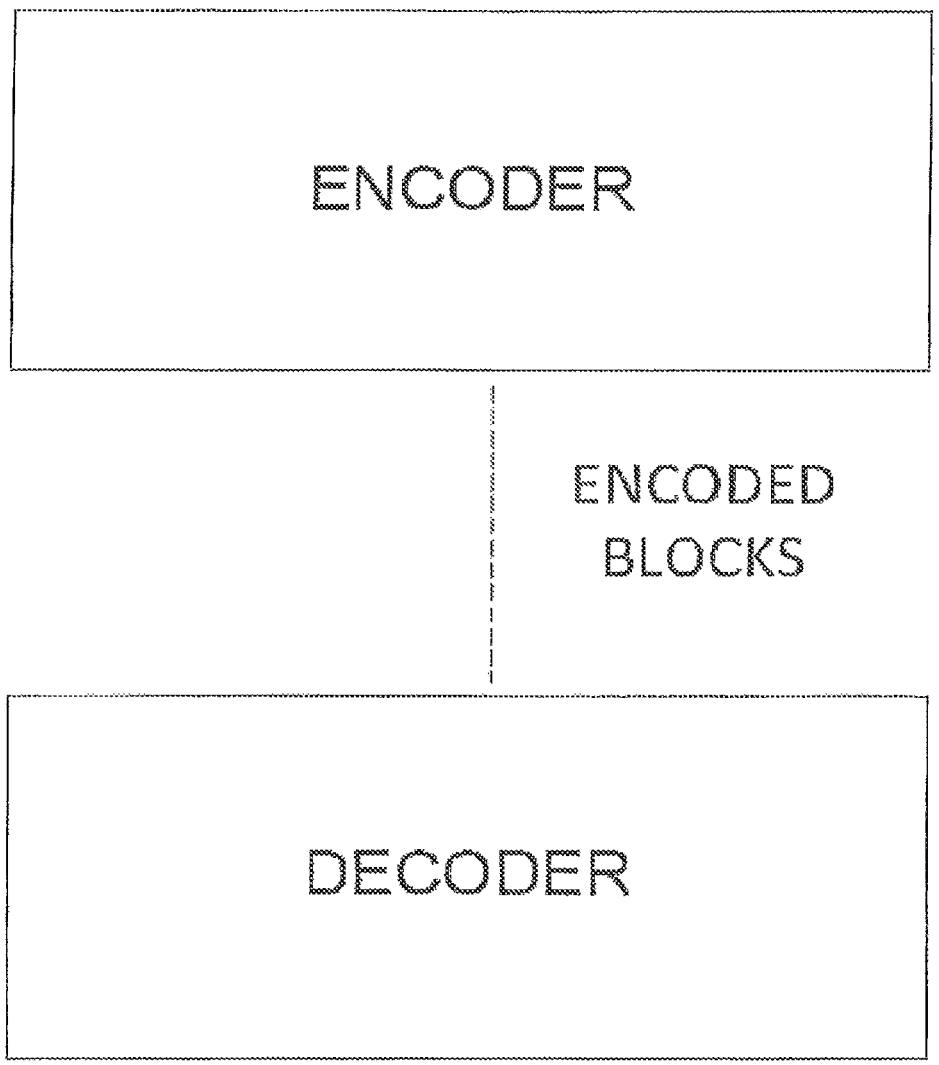
FIG. 22 illustrates an encoder and a decoder.

FIG. 21 illustrates an example embodiment where a part of palette table predictor $PTP_A$ is stored and during synchronization in a subsequent wavefront, the stored entries are copied to generate a palette table predictor $PTP_B$. The remaining entries within palette table predictor $PTP_B$ may contain invalid data. In an example the part of palette table predictor stored may correspond to one-half the maximum number of entries allowed within a palette table predictor. In an example the part of palette table predictor stored may correspond to one-fourth the maximum number of entries allowed within a palette table predictor. In an example the part of palette table predictor stored may correspond to a pre-determined number of entries within a palette table predictor. In an example, the size of palette table predictor stored and synchronized in a subsequent wavefront may be signaled in the bitstreams In an example, the part of the palette table predictor stored and synchronized in a subsequent wavefront may correspond to the maximum number of entries allowed within a palette table. In an example, the part of palette table predictor stored and synchronized in a subsequent wavefront may correspond to the larger of the following two values: (i) a predetermined number and (ii) one-half of the maximum number of entries allowed within a palette table predictor. In an example, the part of palette table predictor stored and synchronized in a subsequent wavefront may correspond to any other combination of the above listed numbers. In an example, the part of palette table predictor stored and synchronized in a subsequent wavefront may correspond to a value derived using past data received in the bitstream.

In an example, the size of the palette table predictor stored and synchronized in a subsequent wavefront may be received in the bitstream. In an example, the size of the palette table predictor stored and synchronized in a subsequent waveform may correspond to MaxStorePaletteSize, Min(MaxStorePaletteSize, PredictorPaletteSize), or the like, or combinations thereof. In yet another example, the entries chosen for storage and synchronization in a subsequent wavefront correspond to the first the size of the palette table predictor stored and synchronized in a subsequent wavefront entries of the palette table predictor.

In one example, the size of palette table predictor stored and synchronized in a subsequent wavefront may be bounded by the value of variable MaxStorePaletteSize. For example, referring to FIG. 20B, the size of the current palette table predictor being stored for subsequent wavefront synchronization is determined as the minimum of the following two values: (i) Size of current palette table predictor and (ii) MaxStorePaletteSize. In an example, the value of MaxStorePaletteSize may be derived using past data signaled in the bitstream, i.e. received by a decoder. In an example, the value of MaxStorePaletteSize may be signaled in the bitstream, i.e. received by a decoder.

In an example, when palette sharing mode is enabled, the palette for the current coding unit is derived by copying the first PreviousPaletteSize entries from the palette table predictor. In one embodiment, PreviousPaletteSize corresponds to the size of the previous palette table. As a result, when the palette table predictor is being stored for synchronization with subsequent wavefront, the value of variable PreviousPaletteSize would be stored as well, say as PreviousPaletteSizeSync. If however the size of the table being stored is bounded to be a maximum of MaxStorePaletteSize, then the value stored for subsequent wavefront synchronization "PreviousPaletteSizeSync" is set to a minimum of the following two values: (i) PreviousPaletteSize and (ii) MaxStorePaletteSize.

In an example the palette table predictor $PTP_B$ may include part of the palette table predictor $PTP_A$ and predetermined palette table predictor values which may be signaled in the bitstream, i.e. received by a decoder. In an example, the subsequent wavefront is the wavefront in coding tree block row below. In an example, one wavefront stores a palette table predictor (e.g. to be used for prediction of palette table by next palette mode coded block of pixels) or a part thereof after decoding the coding tree unit which includes the second coding tree block of a row of coding tree blocks, which is used to synchronize a subsequent wavefront, by deriving as palette table predictor from the stored palette table predictor (e.g. by deriving the current palette table predictor from the stored palette table predictor), before decoding the coding tree unit which includes the first coding tree block of a row of coding tree blocks. In another embodiment, the palette coding technique may initialize to pre-determined values the variables associated with palette table predictor before decoding the first coding unit of the first coded tree block of each wavefront.

In an example decoder pixels coded with ESCAPE mode within the current block of pixels (e.g. current CU) may be predicted using pixels coded with ESCAPE mode within the previous block of pixels (e.g. previous CU).

In an embodiment, pixels coded with ESCAPE mode within the previous block of pixels may not be available for prediction if the pixel corresponds to a slice that is different than the slice corresponding to the current pixel under consideration.

In an embodiment, pixels coded with ESCAPE mode within the previous block of pixels may not be available for prediction if the pixel corresponds to a tile that is different than the tile corresponding to the current pixel under consideration.

The palette coding technique is based, at least in part, upon the prediction of ESCAPE mode coded pixels. However, as a set of coded tree blocks of a plurality of wavefronts are decoded, which include coding units therein, a set of palette tables are generated, predicted, updated for each of the wavefronts. With the subsequent wavefronts starting the decoding process at a later time than the earlier wavefronts, some of the ESCAPE mode coded pixels of an earlier wavefront may be made available for predicting ESCAPE mode coded pixels of a subsequent wavefront. In an example, the ESCAPE mode coded pixels (e.g. to be used for prediction of ESCAPE mode pixels in the next palette mode coded block of pixels) of one wavefront is stored and used to synchronize (e.g., by being used as an ESCAPE mode coded pixel predictor) a subsequent wavefront. In an example, the subsequent wavefront is the wavefront in coding tree block row below. In an example, one wavefront stores ESCAPE mode coded pixels after decoding the coding tree unit which includes the second coding tree block of a row of coding tree blocks, which is used to synchronize a subsequent wavefront, by setting as ESCAPE mode coded pixel predictor the stored ESCAPE mode coded pixels (e.g. by deriving the current ESCAPE mode coded pixel predictor from the stored ESCAPE mode coded pixels), before decoding the coding tree unit which includes the first coding tree block of a row of coding tree blocks. In another embodiment, the palette coding technique may initialize to pre-determined values the variables associated with ESCAPE mode coded pixel predictor before decoding the first coding unit of the first coded tree block of each wavefront.

Figure 18:
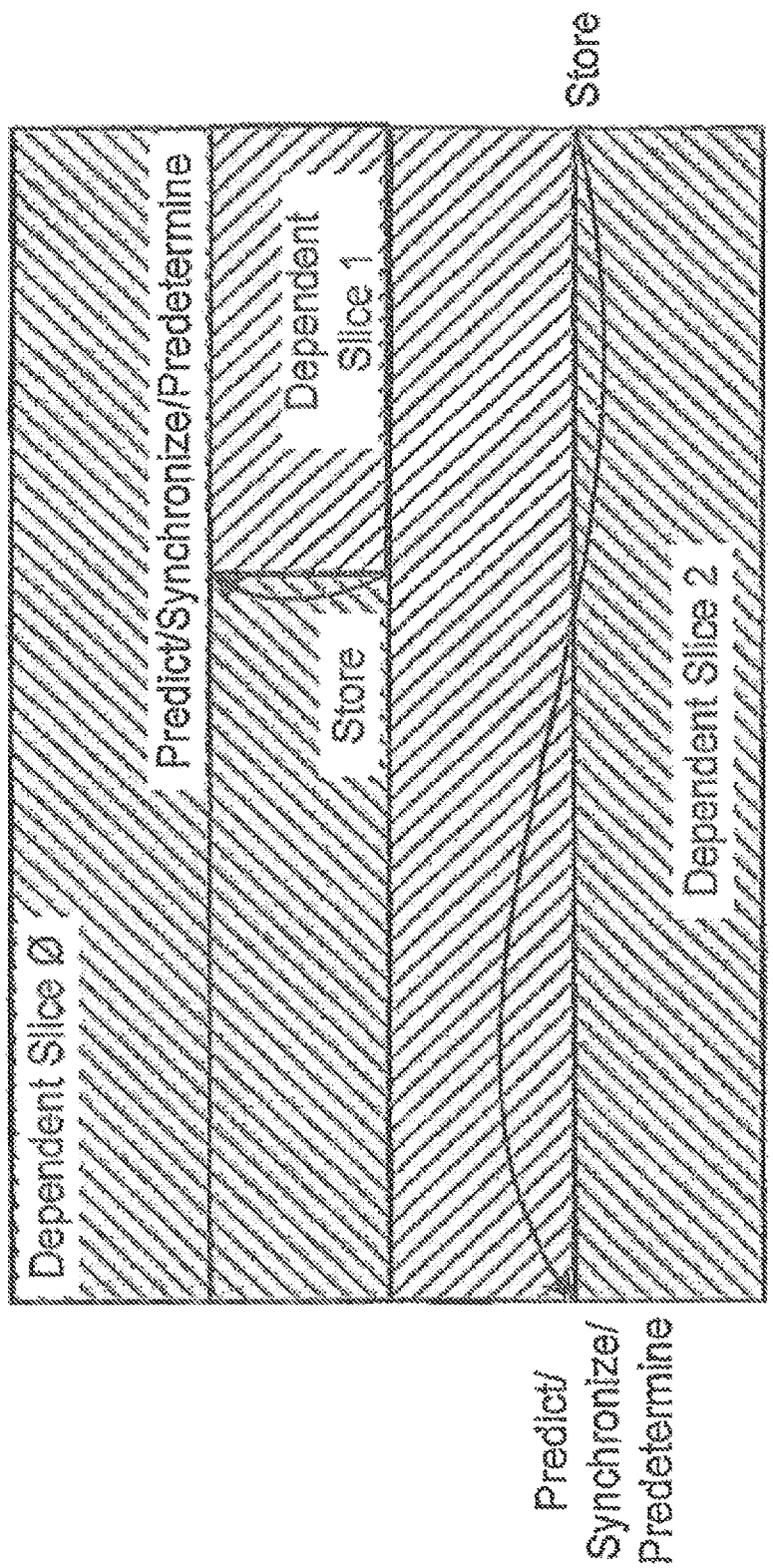
FIG. 18 illustrates a set of dependent slices and prediction of palette tables.

Referring to FIG. 18, the palette coding technique is based, at least in part, upon the prediction of the predicted palette table and/or updated palette table based upon a previous palette table. However, as a set of coded tree blocks of a plurality of dependent slices are decoded, which include coding units therein, a set of palette tables are generated, predicted, updated for each of the dependent slices. With the subsequent dependent slices being temporally decoded at a later time than the earlier dependent slices, predicted palette tables and/or updated palette tables of earlier dependent slices may be made available for predicting and/or updating a palette table for subsequent dependent slices. In an example, the predicted palette table and/or updated palette table of one dependent slices is used to synchronize (e.g., by being used as a palette table predictor) a subsequent dependent slice. In another embodiment, the palette coding technique may initialize to pre-determined values the variables associated with palette table predictor, before decoding the first coding unit for the first coded tree block of each dependent slice. In another embodiment, the palette coding technique may store the current palette table at the end of a dependent slice and set it as a palette table predictor before decoding the first coding unit of the first coded tree block of the following dependent slice contained within the same slice.

Referring to FIG. 18, the palette coding technique is based, at least in part, upon the prediction of a palette table using a palette table predictor. In an example, the palette table predictor may be generated at least in part, based on at least one previously coded palette table, e.g. a plurality of previously coded palette tables or a single previously coded palette table, but in another example the palette table predictor may be generated using information besides any previously coded palette tables. However, as a set of coded tree blocks of a plurality of dependent slices are decoded, which include coding units therein, a set of palette table predictors are generated, and/or predicted, and/or updated for each of the dependent slices. With the subsequent dependent slices being temporally decoded at a later time than the earlier dependent slices, palette table predictors and/or updated palette table predictors of earlier dependent slices may be made available for predicting and/or updating a palette table for subsequent dependent slices. In an example, the palette table predictor and/or updated palette table predictor (e.g. to be used for prediction of palette table by next palette mode coded block of pixels) of one dependent slices is used to synchronize (e.g., by being used to derive a palette table predictor at the start of a dependent slice) a subsequent dependent slice. In another embodiment, the palette coding technique may initialize to pre-determined values the variables associated with palette table predictor, before decoding the first coding unit for the first coded tree block of each dependent slice. In another embodiment, the palette coding technique may store the current palette table predictor at the end of a dependent slice and set it as a palette table predictor before decoding the first coding unit of the first coded tree block of the following dependent slice contained within the same slice.

FIG. 21 illustrates an example embodiment where a part of palette table predictor $PTP_A$ is stored and used during synchronization in a subsequent wavefront. In an example, the same storage and synchronization method is used for a dependent slice, where a part of palette table predictor $PTP_A$ is stored for synchronization in a subsequent dependent slice.

It is anticipated that the approaches described above for determining the size of the stored palette table predictor for subsequent wavefront synchronization may be used for determining the size of the stored palette table predictor for subsequent dependent slice synchronization.

It is anticipated that the approaches described above for determining the variables associated with stored palette table predictor for subsequent wavefront synchronization may be used for determining the variables associated with stored palette table predictor for subsequent dependent slice synchronization. In a specific embodiment, the variable includes the PreviousPaletteSizeSync.

In an example embodiment, to facilitate palette table prediction for wavefronts and dependent slices, the CABAC initialization is modified. Also modified are the storage and synchronization processes for context variables and rice parameter initialization, to, the storage and synchronization processes for context variables, palette table predictors and rice parameter initialization. Also modified is their corresponding in-vocation. These modifications result in the following:

While parsing the slice segment data the storage process for context variables and Rice parameter initialization states is applied as follows:

When ending the parsing of the coding tree unit syntax, entropy_coding_sync_enabled_flag is equal to 1, and either CtbAddrInRs % PicWidthInCtbsY is equal to 1 or both CtbAddrInRs is greater than 1 and TileId[CtbAddrinTs] is not equal to TileId[CtbAddrRsToTs[CtbAddrInRs−2] ], the storage process for context variables, Palette table predictor, and Rice parameter initialization is invoked with TableStateIdxWpp, TableMpsValWpp, TablePreviousPaletteEntriesWpp, PreviousPaletteSizeWpp, and TableStatCoeffWpp as outputs.

When ending the parsing of the general slice segment data syntax, dependent_slice_segments_enabled_flag is equal to 1 and end_of_slice_segment_flag is equal to 1, the storage process for context variables, Palette table predictor and Rice parameter initialization states is invoked with TableStateIdxDs, TableMpsValDs, TablePreviousPaletteEntriesDs, PreviousPaletteSizeDs, and TableStatCoeffDs as outputs.

The modified initialization process of the CABAC parsing process is as follows:

Outputs of this process are initialized CABAC internal variables, the initialized Rice parameter initialization states StatCoeff and the palette table predictor variable corresponding to its contents, previousPaletteEntriess, and to its size, previousPaletteSize.

The context variables of the arithmetic decoding engine are initialized as follows:
If the coding tree unit is the first coding tree unit in a tile, the following applies:
The initialization process for context variables is invoked.
The variables StatCoeff[k] are set equal to 0, for k in the range 0 to 3, inclusive.
Otherwise, if entropy_coding_sync_enabled_flag is equal to 1 and either CtbAddrInRs % PicWidthInCtbsY is equal to 0 or TileId[CtbAddrInTs] is not equal to TileId[CtbAddrRsToTs[CtbAddrInRs−1]], the following applies:
The location (xNbT, yNbT) of the top-left luma sample of the spatial neighbouring block T is derived using the location (x0, y0) of the top-left luma sample of the current coding tree block as follows:

$(xNbT, yNbT) = (x0 + CtbSizeY, y0 − CtbSizeY)$

The availability derivation process for a block in z-scan order is invoked with the location (xCurr, yCurr) set equal to (x0, y0) and the neighbouring location (xNbY, yNbY) set equal to (xNbT, yNbT) as inputs, and the output is assigned to availableFlagT.
The synchronization process for context variables is invoked as follows:
If availableFlagT is equal to 1, the synchronization process for context variables and Rice parameter initialization states is invoked with TableStateIdxWpp, TableMpsValWpp, TablePreviousPaletteEntriesWpp, PreviousPaletteSizeWpp, and TableStatCoeffWpp as inputs.
Otherwise, the following applies:
The initialization process for context variables is invoked.
The variables StatCoeff[k] are set equal to 0, for k in the range 0 to 3, inclusive.
Otherwise, if CtbAddrInRs is equal to slice_segment_address and dependent_slice_segment_flag is equal to 1, the synchronization process for context variables and Rice parameter initialization states is invoked with TableStateIdxDs, TableMpsValDs, TablePreviousPaletteEntriesDs, PreviousPaletteSizeDs, and TableStatCoeffDs as inputs.
Otherwise, the following applies:
The initialization process for context variables is invoked.
The variables StatCoeff[k] are set equal to 0, for k in the range 0 to 3, inclusive. The initialization process for the arithmetic decoding engine is invoked The storage process for context variables, Palette table predictor and Rice parameter initialization states may be as described below.

Inputs to this process are: The CABAC context variables indexed by ctxTable and ctxIdx. The previous palette table indexed by cIdx and n, and the size of the previous index table. The Rice parameter initialization states indexed by k.

Outputs of this process are: The variables tableStateSync and tableMPSSync containing the values of the variables pStateIdx and valMps used in the initialization process of context variables and Rice parameter initialization states that are assigned to all syntax elements in: General slice segment data syntax, Coding tree unit syntax, Sample adaptive offset syntax, Coding quadtree syntax, Coding unit syntax, Prediction unit syntax, PCM sample syntax, Transform tree syntax, Motion vector difference syntax, Transform unit syntax, Residual coding syntax, except a subset of pre-determined syntax elements. The variables tablePreviousPaletteEntriesSync, PreviousPaletteSizeSync containing the values of the variables previousPaletteEntries[cIdx][n], previousPaletteSize used in the initialization process of context variables, Palette table predictor and Rice parameter initialization states. The variables tableStatCoeffSync containing the values of the variables StatCoeff[k] used in the initialization process of context variables, Palette table predictor and Rice parameter initialization states.

For each context variable, the corresponding entries pStateIdx and valMps of tables tableStateSync and tableMPSSync are initialized to the corresponding pStateIdx and valMps.

For each Previous palette table entry, where cIdx varies from 0 to (ChromaArrayType !=0?2:0), inclusive, and n varies from 0 to previous PaletteSize-1, inclusive, each entry of the table tablePreviousPaletteEntriesSync is initialized to the corresponding value of previousPaletteEntries[cIdx][n].

For each Rice parameter initialization state k, each entry of the table tableStatCoeffSync is initialized to the corresponding value of StatCoeff[k].

The synchronization process for context variables, Palette table predictor and Rice parameter initialization states may be as described below.

The inputs to the process are: The variables tableStateSync and tableMPSSync containing the values of the variables pStateIdx and valMps used in the storage process of context variables that are assigned to all syntax elements in: General slice segment data syntax, Coding tree unit syntax, Sample adaptive offset syntax, Coding quadtree syntax, Coding unit syntax, Prediction unit syntax, PCM sample syntax, Transform tree syntax, Motion vector difference syntax, Transform unit syntax, Residual coding syntax, except a subset of pre-determined syntax elements. The variable tablePreviousPaletteEntriesSync and previousPaletteSizeSync containing the values of the variables previousPaletteEntries[cIdx][n] and previousPaletteSize used in the storage process of context variables, Palette table predictor and Rice parameter initialization states. The variable tableStatCoeffSync containing the values of the variables StatCoeff[k] used in the storage process of context variables, Palette table predictor and Rice parameter initialization states.

Outputs of this process are: The initialized CABAC context variables indexed by ctxTable and ctxIdx. The initialized Previous palette table entries indexed by cIdx and n, and Previous palette table size The initialized Rice parameter initialization states StatCoeff indexed by k.

For each context variable, the corresponding context variables pStateIdx and valMps are initialized to the corresponding entries pStateIdx and valMps of tables tableStateSync and tableMPSSync.

For each Previous palette table entry n, where cIdx varies from 0 to (ChromaArrayType !=0?2:0), inclusive, each variable previousPaletteEntries[cIdx][n] is initialized to the corresponding entry of table tablePreviousPaletteEntriesSync. The variable previousPaletteSize is initialized to previousPaletteSizeSync.

For each Rice parameter initialization state, each variable StatCoeff[k] is initialized to the corresponding entry of table tableStatCoeffSync.

Figure 19:
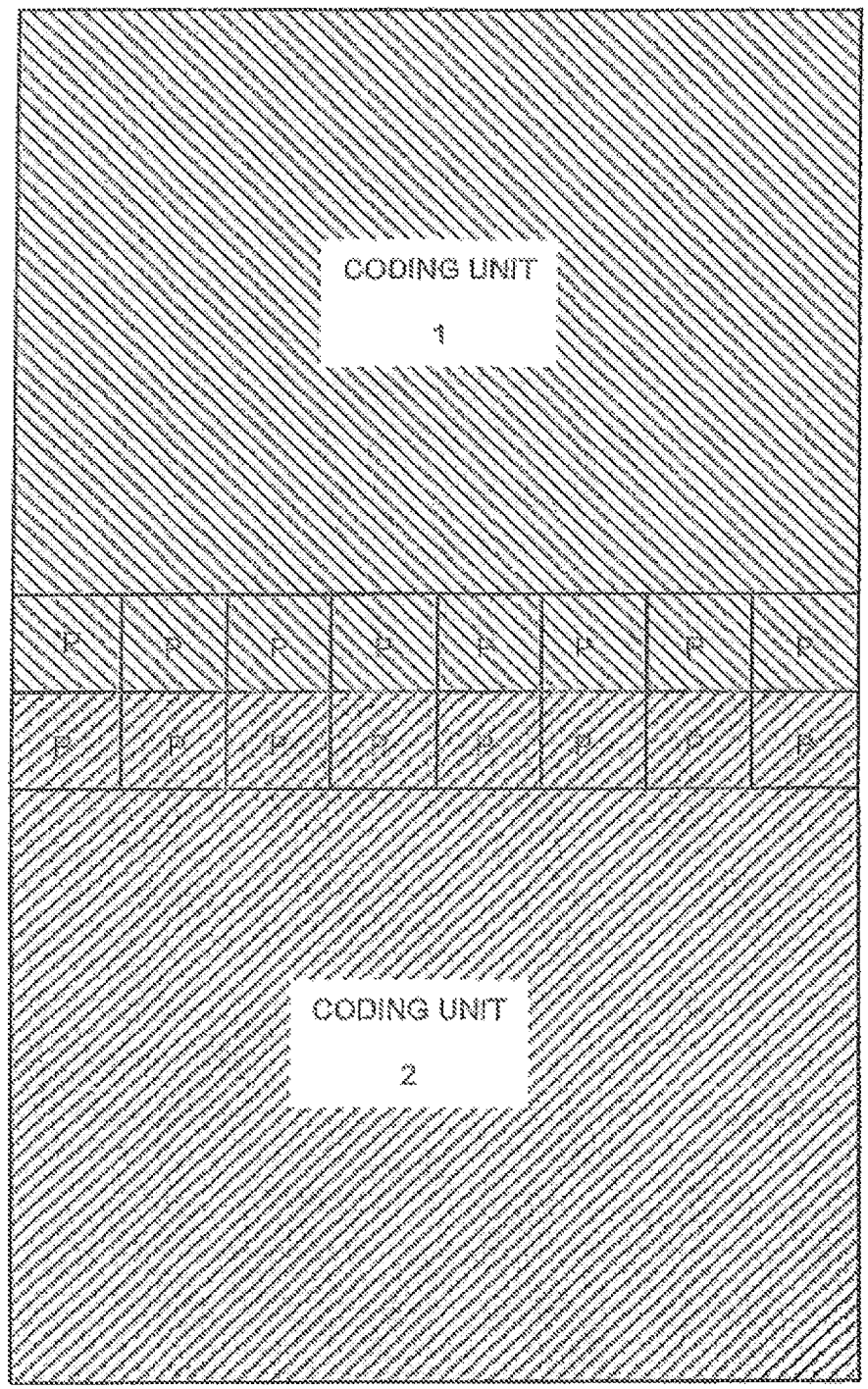
FIG. 19 illustrates a set of coding units and prediction of palette tables.

Referring to FIG. 19, it is desirable to permit the COPY_ABOVE_MODE to allow the palette_run_type_flag to be a copy above across coding unit boundaries. The palette_run_type_flag should not permit COPY_ABOVE_MODE across coding unit boundaries when those boundaries are also tile and/or slice boundaries. This limitation may be signaled by not permitting the palette_run_type_flag to take on the value of COPY_ABOVE_MODE in such a circumstance and/or flagging that the block across the tile and/or slice boundary is unavailable and/or setting unavailable pixels across the tile and/or slice boundary to a pre-determined value.

In the examples above the variable previousPaletteSize may be converted to a list that allows more than palette tables to be considered during palette coding for a coding unit. The above example embodiments may in turn be appropriately modified.

x<<y represents the arithmetic left shift of a two's complement integer representation of x by y binary digits. This function is defined only for non-negative integer values of y. Bits shifted into the least significant bits as a result of the left shift have a value equal to 0. It is also referred to as left bit shift.

x>>y represents the arithmetic right shift of a two's complement integer representation of x by y binary digits. This function is defined only for non-negative integer values of y. Bits shifted into the MSBs as a result of the right shift have a value equal to the MSB of x prior to the shift operation. It is also referred to as right bit shift.

Ceil(x) represents the smallest integer greater than or equal to x.

+ represents addition.
− represents subtraction.
÷ is used to denote division in mathematical equations where no truncation or rounding is intended.
x/y is used to denote division in mathematical equations where no truncation or rounding is intended.
x % y represents the modulus. remainder of x divided by y, defined only for integers x and y with x>, 0 and y>0.
> represents greater than.
>= represents greater than equal to.
< represents less than.
<= represents less than equal to.
== represents equal to
!= represents not equal to.
= represents assignment operator.
* represents multiplication, including matrix multiplication.
x && y represents boolean logical "and" of x and y.
x||y represents boolean logical "or" of x and y.
Log 2(x) represents the base-2 logarithm of x.

The mathematical function Clip3(x, y, z) evaluates as follows:

$$Clip3(x, y, z) = \begin{cases} x; & z < x \\ y; & z > y \\ z; & \text{otherwise} \end{cases}$$

The mathematical function Min(x, y) evaluates as follows:

$$Min(x, y) = \begin{cases} x; & x <= y \\ y; & x > y \end{cases}$$

The mathematical function Max(x, y) evaluates as follows:

$$Max(x, y) = \begin{cases} x; & x >= y \\ y; & x < y \end{cases}$$

The logical operator x?y: z is defined as follows:
x?y: z If x is TRUE or not equal to 0, evaluates to the value of y;
otherwise, evaluates to the value of z Coding block is an NB×NB block of samples for some value of NB such that the division of a coding tree block into coding blocks is a partitioning.

Coding tree block is an NB×NB block of samples for some value of NB such that the division of a component into coding tree blocks is a partitioning.

Coding tree unit is a coding tree block of luma samples, two corresponding coding tree blocks of chroma samples of a picture that has three sample arrays, or a coding tree block of samples of a monochrome picture or a picture that is coded using three separate colour planes and syntax structures used to code the samples.

Coding unit is a coding block of luma samples, two corresponding coding blocks of chroma samples of a picture that has three sample arrays, or a coding block of samples of a monochrome picture or a picture that is coded using three separate colour planes and syntax structures used to code the samples.

Component is an array or single sample from one of the three arrays (luma and two chroma) that compose a picture in 4:2:0, 4:2:2, or 4:4:4 colour format or the array or a single sample of the array that compose a picture in monochrome format.

Transform block is a rectangular M×N block of samples on which the same transform is applied.

Transform coefficient is a scalar quantity, considered to be in a frequency domain, that is associated with a particular one-dimensional or two-dimensional frequency index in an inverse transform part of the decoding process.

Transform coefficient level is an integer quantity representing the value associated with a particular two dimensional frequency index in the decoding process prior to scaling for computation of a transform coefficient value. In an example embodiment transform coefficient level corresponds to quantized coefficient level.

Transform unit is a transform block of luma samples of size 8×8, 16×16, or 32×32 or four transform blocks of luma samples of size 4×4, two corresponding transform blocks of chroma samples of a picture in 4:2:0 colour format; or a transform block of luma samples of size 8×8, 16×16, or 32×32, and four corresponding transform blocks of chroma samples, or four transform blocks of luma samples of size 4×4, and four corresponding transform blocks of chroma samples of a picture in 4:2:2 colour format; or a transform block of luma samples of size 4×4, 8×8, 16×16, or 32×32, and two corresponding transform blocks of chroma samples of a picture in 4:4:4 colour format that is not coded using three separate colour planes and syntax structures used to transform the transform block samples; or a transform block of luma samples of size 8×8, 16×16, or 32×32 or four transform blocks of luma samples of size 4×4 of a monochrome picture or a picture in 4:4:4 colour format that is coded using three separate colour planes; and the associated syntax structures used to transform the transform block samples.

The transform_skip_flag[x0][y0][cIdx] is a syntax element that may be signaled in the bitstream. transform_skip_flag[x0][y0][cIdx] specifies whether a transform is applied to the associated transform block or not: The array indices x0, y0 specify the location (x0, y0) of the top-left luma sample of the considered transform block relative to the top-left luma sample of the picture. The array index cIdx specifies an indicator for the colour component; it is equal to 0 for luma, equal to 1 for Cb, and equal to 2 for Cr. transform_skip_flag[x0][y0][cIdx] equal to 1 specifies that no transform is applied to the current transform block. transform_skip_flag[x0][y0][cIdx] equal to 0 specifies that the decision whether transform is applied to the current transform block or not depends on other syntax elements. When transform_skip_flag[x0][y0][cIdx] is not present, it is inferred to be equal to 0.

extended_precision_processing_flag is a syntax element that may be signaled in the bitstream. extended_precision_processing_flag equal to 1 specifies that an extended dynamic range is used for inter prediction interpolation and inverse transform processing. extended_precision_processing_flag equal to 0 specifies that the extended dynamic range is not used. When not present, the value of extended_precision_processing_enabled_flag is inferred to be equal to 0. In another embodiment extended_precision_processing_flag equal to 1 specifies that an extended dynamic range is used for coefficient parsing and inverse transform processing.

cu_residual_act_flag is a syntax element that may be signalled in the bitstream. cu_residual_act_flag equal to 1 specifies that adaptive colour transform is applied to the residual samples of the current coding unit. cu_residual_act_flag equal to 0 specifies that adaptive colour transform is not applied to the residual samples of the current coding unit. In an example embodiment when cu_residual_act_flag is equal to 1 and the coding unit is intra coded, chroma modes of all prediction units within the current coding unit shall be equal to 4. In an example embodiment when cu_residual_act_flag is not present, it is inferred to be equal to 0.

Figure 23:
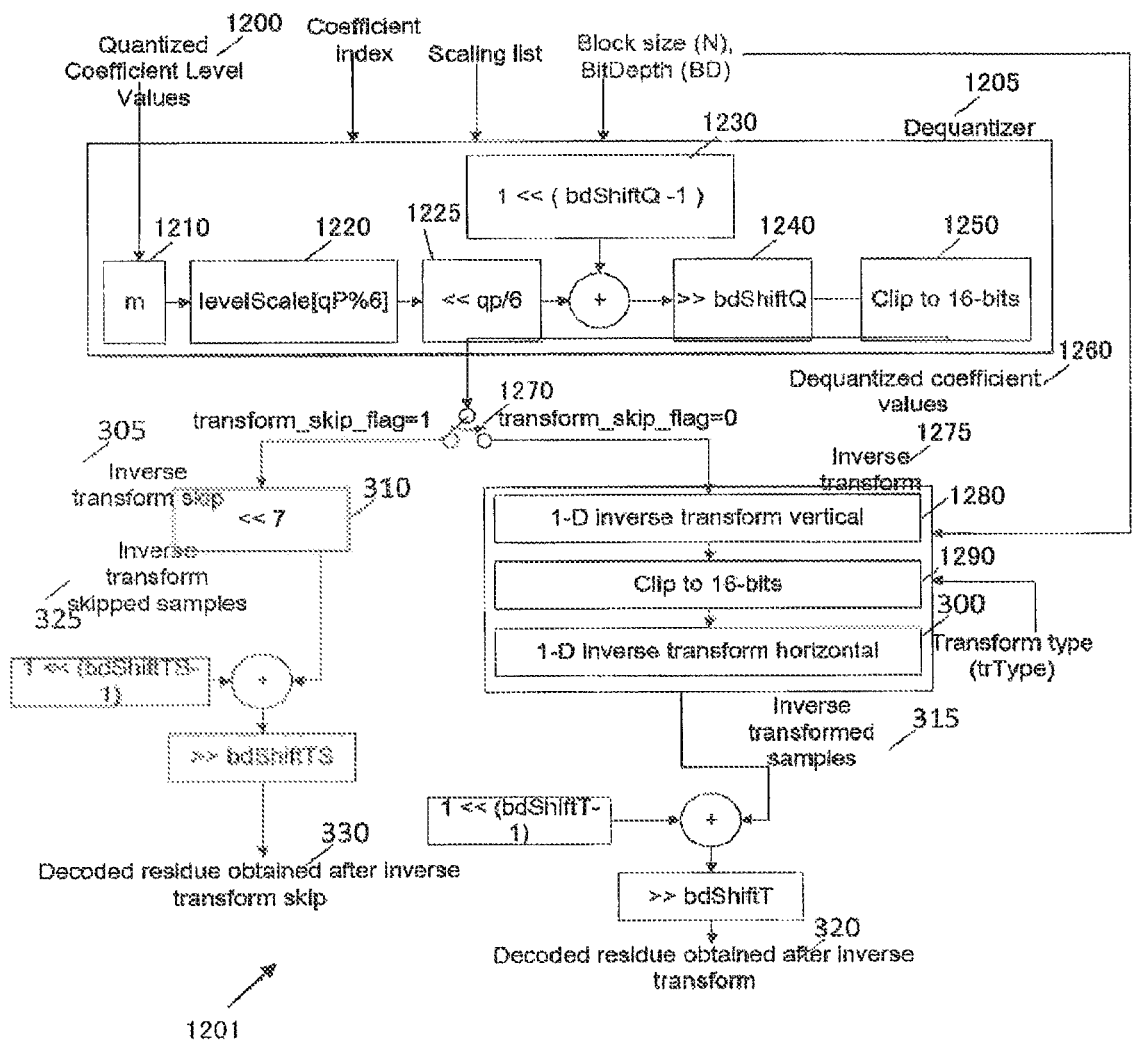
FIG. 23 illustrates a decoder with a de-quantizer, an inverse transform and an inverse transform skip.

$Qp'_Y$ is the luma quantization parameter
$Qp'_{Cb}$ is the quantization parameter for the Cb component
$Qp'_{Cr}$ is the quantization parameter for the Cr component Referring to FIG. 23, an exemplary decoder elements 1201 for the de-quantization and inverse transformation/inverse transform skip of the received quantized coefficients from the encoder for a block of the image is illustrated, in relevant part. The decoder receives the quantized coefficient level value 1200 at a de-quantizer 1205. The de-quantized coefficients resulting from the de-quantizer 1205 are then either processed by a pair of inverse transforms 1275 or the inverse transform skip 305 to determine a decoded residue 320. The pair of inverse transforms map data from a transform domain to a spatial domain using a matrix multiplication operator or other suitable process.

The de-quantizer 1205 includes a descaling process. The descaling process maps quantized coefficient level values 1200 that are transmitted in the bitstream to de-quantized coefficient values 1260. The descaling process corresponds to multiplying quantized coefficient level values with a scaling factor m 1210, an integer levelScale[qP %6] 1220 dependent on quantization parameter (qP), followed by a left bit shift 1225 of qP/6, followed by an addition 1230 of a rounding factor 1<<(bdShiftQ−1), followed by a right bit shift 1240 of bdShiftQ, and finally a 16-bit clipping process 1250. The 16-bit clipping results in any values over 32,767 being set to the maximum value, namely, 32,767. Likewise 16-bit clipping results in any values less than −32,768 being set to the minimum value, namely, −32,768. The scaling factor m. defaults to a pre-determined value if no scaling list is to be used by the de-quantization process, otherwise it is determined using the coefficient index, and values which may be signaled in the bitstream. The value of bdShiftQ may be dependent on transform size (N) and sample bit depth (BD). The dequantized coefficient values 1260 may undergo either an inverse transformation process 1275 or an inverse transform skip process 305 based on the value of a transform_skip_flag signaled in the bitstream. In FIG. 23, this is illustrated with the help of switch 1270. The inverse transformation 1275 may perform a 1-dimensional inverse vertical transform 1280, the output of which is clipped to 16-bits 1290. The inverse transform 1275 may also perform a 1-dimensional inverse horizontal transform 300, which results in the inverse transformed samples 315. The inverse transformed samples 315 may then be added a rounding factor 1<<(bdShiftT−1) and then may be right bit shifted by bdShiftT, to determine the decoded residue after inverse transform 320. The value of bdShiftT may be dependent on bit depth BD. The transforms 1280 and 300 may be swapped with each other, as desired. The 1-dimensional inverse transforms (both vertical and horizontal) may be selected based on block size N and an input variable trType. The value taken on by trType may be determined based on the prediction mode used by the block under consideration and the colour component index. The inverse transform skip process 305 may left bit shift 310 the dequantized coefficient values 1260 by a pre-determined amount which results in inverse transform skipped samples 325. The inverse transform skipped samples 325 may then be added a rounding factor 1<<(bdShiftTS−1) and then right bit shifted by bdShiftTS. The value of bdShiftTS may be dependent on bit depth BD to determine the decoded residue obtained after inverse transform skipped 330. In HEVC, the values of bdShiftT and bdShiftTS are the same.

The memory bandwidth of the memory storage 1220 the video decoder illustrated in FIG. 23, when implemented within the "Part 10: Advanced Video Coding", ISO publication: ISO/IEC 14496-10:2005—Information Technology—Coding Of Audio-Visual Objects (incorporated by reference herein) (H.264/AVC standard), may be limited by using a constraint. For example, in section 8.5.10 of the H.264/AVC standard, the width of the memory access for 4×4 luma DC transform coefficients is limited by including the following statements: "The bitstream shall not contain data that result in any element of $f_{ij}$ with i, j=0.3 that exceeds the range of integer values from $-2^{(7+bitDepth)}$ to $2^{(7+bitDepth)}-1$, inclusive" and "The bitstream shall not contain data that result in any element $dcY_{ij}$ of dcY with i, j=0.3 that exceeds the range of integer values from $-2^{(7+bitDepth)}$ to $2^{(7+bitDepth)}-1$, inclusive." The H.264/AVC standard includes similar memory limitation for other transform sizes. In addition to including a complex memory bandwidth limitation, the H.264/AVC standard includes no mechanism to ensure that this limitation is enforced. Similarly, the JCT-VC, "Draft Test Model Under Consideration", JCTVC-A205, JCT-VC Meeting, Dresden, April 2010 (JCT-VC), incorporated by reference herein, likewise does not include a memory bandwidth enforcement mechanism. For robustness, a decoder must be prepared to accept bitstreams which may violate these limits as may be caused by transmission errors damaging a compliant bitstream or a non-conforming encoder. To alleviate such potential limitations the decoder frequently includes additional memory bandwidth, at added expense and complexity, to accommodate the non-compliant bit streams that are provided.

In order to provide a more computationally robust decoder with limited memory bandwidth and/or memory storage requirements, the decoder could be modified in a suitable manner. However, while modifying the decoder to reduce the memory requirements, the corresponding rate distortion performance of the video should not be substantially degraded. Otherwise, while the memory requirements may be reduced, the resulting quality of the video will not be suitable for viewing by the audience. The modification 1225 results in a doubling of the coefficient value for every 6 steps in the quantization parameter, and thus may substantially increase the size of the memory requirements. The increased value results in one or more zeros being included as the least significant bits.

Referring to FIG. 23, the data at the output of 1240 is preferably clipped 1250 to 16 bits. In this manner, the maximum memory bandwidth required is limited by the system, in a manner independent of the input quantized coefficient level values. In FIG. 23, the inverse transform 1275 and the inverse transform skip 305 may be implemented with the knowledge that data input to the processes will not exceed 16-bits independent of the input quantized coefficient level values. This reduces the computational complexity of the system and reduces the memory requirements, which is especially suitable for embedded systems. As illustrated, the aforementioned techniques for limiting the dynamic range of the de-quantizer may include, (1) placing a non-enforceable normative limit on the dynamic range at various points of the de-quantization, inverse transform and/or reconstruction process, and (2) normative clipping of the de-quantized coefficient data produced from the bit-stream prior to the inverse transforms. Both of these techniques attempt to apply a patch to the resulting high dynamic range data prior to it being provided to the inverse transforms, rather than preventing the undesirable high dynamic range data from occurring in the first place. In contrast to applying a patch to the high dynamic range data, it is preferable to limit the syntax of the quantized coefficient level values in the bitstream in such a manner that invalid high dynamic range data does not occur. By placing limits on the bitstream syntax that corresponds to the quantized coefficient level values, high dynamic range constraints may be readily enforced without the need for substantial processing by the decoder and likewise may result in improved video quality. Any quantized coefficient level value which is received that is not within the valid limits may be discarded or detected as an error. An alternate use of these limits is to clip all decoded quantized coefficient level values into the range determined by the bound. This clipping process of level values ensures that the result of the dequantization process is always within the desired limits regardless of the bitstream content. This clipping may be used in conjunction with some limit on the quantized coefficient level values.

The entropy coder may limit the dynamic range of the de-quantized coefficient level values by only including in the bitstream acceptable values, as limited by the syntax of the bitstream. The entropy encoder may use any suitable coder, such as for example, a variable length coder or an arithmetic coder. The encoder provides through the bitstream to the decoder a set of data, including the quantization parameter and the quantized coefficient level values. The decoder along with other data provided, receives the quantization parameter (e.g., qP) and the quantized coefficient level values. The quantization parameter and the quantized coefficient level values should be selected in such a manner, and signaled in the bitstream within permitted ranges in such a manner, to inherently limit the dynamic range following entropy decoding, descaling and/or de-quantization. The limits for the entropy coding syntax elements may be derived from such limits.

The bitstream compliance test based on quantized coefficient level values 1200 may be carried out at the output of an encoder; or at the input to a decoder; or at both locations and may use pre-determined bounds. The allowable range of dequantized coefficient values can be expressed as a bound on the maximum allowable quantized coefficient level value. The determination of the limits for the bitstream syntax that expresses the quantized coefficient level values may be derived from this limit on quantized coefficient level values. For example, if the desired bound on the size of the de-quantized coefficient values is 15 bits plus a sign bit, then this desired bound may be used to determine the maximum for the selection of quantized coefficient level values in the bitstream depending upon the quantization parameter and transform block size. In many cases it is desirable to permit the encoder to select the quantization parameter in a typical manner, and based upon the selected quantization parameter provide an upper bound for the quantized coefficient level values for the bitstream. In this case, the bitstream is structured such that it does not support quantized coefficient level values that are outside of a valid range. As a result, the bitstream does not support values of the Quantized Coefficients, or quantized coefficients, which exceed the desired size. In HEVC, this is expressed as a bound on the value a syntax element 'coeff_abs_level_remaining'[n] may take on within the bitstream. An excerpt from the HEVC specification containing this bound is listed below:

"coeff_abs_level_remaining"[n] is the remaining absolute value of a transform coefficient level that is coded with Golomb-Rice code at the scanning position n. When coeff_abs_level_remaining[n] is not present, it is inferred to be equal to 0.

It is a requirement of bitstream conformance that the value of coeff_abs_level_remaining[n] shall be constrained such that the corresponding value of TransCoeffLevel[x0][y0][cIdx][xC][yC] is in the range of −32768 to 32767, inclusive."

In some systems, it may be desirable to change the bound on the syntax element coeff_abs_level_remaining[n] to be dependent on all or a subset of: sample bit depth, decoder mode of operation (for example, extended precision processing mode), transform_skip_flag. In other embodiments, the bound on the syntax element coeff_abs_level_remaining[n] may depend on past data signalled in the bitstream. An example constraint on coeff_abs_level_remaining[n] is listed below:

"It is a requirement of bitstream conformance that the value of coeff_abs_level_remaining[n] shall be constrained such that the corresponding value of TransCoeffLevel[x0][y0][cIdx][xC][yC] is in the range of −32768 to 32767, inclusive when transform_skip_flag[x0][y0][cIdx] is equal to 0. It is a requirement of bitstream conformance that the value of coeff_abs_level_remaining[n] shall be constrained such that the corresponding value of TransCoeffLevel[x0][y0][cIdx][xC][yC] is in the range of LowerLimitECTS to UpperLimitTC, inclusive, when transform_skip_flag[x0][y0][cIdx] is equal to 1"

In another example embodiment, to facilitate that only part of the palette table predictor is stored for wavefront (dependent slice would still store the entire palette table predictor), and using a pre-determined number 32 as the value of variable MaxStorePaletteSize, the CABAC initialization is modified. Also modified are the storage and synchronization processes for context variables and rice parameter initialization, to, the storage and synchronization processes for context variables, palette table predictors and rice parameter initialization. Also modified is their corresponding in-vocation. These modifications based on the document titled JCTVC-S 1005 "HEVC Screen Context Coding draft text 2" (version 1—date 2014-12-10 17:24:57), which is incorporated by reference in its entirety herein, result in the following:

In an example, while parsing the slice segment data the storage process for context variables is applied as follows:
When ending the parsing of the coding tree unit syntax entropy_coding_sync_enabled_flag is equal to 1 and either CtbAddrInRs % PicWidthInCtbsY is equal to 1 or both CtbAddrInRs is greater than 1 and TileId[CtbAddrinTs] is not equal to TileId[CtbAddrRsToTs[CtbAddrInRs—2] ], 'MaxStorePaletteSize is set equal to 32' and the storage process for context variables, Rice parameter initialization states and palette prediction variables is invoked with TableStateIdxWpp, TableMpsValWpp, TableStatCoeffWpp, PredictorPaletteSizeWpp, PreviousPaletteSizeWpp and PredictorPaletteEntriesWpp as outputs.

When ending the parsing of the general slice segment data syntax, dependent_slice_segments_enabled_flag is equal to 1 and end_of_slice_segment_flag is equal to 1, 'MaxStorePaletteSize is set equal to PredictorPaletteSize' and the storage process for context variables, Rice parameter initialization states and palette prediction variables is invoked with TableStateIdxDs, TableMpsValDs, TableStatCoeffDs, PredictorPaletteSizeDs, PreviousPaletteSizeDs and PredictorPaletteEntriesDs as outputs.

The Storage process for context variables, Rice parameter initialization states and palette prediction variables may be described as follow:

Inputs to this process are:
The CABAC context variables indexed by ctxTable and ctxIdx.
The Rice parameter initialization states indexed by k.
The palette prediction variables, PredictorPaletteSize, PreviousPaletteSize and PredictorPaletteEntries.
'The variable MaxStorePaletteSize'.

Outputs of this process are:
The initialized CABAC context variables indexed by ctxTable and ctxIdx.
The initialized Rice parameter initialization states StatCoeff indexed by k.
The palette prediction variables, PredictorPaletteSize, PreviousPaletteSize and PredictorPaletteEntries.

For each context variable, the corresponding context variables pStateIdx and valMps are initialized to the corresponding entries pStateIdx and valMps of tables tableStateSync and tableMPSSync.

For each Rice parameter initialization state, each variable StatCoeff[k] is initialized to the corresponding entry of table tableStatCoeffSync.

For palette prediction variables, PredictorPaletteSizeSync is initialized to 'Min(MaxStorePaletteSize', PredictorPaletteSize); PreviousPaletteSizeSync is initialized to 'Min (MaxStorePaletteSize', PreviousPaletteSize). For tablePredictorPaletteEntriesSync, each of the first PredictorPaletteSizeSync entries is initialized to the corresponding value of PredictorPaletteEntries.

Note: The synchronization process uses the stored values, sizes etc. for synchronization. Hence the change in number of entries stored does not need to be reflected on the synchronization process.

In other example embodiments, the MaxStorePaletteSize in the above draft text may be of other values discussed herein. For example, MaxStorePaletteSize may be dependent on maximum number of entries allowed within a palette table predictor (e.g. palette_max_predictor_size>>1, Max (pre-determined number, palette_max_predictor_size>>1)), or dependent on maximum number of entries allowed within a palette table (e.g. palette_max_size+1), or may be a pre-determined number, or a number signaled in a bitstream (i.e. received by a decoder), or a combination of the above.

Example features of the disclosure:
Abstract I—A decoder that stores a partial palette table predictor and synchronizes a subsequent dependent slice using partial palette table predictor. In an example, a size of partial palette table predictor stored is pre-determined. In an example, a size of partial palette table predictor stored is derived from past data signaled in the bitstream, i.e. received by a decoder.

1-1. A decoder configured to:
select a subset of entries of a palette table predictor, wherein the palette table predictor is associated with a wavefront;
store the selected subset of the entries of the palette table predictor in a memory device; and
synchronize a subsequent wavefront using the stored selection, wherein the synchronization includes deriving a palette table predictor for the subsequent wavefront based on the entries of the stored selection.

1-2. The decoder of feature 1-1, wherein deriving the palette table predictor for the subsequent wavefront comprises:
copy data of each entry of the stored selection into a corresponding entry of the palette table predictor for the subsequent wavefront.

1-3. The decoder of feature 1-2, wherein the decoder is further configured to copy invalid data into any remaining entries of the palette predictor for the subsequent wavefront.

1-4. The decoder of feature 1-2, wherein the decoder is further configured to identify a count of the corresponding entries having the data copied therein.

1-5. The decoder of feature 1-1 or 1-2, wherein selecting the subset of entries of the palette table predictor comprises selecting the subset of entries of the palette table predictor comprises:
determine a signaling value received in the bitstream; and
select the subset of entries of the palette table predictor based on the determined signaled value.

1-6. The decoder of feature 1-1 or 1-2, wherein selecting the subset of entries of the palette table predictor comprises selecting the subset of entries of the palette table predictor based on a predetermined value.

2-1. A decoder configured to:
select a subset of entries of a palette table predictor, wherein the palette table predictor is associated with at least one of a wavefront or a dependent slice;
store the selected subset of the entries of the palette table predictor in a memory device; and synchronize a subsequent dependent slice using the stored selection, wherein the synchronization includes deriving a palette table predictor for the subsequent dependent slice based on the entries of the stored selection.

2-2. The decoder of feature 2-1, wherein deriving the palette table predictor for the subsequent dependent slice comprises:
copy data of each entry of the stored selection into a corresponding entry of the palette table predictor for the subsequent dependent slice.

2-3. The decoder of feature 2-1 or 2-2, wherein selecting the subset of entries of the palette table predictor comprises selecting the subset of entries of the palette table predictor comprises:
determine a signaling value received in the bitstream; and
select the subset of entries of the palette table predictor based on the determined signaled value.

2-4. The decoder of feature 2-1 or 2-2, wherein selecting the subset of entries of the palette table predictor comprises selecting the subset of entries of the palette table predictor based on a predetermined value.

Abstract III—a decoder that receives the maximum size of the palette table, and receives the maximum size of the palette table predictor as the difference with respect to the maximum size of the palette table. The decoder is configured to calculate the maximum size of the palette table predictor as the sum of the received difference and maximum size of the palette table. In an example, the decoder operates according to a bitstream conformance requirement that restricts the value of the maximum size of the palette table predictor to be larger than the maximum size of the palette table. In an example, the decoder operates according to a semantic constraint that restricts the value of the maximum size of the palette table predictor to be larger than the maximum size of the palette table.

3.1 A decoder configured to:
recover a first value from a received bitstream, wherein the first value comprises a maximum size of a palette table;
recover a second value from the received bitstream, wherein the second value comprises difference value; and
deriving a third value based on the first and second values, wherein the third value comprises a maximum size of the palette table predictor.

3.2 The decoder of 3.1, wherein deriving the third value based on the first and second values further comprises summing the first and second values.

In an example embodiment, LowerLimitECTS and UpperLimitECTS are a function of the sample bit depth BD. For example:
If BD is less than or equal to 15, the following applies:
LowerLimitECTS=−32768
UpperLimitECTS=32767
Otherwise,
LowerLimitECTS=−(1<<BD)
UpperLimitECTS=(1<<BD)−1

In an example embodiment, LowerLimitECTS and UpperLimitECTS are a function of the sample bit depth BD and decoder mode of operation (for example, extended precision processing mode).

In an example embodiment, LowerLimitECTS and UpperLimitECTS are a function of the sample bit depth BD, transform_skip_flag and decoder mode of operation (for example, extended precision processing mode). For example:
If BD is less than or equal to 15 or transform_skip_flag is equal to 0, the following applies:
LowerLimitECTS=−32768
UpperLimitECTS=3276
7 Otherwise,
LowerLimitECTS=−(1<<BD)
UpperLimitECTS=(1<<BD)−1

In another example LowerLimitECTS, UpperLimitECTS may be determined as follows:
If transform_skip_flag is equal to 0, the following applies:
LowerLimitECTS=−32768
UpperLimitECTS=32767
Otherwise,
LowerLimitECTS=−(1<<(BD+ec_offset))
UpperLimitECTS=(1<<(BD+ec_offset))−1

Where, ec_offset is an integer. In some embodiments, ec_offset may depend on past data signaled in the bitstream.

Another selection of the bound on the quantized coefficient level values is to use the desired bound on the de-quantized coefficients as a maximum, and select values for the quantization coefficient level values based upon a larger number of parameters. In some cases, it may be desirable to permit the encoder to select the quantization parameter in a typical manner and a transform block size (e.g., N) in a typical manner, and based upon the selected quantization parameter and the block size, provide an upper bound for the quantized coefficient level values for the bitstream. In this case, the bitstream is structured such that it does not support values of Quantized Coefficient Level, or quantized coefficient level value, exceeding the bound derived from qP, N, desired size of Quantized Coefficient and Quantized Coefficients. In some cases, it may be desirable to permit the encoder to select the quantization parameter in a typical manner, a transform block size in a typical manner and a BitIncrement value in a typical manner, and based upon the selected quantization parameter, the transform block size, and BitIncrement value provide an upper bound for the quantized coefficient level values for the bitstream. Here BitIncrement represents (BD−8). In this case, the bitstream is structured such that it does not support values of quantized coefficient level values that are outside of a valid range.

In one particular implementation, it is desirable to determine a suitable relation between the desired bound on the de-quantized coefficients, the quantization parameters (e.g., qP), and the quantized coefficient level values signaled in the bitstream. Using a given de-quantization relation, one may determine a relation between the desired bound on the de-quantized coefficient values and a desired bound on the absolute quantized coefficient level values. Alternative de-quantization relationships may likewise be used.

For example, for representation in k signed bits, the de-quantized coefficients may be bounded in absolute value by $2^{k-1}-1$, e.g., for 16-signed bits, the absolute de-quantized coefficient level value is limited to $2^{15}-1$, inclusive.

A set of de-quantized coefficient level values may be defined as follows:

BD=sample bit depth (e.g., 8 or 10 bit). Note, the sample bit depth may be different for each colour component, and the decoding of each colour component may therefore result in a different output for the same set of input values;

DB=B−8 (internal bit-depth increase with 8-bit input);

N=block size; Note, in case of non-square block N represents a 2-tuple vector containing {fd, sd} where fd is the size of the first 1-dimensional inverse transform and sd is the size of the second 1-dimensional inverse transform.

M=Log 2(N); Note, in case of non-square blocks M may be a function of sizes of the first and second 1-dimensional inverse transform, for example M=(Log 2(fd)+Log 2(sd))>>1.

Q=f[qP %6], where f[x]={26214,23302,20560,18396,16384,14564}, x=0, . . . , 5

IQ=levelScale[qP %6],

The list levelScale[ ] is specified as levelScale[k]={40, 45, 51, 57, 64, 72} with k=0.5.

The variable bdShiftQ may be derived as follows: bdShiftQ=BD+M−5

The scaling factor m for a coefficient index (x,y) is derived as follows:

If scaling list is not used for dequantization (may be determined based on information signalled within the bitstream), m=16

Otherwise, m=ScalingFactor[sizeId][matrixId][x][y]

Where, ScalingFactor[sizeId][matrixId][x][y], with x, y=0 . . . (1<<(2+sizeId))−1, specifies the four dimensional-array of scaling factors. sizeId is a variable dependent on the block size and matrixId is a variable dependent on sizeId, prediction mode used by the block and the colour component index. The elements of ScalingFactor may either be derived using a pre-determined set of rules or signalled explicitly in the bitstream. In an example, the elements of ScalingFactor may take on integer values in the range 0 to 255, both inclusive.

Dequantization which converts a quantized coefficient level value TransCoeffLevel, coefficient index (x, y), colour component index, sample bit depth, block size and a quantizer parameter qP into a de-quantized coefficient may be given by the following formula:

coeff*DQ*=Clip3(−32768,32767,
((TransCoeffLevel*m*levelScale[qP %6]<<(qP/6))+(1<<(bdShift*Q*−1)))>>bdShift*Q*)

The de-quantized coefficient may in turn undergo either an inverse transformation or an inverse transform skip process followed by rounding and scaling to determine decoded residue.

An exemplary inverse transformation takes as input the transform type trType, the block size N, the sample bit depth BD, and an array of de-quantized coefficient values, and outputs inverse transformed sample values 315 say "inter-mediateResidueSampleValuesT". The inverse transformed sample values may undergo further rounding and scaling given by the following formula, to obtain decoded residue obtained after inverse transform 320 "decResidueT":

bdShiftT=20−BD decResidueT=(intermediateResidueSampleValuesT+(1<<(bdShiftT−1)))>>bdShiftT An exemplary inverse transform skip takes as input an array of de-quantized coefficient values and outputs inverse transform skipped sample values 325 say "intermediateResidueSampleValuesTS". The inverse transformed sample values may be determined by the following formula:

intermediateResidueSampleValuesTS=coeffDQ<<7

The inverse transform skipped sample values 325 may then undergo further rounding and scaling given by the following formula, to obtain decoded residue after inverse transform skip 330 "decResidueTS":

bdShiftTS=20−BD decResidueTS=(intermediateResidueSampleValuesTS+(1<<(bdShiftTS−1)))>>bdShiftTS For large sample bit depth's the quantized coefficient level values generated may also be large. In such an event the 16-bit clipping 1250 within the dequantizer may be exercised more often thereby limiting the range of the output dequantized coefficient values 1260. This limited range impacts the range of decoded residue obtained after inverse transform 320 and thereby the compression efficiency. In an example, the clipping range in 1250 is expanded. In HECV the clipping range of 1250 is 16-bits. As a result of expanding the clipping range beyond 16-bit, it would require that the inverse transform implementation should be capable of handling data with range and precision larger than the inverse transforms implemented for HEVC. This would increase decoder cost due to required re-design and greater hardware requirements resulting from the increased inverse transform precision requirements. However, selectively expanding the clip 1250 for the transform skip only path (i.e. when the transform_skip_flag is equal to 1) affords a compromise where the inverse transform implementation of HEVC can be re-used. This would require an increase in the data-handling capabilities of the inverse transform skip path (due to larger dequantized coefficient values). However, a change to the inverse transform skip path is easier to implement compared to a change of the inverse transform path.

In an example, to achieve a change in dequantizer clipping 1250 for the transform skip path only the following formula may be used to determine dequantized coefficient values coeffDQ:

If transforms_skip_flag is equal to 1, the following applies:

coeff*DQ*=Clip3(LowerLimit*TS*,UpperLimit*TS*,
((TransCoeffLevel*m*levelScale[qP %6]<<(qP/6))+(1<<(bdShift*Q*−1)))>>bdShift*Q*)

Otherwise, coeff*DQ*=Clip3(−32768,32767,
((TransCoeffLevel*m*levelScale[qP %6]<<(qP/6))+(1<<(bdShift*Q*−1)))>>bdShift*Q*)

Where, LowerLimitTS and UpperLimitTS are integer values.

Figure 24:
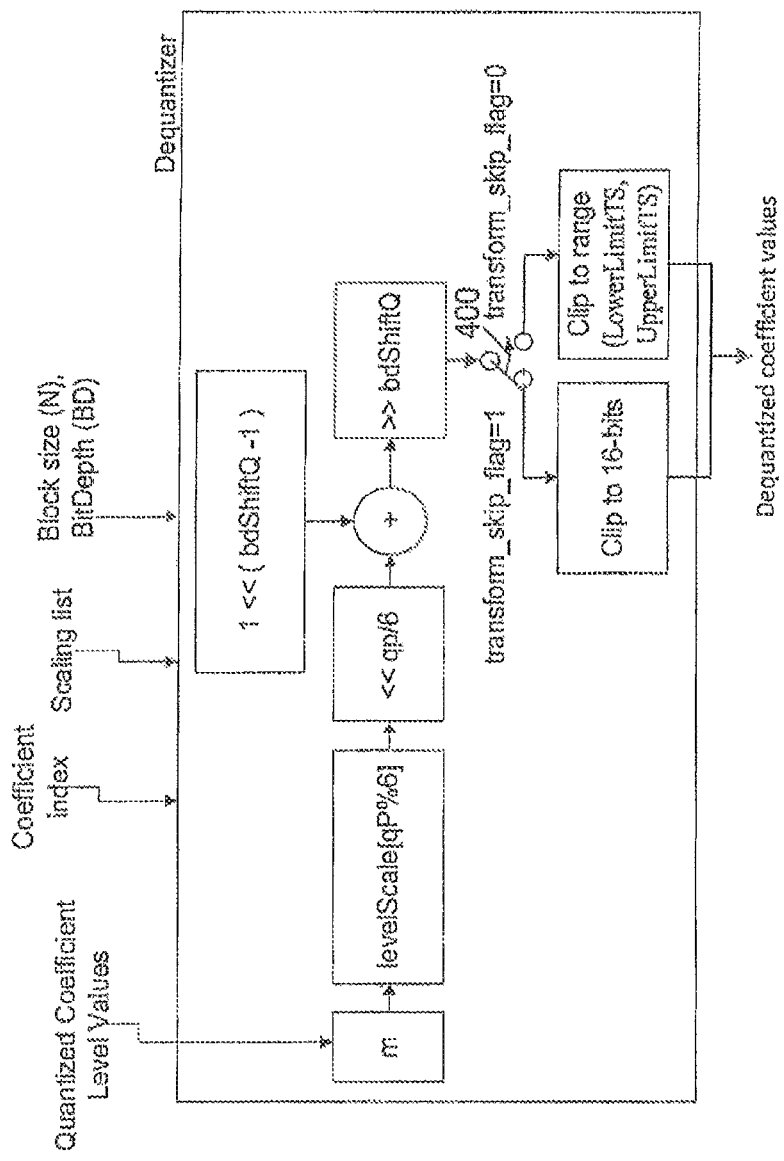
FIG. 24 illustrates an exemplary de-quantizer dependent on transform skip flag.

Referring to FIG. 24 the switch 400 in the dequantizer is used to select between two different clipping operations based on the transform_skip_flag.

In an example embodiment, LowerLimitTS and UpperLimitTS are a function of the sample bit depth BD. For example:

If BD is less than or equal to 15, the following applies:
LowerLimitTS=−32768
UpperLimitTS=32767
Otherwise,
LowerLimitTS=−(1<<BD)
UpperLimitTS=(1<<BD)−1

The choice of right bit shift bdShiftQ 1240 within a dequantizer influences the mapping of quantized coefficient level values 1200 to dequantized coefficient values 1260. For a desired range of dequantized coefficient values 1260, a smaller value of bdShiftQ 1240 would result in a larger required range for quantized coefficient level values 1200. The larger range for quantized coefficient level values 1200 would in turn degrade compression efficiency. In an embodiment, the value of bdShiftQ is increased to achieve higher compression efficiency. To maintain the same overall qP to quantizer step size relationship, the change in bdShiftQ is compensated at some other location in the decoder. For example, increasing bdShiftQ by an integer "x" can be compensated by reducing bdShiftT and bdShiftTS by "x". The formula listed below show the changes to the shift factors:

$$bdShiftQ = BD + M - 5 + x$$

$$bdShiftT = 20 - BD - x$$

$$bdShiftTS = 20 - BD - x$$

where, x is an integer. In an example x may be determined based on all or a subset of: sample bit depth BD, block size N, mode of decoder operation (e.g. extended precision processing mode).

In an example embodiment, the change in bdShiftQ is implemented only for the inverse transform skip processing path. The shift factors bdShidftQ, bdShiftT and bdShiftTS are then determined using the following formula:

If transform_skip_flag is equal to 1, the following applies:

$$bdShiftQ = BD + M - 5 + y$$

$$bdShiftTS = 20 - BD - y$$

Otherwise, $$bdShiftQ = BD + M - 5$$

$$bdShiftT = 20 - BD$$

where, y is an integer. In an example y may be determined based on all or a subset of sample bit depth BD, block size N, mode of decoder operation (e.g. extended precision processing mode).

In an example embodiment, the change in bdShiftQ is different for the inverse transform and inverse transform skip processing path. This shift factors bdShidftQ, bdShiftT and bdShiftTS are then determined using the following formulae:

If transform_skip_flag is equal to 1, the following applies:

$$bdShiftQ = BD + M - 5 + w$$

$$bdShiftTS = 20 - BD - w$$

Otherwise, $$bdShiftQ = BD + M - 5 + z$$

$$bdShiftT = 20 - BD - z$$

where, w and z are integers. In an example w and z may be determined based on all or a subset of: sample bit depth BD, block size N, mode of decoder operation (e.g. extended precision processing mode).

In another exemplary inverse transform skip process, the inverse transform skip process takes as input an array of de-quantized coefficient values, the variable bdShiftTS, and outputs inverse transform skipped sample values 325 say "intermediateResidueSampleValuesTS". The value of intermediateResidueSampleValuesTS may be determined by the following formula:

$$intermediateResidueSampleValuesTS = coeffDQ << tsShift$$

Where, tsShift is a non-negative integer. In an example, tsShift is equal to Min(7, bdShiftTS).

In this example, to achieve a change in dequantizer right bit shift bdShiftQ 240 for the transform skip path only the following set of formulae may be used to determine dequantized coefficient values coeffDQ:

If transforms_skip_flag is equal to 1, the following applies:
bdShiftQ=BD+M−5−Max(0, BD+M−15)
coeffDQ=Clip3(LowerLimitTS, UpperLimitTS, ((TransCoeffLevel*m*levelScale[qP %6]<<(qP/6))+(1<<(bdShiftQ−1)))>>bdShiftQ)
Otherwise,
coeffDQ=Clip3(−32768, 32767, ((TransCoeffLevel*m*levelScale[qP %6]<<(qP/6))+(1<<(bdShiftQ−1)))>>bdShiftQ)

Where, LowerLimitTS and UpperLimitTS are integer values. In an example embodiment, LowerLimitTS and UpperLimitTS are a function of the sample bit depth BD. For example:

If BD is less than or equal to 15, the following applies:
LowerLimitTS=−32768
UpperLimitTS=32767
Otherwise,
LowerLimitTS=−(1<<BD)
UpperLimitTS=(1<<BD)−1

In another embodiment, the value of tsShift in the formula:

$$intermediateResidueSampleValuesTS = coeffDQ << tsShift$$

may be chosen from a predetermined set of values; which value is selected may depend on a flag indicating mode of operation. For example, syntax element extended_precision_processing_flag may be used to indicate the mode of decoder operation, in such an event tsShift is determined using the following formula:

$$tsShift = extended\_precision\_processing\_flag?Min(7, bdShift):7$$

In this example, to achieve a change in dequantizer right shift bdShiftQ 240 for the transform skip path only the following set of formulae may be used to determine de-quantized coefficient values coeffDQ:

If transforms_skip_flag is equal to 1, the following applies:
bdShiftQ=extended_precision_processing_flag?(BD+M−5−Max(0, BD+M−15)): (BD+M−5)
coeffDQ=Clip3(LowerLimitTS, UpperLimitTS, ((TransCoeffLevel*m*levelScale[qP %6]<<(qP/6))+(1<<(bdShiftQ−1)))>>bdShiftQ)
Otherwise,
coeffDQ=Clip3(−32768, 32767, ((TransCoeffLevel*m*levelScale[qP %6]<<(qP/6))+(1<<(bdShiftQ−1)))>>bdShiftQ)

Where, LowerLimitTS and UpperLimitTS are integer values. In an example embodiment, LowerLimitTS and UpperLimitTS are a function of the sample bit depth BD. For example:

If BD is less than or equal to 15, the following applies:
LowerLimitTS=−32768
UpperLimitTS=32767
Otherwise,
LowerLimitTS=−(1<<BD)
UpperLimitTS=(1<<BD)−1

In another exemplary embodiment the inverse transform skip process is merged within the dequantization process. In such an example the dequantization and the inverse transform skip is carried out as listed in the formulae below, to obtain decoded residue after inverse transform skip:

If transforms_skip_flag is equal to 1, the following applies:
  bdShiftQ=tsShiftQ
  coeffDQ=Clip3(LowerLimitTS, UpperLimitTS, ((TransCoeffLevel*m*levelScale[qP %6]<<(qP/6))+(1<<(bdShiftQ−1)))>>bdShiftQ)
  decResidueTS=coeffDQ
Otherwise,
Dequantize quantized coefficient level values for inverse transform path to obtain de-quantized coefficient values
Inverse transform dequantized coefficient values to obtain inverse transformed samples Add rounding factor and perform scaling to obtain decoded residue after inverse transform Here, tsShiftQ is an integer. In an example tsShiftQ is equal to 13. In another example tsShiftQ is dependent on all or subset of: sample bit depth BD, block size N, mode of decoder operation (e.g. extended precision processing mode).

LowerLimitTS and UpperLimitTS are integer values. In an example embodiment,

LowerLimitTS and UpperLimitTS are a function of the sample bit depth BD. For example:
If BD is less than or equal to 15, the following applies:
LowerLimitTS=−32768
UpperLimitTS=32767
Otherwise,
LowerLimitTS=−(1<<BD)
UpperLimitTS=(1<<BD)−1

In an example embodiment the transform_skip_flag may be replaced by any suitable flag in the bitstream. In another embodiment the transform_skip_flag may be replaced by any suitable condition that is determined to be based on past data signaled within the bitstream.

In an example embodiment the inverse transform skip path may be replaced by any suitable decoder processing path.

Figure 25:
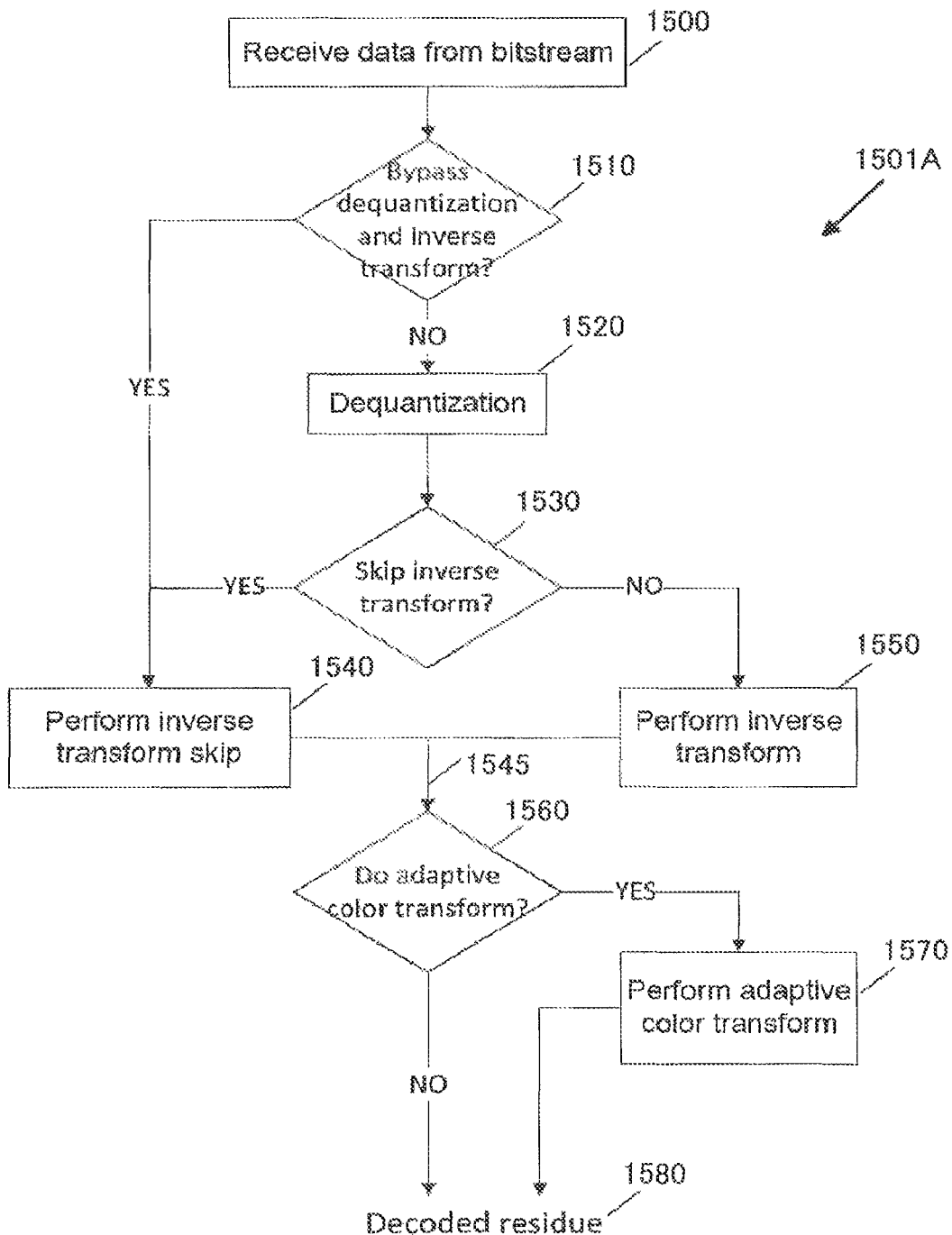
FIG. 25 is a flow diagram illustrating one configuration of a method for determining decoded residue with a de-quantizer, an inverse transform, an inverse transform skip and an adaptive colour transform.

FIG. 25 is a flow diagram illustrating one configuration of a method 1501A used for determining decoded residue in a decoder.

In step 1500 the decoder receives data from a bitstream. In step 1510 the decoder determines from data received in the bitstreamwhether to bypass dequantization and inverse transform steps. If the decoder determines to bypass dequantization and inverse transform steps, the decoder performs inverse transform skip step 1540 and outputs a result 1545. If it determines at step 1510 not to bypass dequantization and inverse transform steps, the decoder performs at step 1520 dequantization of received quantized coefficient level values. In step 1530 the decoder determines from data received in the bitstream whether to skip an inverse transform step. If it determines at step 1530 to skip inverse transform, the decoder performs an inverse transform skip step 1540 and outputs a result 1545. If it determines at step 1530 not to skip the inverse transform step, the decoder performs an inverse transform step 1550 and outputs a result 1545.

Still referring FIG. 25, in step 1560 the decoder determines whether to carry out an adaptive colour transform step. If it determines to carry out the adaptive colour transform step, the decoder performs adaptive colour transform step 1570 using result 1545 as input and providing as output decoded residue 1580. If the decoder determines not to carry out the adaptive colour transform step, then result 1545 is provided as the decoded residue 1580.

Figure 26:
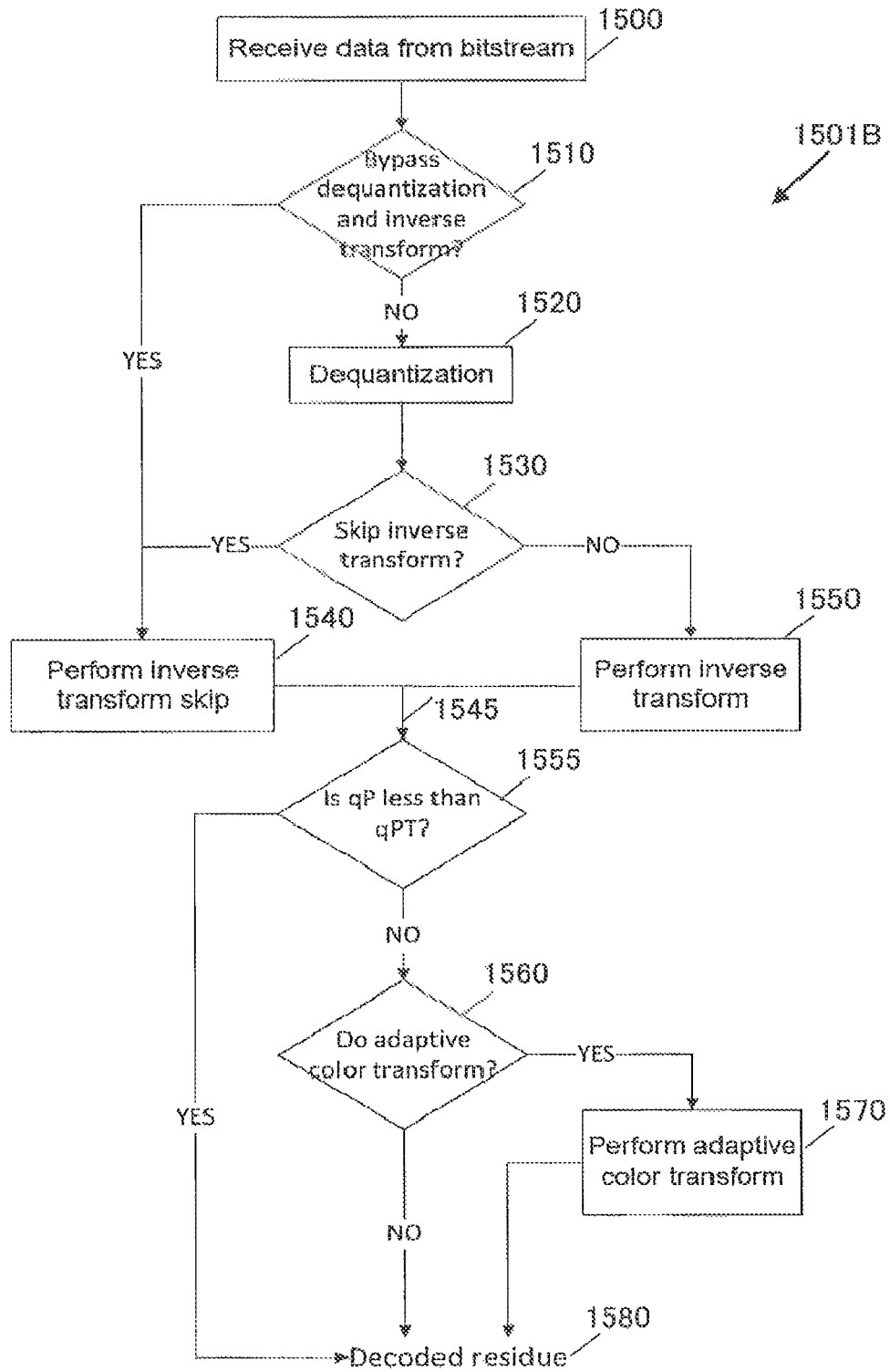
FIG. 26 is another flow diagram illustrating one configuration of a method for determining decoded residue with a de-quantizer, an inverse transform, an inverse transform skip and an adaptive colour transform.

FIG. 26 is a flow diagram illustrating an alternative method 1501B used for determining decoded residue in a decoder. Method 1501A and 1501B include common steps that are indicated by the same reference numerals. In addition, method 1501B includes a step 1555 that receives result 1545 and determines if the quantization parameter qP received in the bitstream is less than a threshold value qpT. If the received quantization parameter qP is less than the threshold value qpT, the values corresponding to result 1545 are output by the decoder as decoded residue 1580. If the received quantization parameter qP is not less than the threshold value qpT, the values corresponding to result 1545 proceed to step 1560. The threshold value qpT may be set is any of several ways. In one embodiment the threshold value qpT is a fixed pre-determined value. In another embodiment the threshold value qpT is derived using past data signaled in the bitstream. In another embodiment the threshold value qpT is signaled in the bitstream. In an embodiment the threshold value qpT may be different for different colour components.

In an alternative decoder configuration the adaptive colour transform step 1570 may be disabled for a certain range of values of the quantization parameter qP. This may be achieved in one of several ways. In an example embodiment the syntax element cu_residual_act_flag, which determines whether adaptive colour transform is carried out, is always set to a pre-determined value in the bitstream (e.g. 0), as a bitstream constraint, for a range of quantization parameter qP values. This range of qP values may be different for different colour components.

An exemplary bitstream constraint on the semantic of the syntax element cu_residual_act_flag may be of the form:

It is a requirement of bitstream conformance that the value of cu_residual_act_flag shall be constrained such that the corresponding value of quantization parameter qP used in the scaling process of the current coding unit is in the range of minQP to maxQP, inclusive, for each colour component. In one example minQP is equal to 0 and maxQP is equal to 51. In another example minQP is equal to 0 and maxQP is equal to 51+(BD−8)*6. In yet another example minQP and maxQP are derived based on past data signaled in the bitstream. In still another example minQP and maxQP are signaled in the bitstream.

Another exemplary bitstream constraint on the semantic of the syntax element cu_residual_act_flag may be of the form:

It is a requirement of bitstream conformance that the value of cu_residual_act_flag shall be constrained such that the corresponding value of quantization parameter qP used in the scaling process of the current coding unit is greater than or equal to 0 for each colour component.

Another exemplary bitstream constraint on the semantic of the syntax element cu_residual_act_flag may be of the form:

It is a requirement of bitstream conformance that the value of cu_residual_act_flag shall be constrained such that the corresponding value of quantization parameter qP used in the scaling process of the current transform unit is greater than or equal to 0 for each colour component. Yet another exemplary bitstream constraint on the semantic of the syntax element cu_residual_act_flag may be of the form:

It is a requirement of bitstream conformance that the value of cu_residual_act_flag shall be 0 when for the current coding unit, $Qp'_Y$ is less than 5, or $Qp'_{Cb}$ is less than 5, or $Qp'_{Cr}$ is less than 3.

In another example embodiment the syntax element cu_residual_act_flag, which determines whether adaptive colour transform is carried out, is not signaled in the bitstream, but rather is inferred to be a pre-determined value (e.g. 0), for a range of quantization parameter qP values. This range of qP values may be different for different colour components.

In another example embodiment the syntax element cu_residual_act_flag, which determines whether adaptive colour transform is carried out, is not signaled in the bitstream, but rather is inferred to be a pre-determined value (e.g. 0), for a range of $Qp'_Y$, $QP'_{Cb}$, $QP'_{Cr}$ values. This range may be different for $Qp'_Y$, $Qp'_{Cb}$, $Qp'_{Cr}$.

An exemplary coding unit syntax is listed below in Table (1). This exemplary coding unit syntax bypasses the signaling of the adaptive colour transform flag cu_residual_act_flag when, for the current coding unit, $Qp'_Y$ is less than 5, or $QP'_{Cb}$ is less than 5, or $Qp'_{Cr}$ is less than 3. When it is not present, the cu_residual_act_flag is inferred to be equal to 0.

pcm_flag[x0][y0] equal to 1 specifies that the pcm_sample( ) syntax structure is present and the transform tree( ) syntax structure is not present in the coding unit including the luma coding block at the location (x0, y0). pcm_flag[x0][y0] equal to 0 specifies that pcm_sample( ) syntax structure is not present. When pcm_flag[x0][y0] is not present, it is inferred to be equal to 0.

The value of pcm_flag[x0+i][y0+j] with i=1 . . . nCbS−1, j=1 . . . nCbS−1 is inferred to be equal to pcm_flag[x0][y0] .residual_adaptive_colour_transform_enabled_flag equal to 0 specifies that the adaptive colour transform is disabled. residual_adaptive_colour_transform_enabled_flag equal to 1 specifies that the adaptive colour transform is enabled.

CuPredMode[x0][y0] equal to MODE_INTER specifies that the coding unit is coded using the inter-prediction process. CuPredMode[x0][y0] equal to MODE_INTRA specifies that the coding unit is coded using the intra-prediction process. The array indices x0 and, y0 specify the location (x0, y0) of the top-left luma sample of the considered coding block relative to the top-left luma sample of the picture.

intra_bc_flag[x0][y0] equal to 1 specifies that the current coding unit is coded in intra block copying mode. intra_bc_flag[x0][y0] equal to 0 specifies that the current coding unit is coded according to pred_mode_flag. When not present, the value of intra_bc_flag is inferred to be equal to 0. The array indices x0 and, y0 specify the location (x0, y0) of the top-left luma sample of the considered coding block relative to the top-left luma sample of the picture.

TABLE (6)

| | Descriptor |
|---|---|
| coding_unit(x0,y0,log2CbSize) { <br> ... <br>   if( cu_skip_flag[x0][y0] ) <br>   ... <br>   else { <br>     ... <br>     else { <br>       ... <br>       if( !pcm_flag[x0][y0] ) { <br>         ... <br>         if( rqt_root_cbf ) { <br>           if(!( $Qp'_{AYA}$ < 5 ‖ $Qp'_{AC\Delta\Delta b\Delta}$ < 5 ‖ $Qp'_{AC\Delta\Delta r\Delta}$ < 3) && <br>             residual_adaptive_colour_transform_enabled_flag && <br>             ( CuPredMode[x0][y0] == MODE_INTER ‖ intra_bc_flag[x0][y0] ‖ <br>             intra_chroma_pred_mode[x0][y0] == 4 ) ) <br>             cu_residual_act_flag <br>           ... <br>         } <br>       } <br>     } <br>   } <br> } | |

Where,

1<<log 2CbSize is equal to size NB for a NB×NB coding unit.

cu_skip_flag[x0][y0] equal to 1 specifies that for the current coding unit, when decoding a P or B slice, no more syntax elements except the merging candidate index merge_idx[x0][y0] are parsed after cu_skip_flag[x0][y0]. cu_skip_flag[x0][y0] equal to 0 specifies that the coding unit is not skipped. The array indices x0, y0 specify the location (x0, y0) of the top-left luma sample of the considered coding block relative to the top-left luma sample of the picture.

When cu_skip_flag[x0][y0] is not present, it is inferred to be equal to 0.

intra_chroma_pred_mode[x0][y0] specifies the intra prediction mode for chroma samples. The array indices x0, y0 specify the location (x0, y0) of the top-left luma sample of the considered prediction block relative to the top-left luma sample of the picture.

Figure 27:
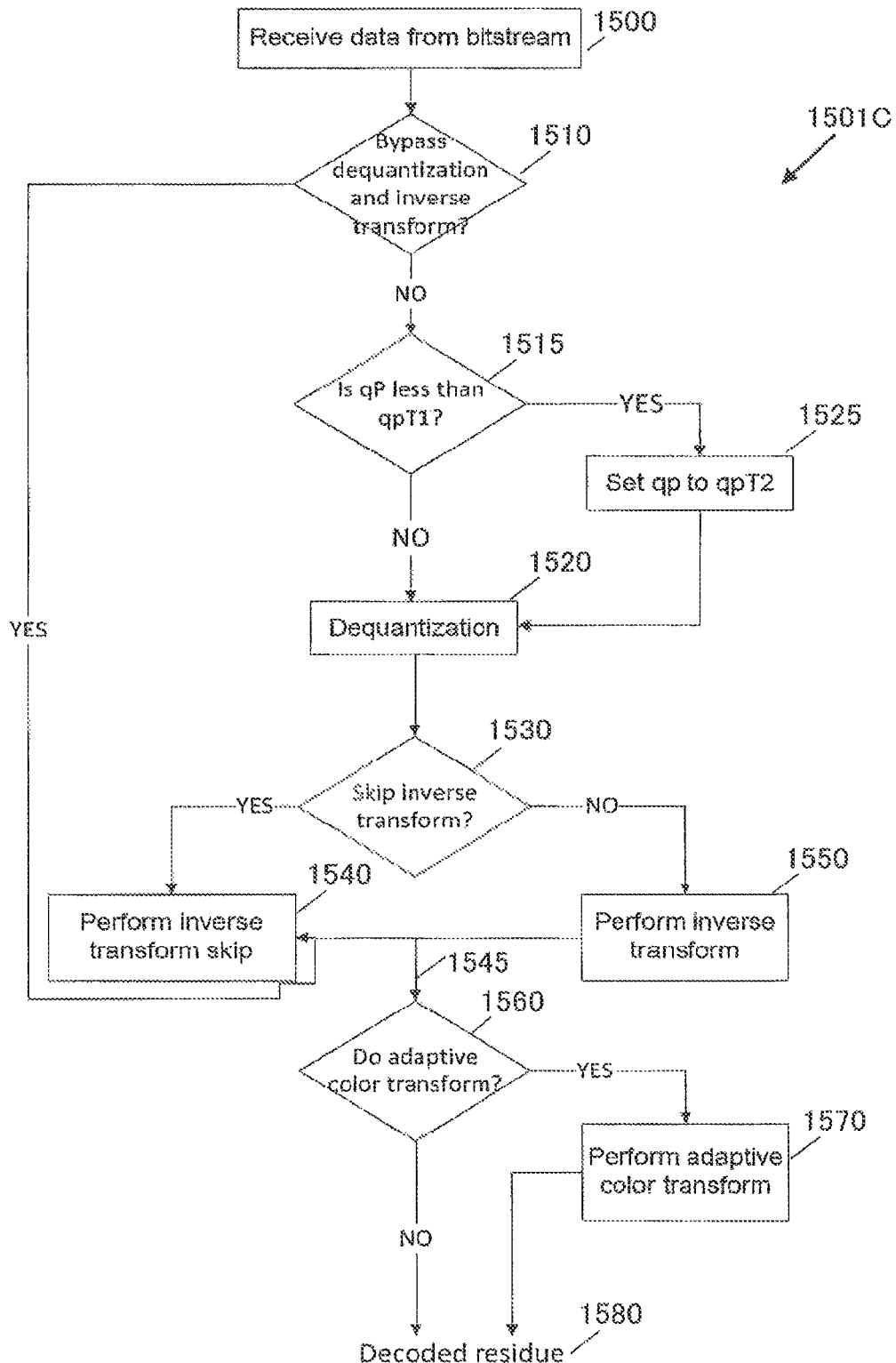
FIG. 27 is another flow diagram illustrating one configuration of a method for determining decoded residue with a de-quantizer, an inverse transform, an inverse transform skip and an adaptive colour transform.

FIG. 27 is a flow diagram illustrating an alternative configuration of a method 1501C used for determining decoded residue in a decoder. Method 1501C includes steps common to methods 1501A and 1501B, the common steps being indicated by the same reference numerals. In addition, method 1501B includes a step 1515 to determine if the quantization parameter qP received in the bitstream is less than a threshold value qpT1. If the quantization parameter qP is less than the threshold value qpT1, the variable qP used for the later steps in the decoding process is set in step 1525 to a value qpT2.

In one embodiment the threshold value qpT1 is a fixed pre-determined value. In another embodiment the threshold value qpT1 is derived using past data signaled in the bitstream. In yet another embodiment the threshold value qpT1 is signaled in the bitstream. In any of these embodiments the threshold value qpT1 may be different for different colour components. In one embodiment qpT2 is a fixed pre-determined value. In another embodiment the value qpT2 is derived using past data signaled in the bitstream. In yet another embodiment the value qpT2 is signaled in the bitstream. In still another embodiment qpT2 is equal to qpT1. In any of these embodiments the threshold value qpT2 may be different for different colour components.

Figure 28:
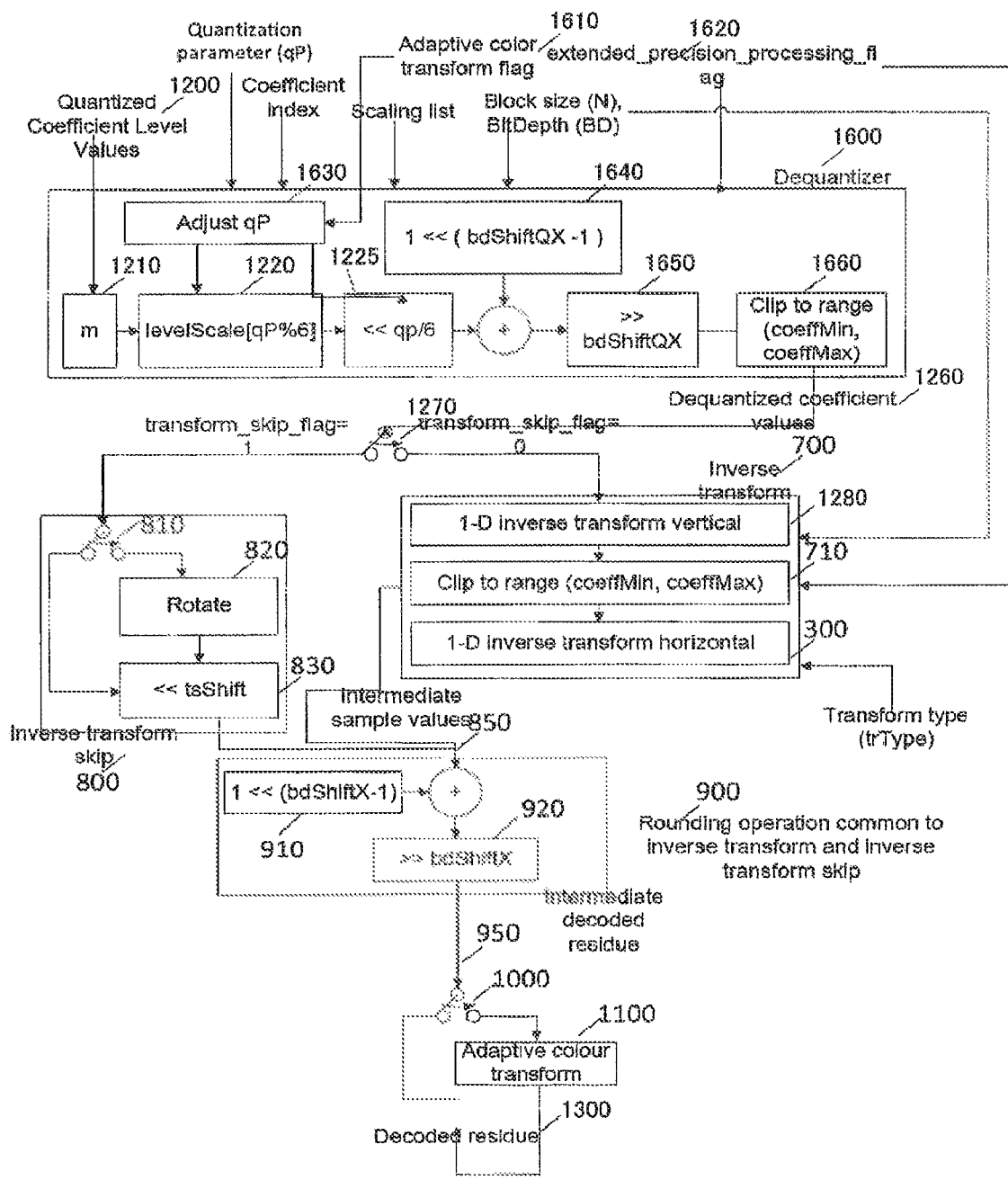
FIG. 28 illustrates a decoder with a de-quantizer, an inverse transform, an inverse transform skip and an adaptive colour transform.

FIG. 28 is an illustration of an exemplary decoder elements 1601 used for determining decoded residue 1300. Decoder elements 1601 include elements common to decoder elements 1201 (FIG. 23), the common elements being indicated by the same reference numerals. The decoder elements 1601 receive the quantized coefficient level value 1200 at an exemplary de-quantizer 1600. De-quantized coefficient values 1260 resulting from the de-quantizer 1600 are then either processed by inverse transforms 700 or inverse transform skip 800 to determine a set of intermediate values 850. The inverse transforms 700 includes a 1-D inverse transform vertical 1280 and a 1-D inverse transform horizontal 300 and maps data from a transform domain to a spatial domain using a matrix multiplication operator or other suitable process.

The de-quantizer 1600 provides descaling, which maps quantized coefficient level values 1200 that are transmitted in the bitstream to dequantized coefficient values 1260. The descaling corresponds to multiplying quantized coefficient level values with a scaling factor m (block 1210), an integer levelScale[qP %6] that is dependent on quantization parameter (qP) (block 1220), followed by a left bit shift of qP/6 (block 1225), followed by an addition of a rounding factor 1<<(bdShiftQX−1) (block 1640), followed by a right bit shift of bdShiftQX (block 1650), and finally a clipping block 1660. The clipping block 1660 results in any values over coeffMax being set to the maximum value, namely, coeffMax. Likewise clipping block 1660 results in any values less than coeffMin being set to the minimum value, namely, coeffMin. The qP value used in blocks 1210 and 1220 is based on a result from a qP adjustment block 1630.

In block 1630 a test is performed to determine if the adaptive colour transform is to be carried out. If the adaptive colour transform is to be carried out and the colour component being processed has index 0 or 1, then the value qP is reduced by 5. If the adaptive colour transform is to be carried out and the colour component being process has index 2, then the value qP is reduced by 3. The scaling factor m defaults to a pre-determined value if no scaling list is to be used by the de-quantization process, otherwise the scaling factor m is determined using the coefficient index and values which may be signaled in the bitstream. The value of bdShiftQX may be dependent on transform size (N), sample bit depth (BD) and the extended_precision_processing_flag (extended_precision_processing_flag).

The dequantized coefficient values 1260 may undergo either an inverse transformation process 700 or an inverse transform skip process 800 based on the value of a transform_skip_flag signaled in the bitstream. In FIG. 28, this is illustrated with the help of switch 1270. The inverse transformation 700 may perform a 1-dimensional inverse vertical transform 1280, the output of which is clipped (block 710). The inverse transform 800 may also perform a 1-dimensional inverse horizontal transform 300, which results in the intermediate sample values 850. The intermediate sample values 850 may then undergo a rounding operation 900. In rounding operation 900 the intermediate sample values 850 are added to a rounding factor 1<<(bdShiftX−1) (block 910), and the sum is right bit shifted by bdShiftX (block 920), to determine an intermediate decoded residue 950. The value of bdShiftX may be dependent on bit depth BD and an extended_precision_processing_flag (extended_precision_processing_flag). The inverse transforms 1280 and 300 may be swapped with each other, as desired. The 1-dimensional inverse transforms (both vertical and horizontal, blocks 1280 and 300) may be selected based on block size N and an input variable trType. The value taken on by trType may be determined based on the prediction mode used by the block under consideration and the colour component index. The inverse transform skip process 800 may rotate 820 the de-quantized coefficient values 1260 depending on the state of the switch 810. The state of the switch 810 may be determined based on a prediction mode used by the block under consideration, the size of the block under consideration, whether dequantization and transform was skipped for the block under consideration and whether transform skip rotation is enabled. Following this operation the data may be left bit shifted 830 by tsShift to output intermediate sample values 850. The variable tsShift may be determined based on the bit depth BD, block size N and extended_precision_processing_flag (extended_precision_processing_flag). The intermediate sample values 850 then undergo rounding (block 900) to determine intermediate decoded residue 950.

The intermediate decoded residue 950 may undergo adaptive colour transform 1100 based on the state of switch 1000. The state of the switch 1000 may be controlled by state of the syntax element cu_residual_act_flag for the block under consideration. When the switch 1000 bypasses the adaptive colour transform process 1100 the intermediate decoded residue 900 corresponds to the decoded residue 1300, otherwise the intermediate sample values 950 undergo the adaptive colour transform process 1100 before being output as decoded residue 1300.

Referring FIG. 28, in an example qP adjustment 1630 a test is performed to determine if the adaptive colour transform is to be carried out. If the adaptive colour transform is to be carried out and the colour component being processed has index 0 or 1, then the qP is reduced by 5 only if the qP input to process 1630 is greater than or equal to 5, otherwise the qP is set to 0. If the adaptive colour transform is to be carried out and the colour component being processed has index 2, then the qP is reduced by 3 only if the qP input to process 1630 is greater than or equal to 3, otherwise the qP is set to 0.

In one example embodiment, the qP adjustment 1630 may be carried out as follows:

If cIdx is equal to 0, $$qP = Max(0, Qp'_Y + (cu\_residual\_act\_flag[xTbY][yTbY]?-5:0))$$

Otherwise, if cIdx is equal to 1, $$qP = Max(0, Qp'_{Cb} + (cu\_residual\_act\_flag[xTbY][yTbY]?-5:0))$$

Otherwise (cIdx is equal to 2), $$qP = Max(0, Qp'_{Cr} + (cu\_residual\_act\_flag[xTbY][yTbY]?-3:0))$$

Where, cIdx is the colour component index of the current block, a luma location (xTbY, yTbY) specifying the top-left sample of the current luma transform block relative to the top left luma sample of the current picture.

In an example embodiment the quantization parameter qP in the de-quantizer 1600 is prevented from taking on a negative value by setting negative input qP values to another value (for e.g. 0 or 1).

In an example embodiment the quantization parameter qP in the de-quantizer 1600 is prevented from taking on a value greater than a pre-determined value, say V0. This may be achieved by setting qP values to another value (for e.g. V2) when input qP is greater than V0. In an example V2 is equal to V0.

In an example embodiment, the adaptive colour transform process 1100 at the decoder corresponds to the following linear transformation matrix equation:

$$\begin{bmatrix} Y\_out \\ Cb\_out \\ Cr\_out \end{bmatrix} = \begin{bmatrix} c\_00 & c\_01 & c\_02 \\ c\_10 & c\_11 & c\_12 \\ c\_20 & c\_21 & c\_22 \end{bmatrix} \begin{bmatrix} Y\_in \\ Cb\_in \\ Cr\_in \end{bmatrix}$$

Where, Y_in, Cb_in, Cr_in are the input values.

Y_out, Cb_out, Cr_out are the output values.

c_ij for i=0, 1, 2 and j=0, 1, 2 are the coefficients used for the linear transformation matrix In an example embodiment the linear transformation matrix coefficients c_ij corresponding to the adaptive colour transform are restricted such that:

Norm2(c_i0, c_i1, c_i2) is equal to 1 for each i=0, 1, 2

Where, $$Norm2(a,b,c) = \sqrt{\{a^2+b^2+c^2\}}$$

In an embodiment the linear transformation corresponding to the adaptive colour transform and having the above specified restriction on coefficients is approximated using integer arithmetic operations. In such an event, Norm2 (Norm2(c_i0, c_i1, c_i2)−1) may be a small non-zero quantity.

In an example embodiment, the linear transformation matrix coefficients c_ij corresponding to the adaptive colour transform 1100 are different for blocks coded losslessly and blocks that undergo lossy coding.

It is desirable to limit input to multiply operations to 16-bits and bound the dynamic range of intermediate values. Different architectures have different desired bounds on intermediate values. A typical CPU for example benefits by limiting intermediates to 32-bits while the value of 32 is not as critical to hardware implementations in FPGA or ASIC. To reduce the amount of dynamic range reduction imposed on the incoming data or otherwise facilitate a larger dynamic range for the data, the allowable quantized coefficient level values should be based upon the quantization parameter, and the transform size if desired. The quantized coefficient level values may be further selected based upon the weighting matrix, such as an 8-bit weighting matrix. The selection of the allowable quantized coefficient level values may be such that the results within the dequantizer is limited to 32 bits for all values of an 8-bit weighting matrix. This limitation, for example, permits implementation of a dequantizer using a 32-bit limitation on intermediate values and the ability clip or otherwise limit the quantized coefficient level data prior to the dequantization to avoid a 32-bit overflow condition. In an implementation that permits a bit range greater than 32 bits, the system may clip the quantized coefficient level data to a 16 bit range (or other value) independent of the quantization parameter and calculate the same result following the final clip to 16-bits.

One method to avoid extreme dynamic range during dequantization is to include a quantization parameter dependent limit on the permitted quantized coefficient level values in or resulting from the coded bitstream. There are several preferred techniques for implementing dequantization when such a limitation is imposed. One such technique to ensure that the dequantizer does not exceed a predefined bit depth, such as 32-bits, is to include quantization parameter dependent clipping limits. Another such technique is to require the use of a 38-bit dequantizer, while implementing a quantization parameter independent clipping limit, such as 16-bits. A further such technique is to require only a 33 bit dequantizer, and use a quantization parameter independent clipping limit of 15 bits along with a switch based on the range of the quantization parameter. All three of these techniques will give identical results following a final clip despite differences in intermediate bit-depth requirements. This allows a dequantizer to select an appropriate implementation based on the resources of a particular architecture.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

The invention claimed is:

1. A method for decoding a bitstream comprising:
    (a) receiving the bitstream including at least one picture which includes a plurality of titles, wherein each of the plurality of tiles comprises a plurality of coding units;
    (b) receiving a new palette entry in the bistream;
    (c) generating a palette table predictor by using a previous palette table which includes a set of pixel values of a previous coding unit;
    (d) generating a current palette table by using the palette table predictor and the new palette entry; and
    (e) decoding pixel values of a current coding unit by using the current palette table, wherein
    a size of the palette table predictor, specifying a number of entries of the palette table predictor, being set equal to 0 at start of each of the plurality of tiles, and
    the palette table predictor is not used for generating the current palette table when the size of the palette table predictor is equal to 0.

* * * * *